(12) United States Patent
Ono

(10) Patent No.: US 11,752,428 B2
(45) Date of Patent: Sep. 12, 2023

(54) NON-TRANSITORY COMPUTER READABLE MEDIUM, GAME TERMINAL DEVICE, AND INFORMATION PROCESSING SYSTEM

(71) Applicant: CYGAMES, INC., Tokyo (JP)

(72) Inventor: Yuki Ono, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/443,661

(22) Filed: Jul. 27, 2021

(65) Prior Publication Data

US 2021/0354033 A1 Nov. 18, 2021

Related U.S. Application Data

(63) Continuation of application No. PCT/JP2020/002885, filed on Jan. 28, 2020.

(30) Foreign Application Priority Data

Jan. 30, 2019 (JP) .................................. 2019-013874
Jan. 30, 2019 (JP) .................................. 2019-013875

(51) Int. Cl.
*A63F 13/355* (2014.01)
*A63F 13/358* (2014.01)
*A63F 13/49* (2014.01)

(52) U.S. Cl.
CPC .......... *A63F 13/355* (2014.09); *A63F 13/358* (2014.09); *A63F 13/49* (2014.09)

(58) Field of Classification Search
CPC .................. A63F 13/493; A63F 13/355; A63F 2300/538; A63F 2300/636
See application file for complete search history.

(56) References Cited

U.S. PATENT DOCUMENTS

2013/0165237 A1* 6/2013 Park .................... A63F 13/332
                                                           463/42
2014/0187325 A1   7/2014 Masuda

FOREIGN PATENT DOCUMENTS

JP   2000140413 A   5/2000
JP   2011156213 A   8/2011
(Continued)

OTHER PUBLICATIONS

Onmyoji "What is Onmyoryo? Explanation as to why you will lose out if you do not join the Onmyoryo![Walkthrough for Beginners]" URL, https://apptopi.jp/2017/03/25/onmyo-ryo/ (8 Pages).
(Continued)

*Primary Examiner* — William H McCulloch, Jr.
*Assistant Examiner* — Ankit B Doshi
(74) *Attorney, Agent, or Firm* — Osha Bergman Watanabe & Burton LLP

(57) ABSTRACT

A non-transitory computer readable medium stores a program causing a computer to execute: transmitting request information to an external device in response to an input of a request operation from an operation section; updating a play state on the basis of at least a game play situation; receiving invitation information from the external device in the case where the play state is a permitted state; reporting reception of the invitation information when receiving or after receiving the invitation information; receiving an input of a prescribed participation operation when reporting or after reporting the reception of the invitation information; and executing a communication game with other player terminals when the participation operation is input and a prescribed start condition is satisfied.

12 Claims, 58 Drawing Sheets

| TARGET | UPDATE CONDITION | UPDATE VALUE |
|---|---|---|
| TARGET PERSON (GUEST PLAYER) | RECEIVE INVITATION INFORMATION | −4 |
| | OPEN INVITATION INFORMATION | +1 |
| | CANNOT PARTICIPATE IN MULTI-PLAY (PLAY IN PROGRESS, FULL, DEACTIVATED) | +4 |
| | PRIORITY POINT > INITIAL VALUE WHEN BATTLE IS NORMALLY TERMINATED | RESET |
| HOST PLAYER | CREATE ROOM | −4 |
| | RANDOMLY EXTRACT TARGET PERSON | +1 |
| | START MULTI-PLAY AS HOST PLAYER | +1 |
| GUEST PLAYER HOST PLAYER | DAMAGE INFLICTED IN BATTLE IS GREATER THAN OR EQUAL TO 20% OF ENTIRE DAMAGE | +3 |

(56) References Cited

FOREIGN PATENT DOCUMENTS

| JP | 2013128776 A | 7/2013 |
| JP | 2014143663 A | 8/2014 |
| JP | 2016140493 A | 8/2016 |

OTHER PUBLICATIONS

Onmyoji "How to fight to obtain the maximum reward from a nenj? (Chinese legendary beast)! You can also get a piece of a medicine seller!" URL, https://web.archive.org/web/20180805123721/http://xn--o9j0bk4571bqig7mlvp2a8x8bv4lzd.com/archives/19566 (11 pages).
Full-scale FPS! A Review of Counter-Strike: Global Offensive, URL, https://nukkato.com/counter-strikeglobal-offensive/ (4 pages).
"Introduction of Mayor's Club Wars in Simcity Buildit", URL, https://help.ea.com/jajp/htlp/simcity/simcity-buildit/introducing-simcitybuildit-club-wars/ (6 pages).
Dragon Quest X: The Sleeping Hero and the Guiding Sworn Friends, Online Official Guidebook for Adventures+Maps+Monsters edition. (8 pages).
Office Action issued in Japanese Application No. 2019-013874; dated May 14, 2019 (7 pages).
Office Action issued in Japanese Application No. 2019-013875; dated May 21, 2019 (8 pages).
International Search Report issued in International Application No. PCT/JP2020/002885, dated Mar. 10, 2020 (7 pages).
Written Opinion issued in International Application No. PCT/JP2020/002885; dated Mar. 10, 2020 (4 pages).

* cited by examiner

| MAXIMUM VALUE | INITIAL VALUE | MINIMUM VALUE |
|---|---|---|
| 999 | 100 | 0 |

FIG.9A

| TARGET | UPDATE CONDITION | UPDATE VALUE |
|---|---|---|
| TARGET PERSON (GUEST PLAYER) | RECEIVE INVITATION INFORMATION | −4 |
| | OPEN INVITATION INFORMATION | +1 |
| | CANNOT PARTICIPATE IN MULTI-PLAY (PLAY IN PROGRESS, FULL, DEACTIVATED) | +4 |
| | PRIORITY POINT > INITIAL VALUE WHEN BATTLE IS NORMALLY TERMINATED | RESET |
| HOST PLAYER | CREATE ROOM | −4 |
| | RANDOMLY EXTRACT TARGET PERSON | +1 |
| | START MULTI-PLAY AS HOST PLAYER | +1 |
| GUEST PLAYER HOST PLAYER | DAMAGE INFLICTED IN BATTLE IS GREATER THAN OR EQUAL TO 20% OF ENTIRE DAMAGE | +3 |

FIG.9B

| ADDRESS | PRIORITY POINT | PLAYER RANK | PLAYER (PLAYER ID) | INVITATION INFORMATION (ROOM NUMBER) | STATUS FLAG | WAIT TIME |
|---|---|---|---|---|---|---|
| 1 | 165 | 20 | 0168-4658-6720 | | | |
| 2 | 165 | 15 | 6843-2973-2238 | | | |
| 3 | 165 | 19 | 1946-3229-7668 | | | |
| 4 | 165 | 11 | 3397-1249-9883 | | | |
| 5 | 165 | 13 | 2498-3369-9999 | | | |
| 6 | 164 | 13 | 1009-5322-0303 | | | |
| 7 | 164 | 19 | 3391-2926-4761 | | | |
| 8 | 164 | 18 | 2339-1168-3265 | | | |
| 9 | 164 | 20 | 0029-4689-9987 | | | |
| 10 | 164 | 11 | 1236-2197-5468 | | | |
| 11 | 164 | 15 | 2946-3165-6657 | | | |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| 99997 | 1 | 20 | 9164-2334-7619 | | | |
| 99998 | 1 | 11 | 1212-6464-5913 | | | |
| 99999 | 0 | 13 | 3371-1640-0059 | | | |
| 100000 | 0 | 14 | 3091-2978-2911 | | | |

FIG.10

| ADD-RESS | PRIORITY POINT | PLAYER RANK | PLAYER (PLAYER ID) | INVITATION INFORMATION (ROOM NUMBER) | STATUS FLAG | WAIT TIME |
|---|---|---|---|---|---|---|
| 1 | 165 | 20 | 0168-4658-6720 | 1111-1111 | RECEPTION POSSIBLE | 0s |
| 2 | 165 | 15 | 6843-2973-2238 | 1111-1111 | RECEPTION POSSIBLE | 0s |
| 3 | 165 | 19 | 1946-3229-7668 | 1111-1111 | RECEPTION POSSIBLE | 0s |
| 4 | 165 | 11 | 3397-1249-9883 | 1111-1111 | RECEPTION POSSIBLE | 0s |
| 5 | 165 | 13 | 2498-3369-9999 | 1111-1111 | RECEPTION POSSIBLE | 0s |
| 6 | 164 | 13 | 1009-5322-0303 | 1111-1111 | RECEPTION NOT POSSIBLE | 5s |
| 7 | 164 | 19 | 3391-2926-4761 | 1111-1111 | RECEPTION NOT POSSIBLE | 5s |
| 8 | 164 | 18 | 2339-1168-3265 | 1111-1111 | RECEPTION NOT POSSIBLE | 5s |
| 9 | 164 | 20 | 0029-4689-9987 | 1111-1111 | RECEPTION NOT POSSIBLE | 5s |
| 10 | 164 | 11 | 1236-2197-5468 | 1111-1111 | RECEPTION NOT POSSIBLE | 5s |
| 11 | 164 | 15 | 2946-3165-6657 | 1111-1111 | RECEPTION NOT POSSIBLE | 5s |
| ... | ... | ... | ... | ... | ... | ... |
| ... | ... | ... | ... | ... | ... | ... |
| 98 | 164 | 19 | 4138-7943-2169 | 1111-1111 | RECEPTION NOT POSSIBLE | 5s |
| 99 | 164 | 15 | 9870-1309-2031 | 1111-1111 | RECEPTION NOT POSSIBLE | 5s |
| 100 | 163 | 17 | 3001-4600-1978 | 1111-1111 | RECEPTION NOT POSSIBLE | 10s |
| 101 | 163 | 11 | 0008-1137-6643 | | | |
| 102 | 163 | 11 | 4689-1305-4114 | | | |
| 103 | 163 | 13 | 5591-0326-1102 | | | |
| 104 | 163 | 19 | 7745-1149-5478 | | | |
| 105 | 163 | 20 | 6187-1312-1120 | | | |
| 106 | 163 | 17 | 2316-1131-1212 | | | |
| ... | ... | ... | ... | ... | ... | ... |
| ... | ... | ... | ... | ... | ... | ... |
| 198 | 163 | 15 | 8984-1597-1349 | | | |
| 199 | 163 | 14 | 9100-1000-0979 | | | |
| 200 | 163 | 13 | 5590-5555-1978 | | | |
| 201 | 163 | 19 | 4682-0973-0904 | | | |
| 202 | 163 | 16 | 9764-3109-4979 | | | |
| 203 | 163 | 16 | 0312-4654-7987 | | | |
| ... | ... | ... | ... | ... | ... | ... |
| ... | ... | ... | ... | ... | ... | ... |

FIG.11

| ADD-RESS | PRIORITY POINT | PLAYER RANK | PLAYER (PLAYER ID) | INVITATION INFORMATION (ROOM NUMBER) | STATUS FLAG | WAIT TIME |
|---|---|---|---|---|---|---|
| 1 | 165 | 20 | 0168-4658-6720 | 1111-1111 | RECEPTION POSSIBLE | 0s |
| 2 | 165 | 15 | 6843-2973-2238 | 1111-1111 | RECEPTION POSSIBLE | 0s |
| 3 | 165 | 19 | 1946-3229-7668 | 1111-1111 | RECEPTION POSSIBLE | 0s |
| 4 | 165 | 11 | 3397-1249-9883 | 1111-1111 | RECEPTION POSSIBLE | 0s |
| 5 | 165 | 13 | 2498-3369-9999 | 1111-1111 | RECEPTION POSSIBLE | 0s |
| 6 | 164 | 13 | 1009-5322-0303 | 1111-1111 | RECEPTION POSSIBLE | 0s |
| 7 | 164 | 19 | 3391-2926-4761 | 1111-1111 | RECEPTION POSSIBLE | 0s |
| 8 | 164 | 18 | 2339-1168-3265 | 1111-1111 | RECEPTION POSSIBLE | 0s |
| 9 | 164 | 20 | 0029-4689-9987 | 1111-1111 | RECEPTION POSSIBLE | 0s |
| 10 | 164 | 11 | 1236-2197-5468 | 1111-1111 | RECEPTION POSSIBLE | 0s |
| 11 | 164 | 15 | 2946-3165-6657 | 1111-1111 | | 0s |
| ... | ... | ... | ... | ... | ... | ... |
| ... | ... | ... | ... | ... | ... | ... |
| 98 | 164 | 19 | 4138-7943-2169 | 1111-1111 | RECEPTION POSSIBLE | 0s |
| 99 | 164 | 15 | 9870-1309-2031 | 1111-1111 | RECEPTION POSSIBLE | 0s |
| 100 | 163 | 17 | 3001-4600-1978 | 1111-1111 | RECEPTION NOT POSSIBLE | 5s |
| 101 | 163 | 11 | 0008-1137-6643 | 2222-2222 | RECEPTION POSSIBLE | 0s |
| 102 | 163 | 11 | 4689-1305-4114 | 2222-2222 | RECEPTION POSSIBLE | 0s |
| 103 | 163 | 13 | 5591-0326-1102 | 2222-2222 | RECEPTION POSSIBLE | 0s |
| 104 | 163 | 19 | 7745-1149-5478 | 2222-2222 | RECEPTION POSSIBLE | 0s |
| 105 | 163 | 20 | 6187-1312-1120 | 2222-2222 | RECEPTION POSSIBLE | 0s |
| 106 | 163 | 17 | 2316-1131-1212 | 2222-2222 | RECEPTION POSSIBLE | 0s |
| ... | ... | ... | ... | ... | ... | ... |
| ... | ... | ... | ... | ... | ... | ... |
| 198 | 163 | 15 | 8984-1597-1349 | 2222-2222 | RECEPTION POSSIBLE | 0s |
| 199 | 163 | 14 | 9100-1000-0979 | 2222-2222 | RECEPTION POSSIBLE | 0s |
| 200 | 163 | 13 | 5590-5555-1978 | 2222-2222 | RECEPTION POSSIBLE | 0s |
| 201 | 163 | 19 | 4682-0973-0904 | | | |
| 202 | 163 | 16 | 9764-3109-4979 | | | |
| 203 | 163 | 16 | 0312-4654-7987 | | | |
| ... | ... | ... | ... | ... | ... | ... |
| ... | ... | ... | ... | ... | ... | ... |

FIG.12

| ADD-RESS | PRIORITY POINT | PLAYER RANK | PLAYER (PLAYER ID) | INVITATION INFORMATION (ROOM NUMBER) | STATUS FLAG | WAIT TIME |
|---|---|---|---|---|---|---|
| 1 | 161 | 20 | 0168-4658-6720 | 1111-1111 | RECEIVED | 0s |
| 2 | 165 | 15 | 6843-2973-2238 | 1111-1111 | RECEPTION POSSIBLE | 0s |
| 3 | 161 | 19 | 1946-3229-7668 | 1111-1111 | RECEIVED | 0s |
| 4 | 165 | 11 | 3397-1249-9883 | 1111-1111 | RECEPTION POSSIBLE | 0s |
| 5 | 165 | 13 | 2498-3369-9999 | 1111-1111 | RECEPTION POSSIBLE | 0s |
| 6 | 164 | 13 | 1009-5322-0303 | 1111-1111 | RECEPTION POSSIBLE | 0s |
| 7 | 164 | 19 | 3391-2926-4761 | 1111-1111 | RECEPTION POSSIBLE | 0s |
| 8 | 164 | 18 | 2339-1168-3265 | 1111-1111 | RECEPTION POSSIBLE | 0s |
| 9 | 164 | 20 | 0029-4689-9987 | 1111-1111 | RECEPTION POSSIBLE | 0s |
| ... | ... | ... | ... | ... | ... | ... |

| ADD-RESS | PRIORITY POINT | PLAYER RANK | PLAYER (PLAYER ID) | INVITATION INFORMATION (ROOM NUMBER) | STATUS FLAG | WAIT TIME |
|---|---|---|---|---|---|---|
| 1 | 165 | 15 | 6843-2973-2238 | 1111-1111 | RECEPTION POSSIBLE | 0s |
| 2 | 165 | 11 | 3397-1249-9883 | 1111-1111 | RECEPTION POSSIBLE | 0s |
| 3 | 165 | 13 | 2498-3369-9999 | 1111-1111 | RECEPTION POSSIBLE | 0s |
| 4 | 164 | 13 | 1009-5322-0303 | 1111-1111 | RECEPTION POSSIBLE | 0s |
| 5 | 164 | 19 | 3391-2926-4761 | 1111-1111 | RECEPTION POSSIBLE | 0s |
| 6 | 164 | 18 | 2339-1168-3265 | 1111-1111 | RECEPTION POSSIBLE | 0s |
| 7 | 164 | 20 | 0029-4689-9987 | 1111-1111 | RECEPTION POSSIBLE | 0s |
| ... | ... | ... | ... | ... | ... | ... |
| 1125 | 161 | 20 | 0168-4658-6720 | 1111-1111 | RECEIVED | 0s |
| 1126 | 161 | 19 | 1946-3229-7668 | 1111-1111 | RECEIVED | 0s |
| ... | ... | ... | ... | ... | ... | ... |

FIG.13

| PLAY STATE | INVITATION INFORMATION RECEIVABILITY | SETTING CONDITION |
|---|---|---|
| RECEPTION-POSSIBLE STATE | PERMITTED STATE | INVITATION INFORMATION HAS NOT BEEN RECEIVED<br>MULTI-PLAY ROOM HAS NOT BEEN ENTERED<br>SETTING CONDITION FOR RECEPTION-NOT-POSSIBLE STATE IS NOT SATISFIED |
| UNOPENED STATE | | INVITATION INFORMATION HAS BEEN RECEIVED<br>INVITATION INFORMATION DIALOG HAS NOT BEEN OPENED |
| OPENED STATE | NOT-POSSIBLE STATE | INVITATION INFORMATION DIALOG IS DISPLAYED<br>SUSPENSION OPERATION IS INPUT |
| PARTICIPATING STATE | | MULTI-PLAY ROOM HAS BEEN ENTERED |
| RECEPTION-NOT-POSSIBLE STATE | | FIVE MINUTES HAVE NOT ELAPSED<br>AFTER NORMALLY TERMINATING MULTI-PLAY<br>FIVE MINUTES HAVE NOT ELAPSED<br>AFTER REJECTION OPERATION<br>(*DURATION IS 60 MINUTES IN CASE WHERE REJECTION HAS BEEN MADE TWICE WITHIN 30 MINUTES) |

FIG.14A

| DISPLAYED SCREEN | TIMING OF INVITATION INFORMATION RECEPTION CONFIRMATION |
|---|---|
| BATTLE SCREEN IS DISPLAYED | RANDOMLY DETERMINE TIMING WITHIN RANGE OF 1-15 SECONDS AFTER SCREEN TRANSITION THEN TIMING IS EVERY 15 SECONDS |
| ORDINARY SCREEN IS DISPLAYED | RANDOMLY DETERMINE TIMING WITHIN RANGE OF 1-10 SECONDS AFTER SCREEN TRANSITION THEN TIMING IS EVERY 10 SECONDS |

FIG.14B

NON-TRANSITORY COMPUTER READABLE MEDIUM, GAME TERMINAL DEVICE, AND INFORMATION PROCESSING SYSTEM

CROSS REFERENCE TO RELATED APPLICATIONS

This application is a continuation application of International Application No. PCT/JP2020/002885, filed on Jan. 28, 2020, which claims priority to Japanese Patent Applications Nos. 2019-013874 and 2019-013875, both filed on Jan. 30, 2019, the entire contents of which are incorporated by reference herein.

BACKGROUND ART

Technical Field

The present invention relates to an information processing program, a game terminal device, and an information processing system.

A communication game (hereinafter referred to as a multi-play) in which a plurality of players can participate has been conventionally known. In a multi-play, players who wish to participate in a game need to be matched. For example, Patent Literature 1 proposes a game system that accepts an application for a battle against each other from other players (succeeding players) while a preceding player is playing a game.

According to this game system, an image indicating an application for a battle against each other is displayed on a game screen of the preceding player. Then, when the preceding player performs an operation for accepting the application, a multi-play is started after waiting for the termination of the game being played by the preceding player.

CITATION LIST

Patent Literature

Patent Literature 1: JP 2000-140413 A

SUMMARY OF INVENTION

Technical Problem

With the game system described above, it is not possible to start a multi-play until the preceding player terminates the game being played. Like this, there are cases where it takes a long time to start a multi-play depending on the play situation of the preceding player.

The object of the present invention is to provide an information processing program, a game terminal device, and an information processing system that make it possible to shorten the time it takes to start a communication game in which a plurality of players can participate.

Solution to Problem

In order to solve the problem described above, an information processing program according to the present invention causes a computer to function as: a request information transmission unit that transmits request information to an external device in response to an input of a request operation from an operation section; a state update unit that updates a play state on the basis of at least a game play situation; a reception unit capable of receiving invitation information from the external device in the case where the play state is a permitted state; a reporting unit that reports reception of the invitation information when receiving or after receiving the invitation information; an operation permission unit that makes it possible to input a prescribed participation operation when reporting or after reporting the reception of the invitation information; and a game execution unit that executes a communication game with other player terminals when the participation operation is input and a prescribed start condition is satisfied.

In order to solve the problem described above, the information processing program according to the present invention causes a computer to function as: a request information transmission unit that transmits request information to an external device in response to an input of a request operation from an operation section; a state update unit that updates a play state on the basis of at least a game play situation; a reception unit capable of receiving invitation information from the external device; a reporting unit that reports reception of the invitation information when receiving or after receiving the invitation information in the case where the play state is a permitted state; an operation permission unit that makes it possible to input a prescribed participation operation when reporting or after reporting the reception of the invitation information; and a game execution unit that executes a communication game with other player terminals when the participation operation is input and a prescribed start condition is satisfied.

Furthermore, the state update unit may set the play state to a not-possible state in which the reception of the invitation information or the reporting of the reception of the invitation information is not possible for a first time after terminating the communication game.

Furthermore, the operation permission unit may make it possible to input a rejection operation for rejecting participation in the communication game when reporting or after reporting the reception of the invitation information, and the state update unit may set the play state to the not-possible state in which the reception of the invitation information or the reporting of the reception of the invitation information is not possible for a second time after inputting the rejection operation.

Furthermore, the operation permission unit may make it possible to input a prescribed suspension operation when reporting or after reporting the reception of the invitation information, and the reporting unit, in the case where the suspension operation is input, may continue the reporting and terminate the reporting upon receiving participation-not-possible information that can be received when the participation in the communication game becomes not possible.

In order to solve the problem described above, a game terminal device including a storage medium in which the information processing program described above may be provided.

In order to solve the problem described above, an information processing system according to the present invention includes: an accumulation unit that accumulates prescribed player information for each player in a storage unit; a state update unit that updates a play state on the basis of at least a game play situation at a player terminal; a request information transmission unit that transmits request information in response to an input of a request operation on an operation section of the player terminal; a setting unit that, upon receiving the request information from the player terminal, sets, on the basis of at least the player information accumulated in the storage unit, a plurality of player terminals as extracted terminals capable of receiving invitation information; a reception unit capable of receiving the invitation information at each extracted terminal the play state of which is a permitted state; a reporting unit that reports reception of the invitation information when receiving or after receiving the invitation information; an operation permission unit that makes it possible to input a prescribed participation operation when reporting or after reporting the reception of the invitation information; and a game execution unit that executes a communication game between one or more of the extracted terminals that have transmitted participation information on the basis of the input of the participation operation and the player terminal that has transmitted the request information.

In order to solve the problem described above, an information processing system according to the present invention includes: an accumulation unit that accumulates prescribed player information for each player in a storage unit; a state update unit that updates a play state on the basis of at least a game play situation at a player terminal; a request information transmission unit that transmits request information in response to an input of a request operation on an operation section of the player terminal; a setting unit that, upon receiving the request information from the player terminal, sets, on the basis of at least the player information accumulated in the storage unit, a plurality of player terminals as extracted terminals capable of receiving invitation information; a reception unit capable of receiving the invitation information at each extracted terminal; a reporting unit that reports reception of the invitation information at each extracted terminal when receiving or after receiving the invitation information in the case where the play state is a permitted state; an operation permission unit that makes it possible to input a prescribed participation operation when reporting or after reporting the reception of the invitation information; and a game execution unit that executes a communication game between one or more of the extracted terminals that have transmitted participation information on the basis of the input of the participation operation and the player terminal that has transmitted the request information.

Effects of Disclosure

The present invention makes it possible to shorten the time it takes to start a communication game in which a plurality of players can participate.

BRIEF DESCRIPTION OF DRAWINGS

FIG. 9A is a diagram for explaining priority points.

FIG. 9B is a diagram for explaining a priority points update condition.

FIG. 10 is a first diagram for explaining list update processing.

FIG. 11 is a second diagram for explaining the list update processing.

FIG. 12 is a third diagram for explaining the list update processing.

FIG. 13 is a fourth diagram for explaining the list update processing.

FIG. 14A is a diagram for explaining the play states of the player terminal.

FIG. 14B is a diagram for explaining the timing of the reception confirmation of invitation information.

DESCRIPTION OF EMBODIMENTS

The embodiments of the present invention will be described below in detail with reference to the accompanying drawings. Dimensions, materials, other specific numeric values, etc. indicated in such embodiments are merely examples for facilitating the understanding of the embodiments, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
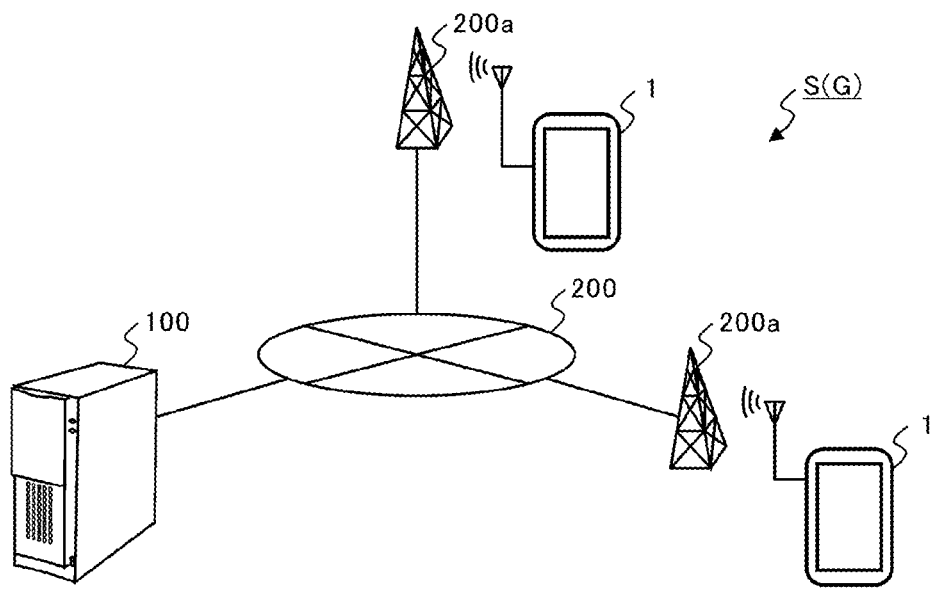
FIG. 1 is an explanatory illustration showing the schematic configuration of an information processing system.

FIG. 1 is an explanatory illustration showing the schematic configuration of an information processing system S. The information processing system S is what is called a client-server system including player terminals 1, a server 100, and a communication network 200 having communication base stations 200a.

The player terminals 1 can establish communication with the server 100 via the communication network 200. The player terminals 1 include a wide variety of electronic devices that can establish wired or wireless connection with the server 100 for communication. The player terminals 1 include, for example, smartphones, mobile phones, tablet devices, personal computers, game devices, etc. In this embodiment, the case where smartphones are used as the player terminals 1 will be described.

The server 100 is connected with a plurality of player terminals 1 for communication. The server 100 accumulates various kinds of information (player information) for each player who plays a game. Furthermore, on the basis of operations input from the player terminals 1, the server 100 updates the accumulated information and controls the progress of a game.

The communication base stations 200a are connected with the communication network 200 and perform the wireless transmission and reception of information to and from the player terminals 1. The communication network 200 is implemented by a mobile phone network, the Internet, a LAN (Local Area Network), a private line, or the like, and realizes wired or wireless connection for communication between the player terminals 1 and the server 100.

In the information processing system S according to this embodiment, the player terminals 1 and the server 100 function as a game device G. The player terminals 1 and the server 100 share roles related to the progress control of a game, and cooperation between the player terminals 1 and the server 100 makes it possible for the game to proceed.

(Hardware Configurations of Player Terminal 1 and Server 100)

Figure 2A:
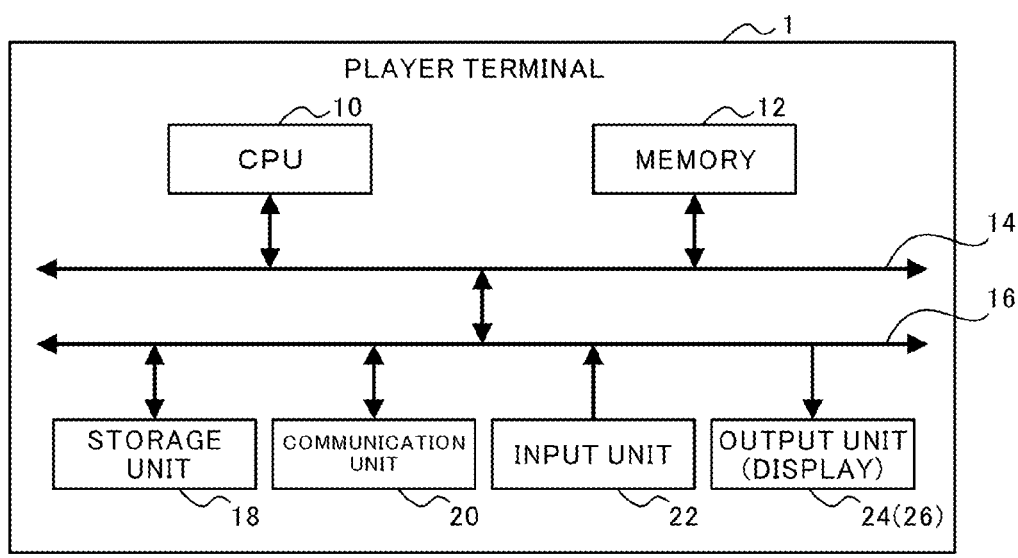
FIG. 2A is a diagram for explaining the hardware configuration of a player terminal.
Figure 2B:
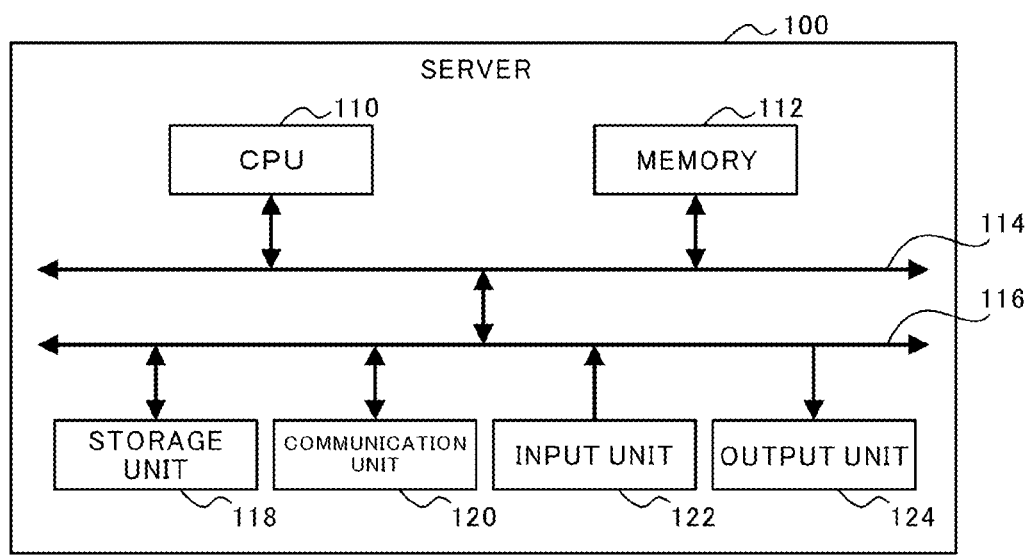
FIG. 2B is a diagram for explaining the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include a CPU (Central Processing Unit) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Thus, the hardware configuration of the player terminal 1 will be described below, and a description about the hardware configuration of the server 100 will be omitted.

The CPU 10 runs a program stored in the memory 12 and controls the progress of a game. The memory 12 is implemented by a ROM (Read Only Memory) or a RAM (Random Access Memory) and stores programs and various kinds of data needed for the progress control of a game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is implemented by a semiconductor memory such as a DRAM (Dynamic Random Access Memory), and stores various kinds of programs and data. At the player terminal 1, the programs and data stored in the storage unit 18 are loaded into the memory 12 (RAM) by the CPU 10.

The communication unit 20 is wirelessly connected with the communication base station 200a for communication and performs the transmission and reception of information such as various kinds of data and programs to and from the server 100 via the communication network 200. At the player terminal 1, programs, etc. received from the server 100 are stored in the memory 12 or the storage unit 18.

The input unit 22 is implemented by, for example, a touch panel, a button, a keyboard, a mouse, a cross key, an analog controller, or the like via which a player operation is input (by which a player operation is accepted). Furthermore, the input unit 22 may be a dedicated controller provided in the player terminal 1 or connected (externally attached) to the player terminal 1. Furthermore, the input unit 22 may be implemented by an acceleration sensor that detects the inclination or movement of the player terminal 1, or a microphone that detects the voice of a player. That is, the input unit 22 includes a wide variety of devices that enable an input of player's intention in an identifiable manner.

The output unit 24 is configured to include a display device and a speaker. Note that the output unit 24 may be a device connected (externally attached) to the player terminal 1. In this embodiment, the player terminal 1 includes a display 26 as the output unit 24 and a touch panel superposed onto the display 26 as the input unit 22.

(Game Content)

Next, the content of a game provided by the information processing system S (game device G) according to this embodiment will be described by using an example. In this embodiment, what is called a battle game in which an ally character battles against an enemy character is provided. Specifically, in a game in this embodiment, a plurality of ally characters are provided. A player organizes a party by selecting a plurality of ally characters (three in this case) from among the provided ally characters. Furthermore, the player can play a plurality of kinds of battle games having different enemy characters or difficulty levels. The object of a battle game is that the player operates the ally characters organized into the party and beats the enemy characters to acquire rewards.

Figure 3A:
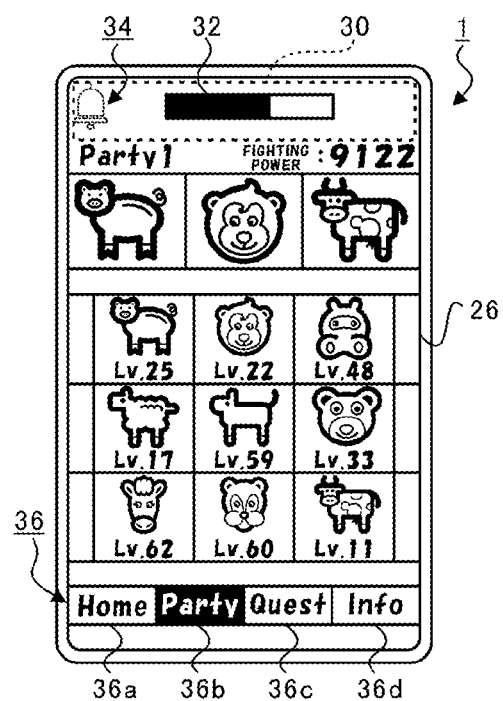
FIG. 3A is an illustration showing an example of a party organization screen.
Figure 3B:
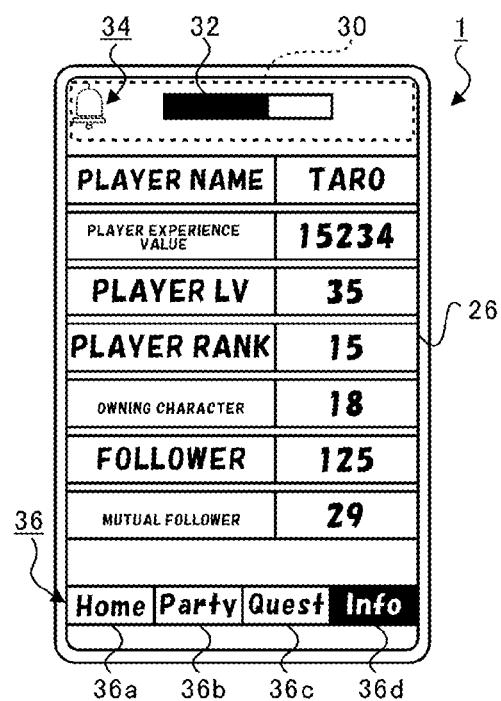
FIG. 3B is an illustration for explaining an example of an information confirmation screen.
Figure 3C:
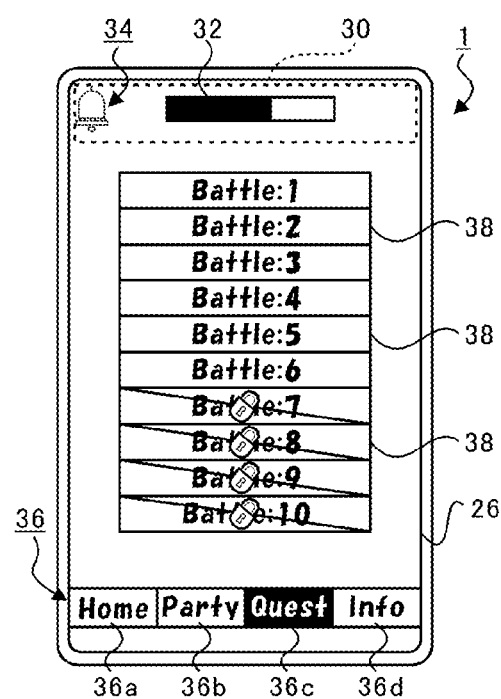
FIG. 3C is an illustration for explaining an example of a battle game selection page in a quest screen.
Figure 3D:
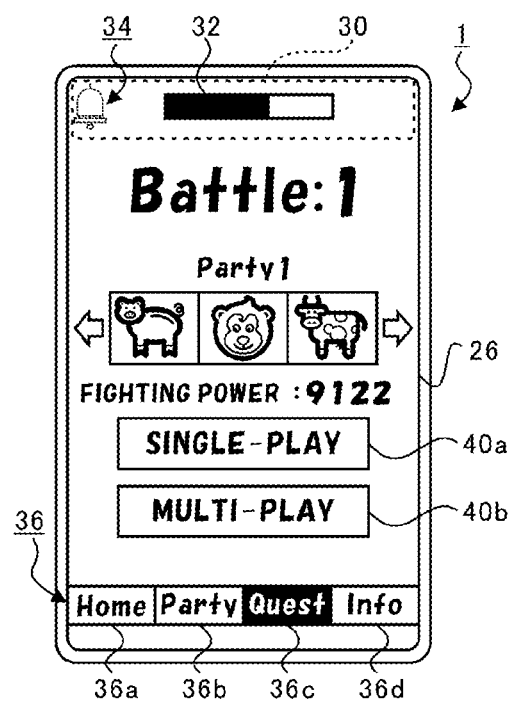
FIG. 3D is an illustration for explaining an example of a play content selection page in the quest screen.

FIG. 3A is an illustration showing an example of a party organization screen. FIG. 3B is an illustration for explaining an example of an information confirmation screen. FIG. 3C is an illustration for explaining an example of a battle game selection page in a quest screen. FIG. 3D is an illustration for explaining an example of a play content selection page in the quest screen. Game screens shown in FIG. 3A, FIG. 3B, FIG. 3C, and FIG. 3D are displayed on the display 26 of the player terminal 1. In this embodiment, game screens are roughly classified into ordinary screens and a battle screen.

The ordinary screens are mainly screens for a player to perform various kinds of settings or information confirmation. Meanwhile, the battle screen is a screen displayed on the display 26 from the start to the end of a battle game. Here, all screens other than the battle screen are the ordinary screens. The ordinary screens are roughly classified into four screens, i.e., a home screen, which is not shown, a party organization screen shown in FIG. 3A, an information confirmation screen shown in FIG. 3B, and a quest screen shown in FIG. 3C and FIG. 3D.

Note that the party organization screen and the quest screen are constituted of a plurality of pages, and the pages are switched by a player operation. In the ordinary screens, a header display area 30 is provided at the upper part of the display 26. A stamina display bar 32 indicating the stamina of a player is displayed in the header display area 30.

Note that stamina is a parameter needed to play a battle game. In this embodiment, a plurality of kinds of battle games are provided, and for each battle game, a stamina consumption value needed to play the battle game is set. Since a player plays a battle game by consuming stamina, the player cannot play a battle game in the case where the player does not have enough stamina.

Although the detailed description will be omitted, a player can acquire a prescribed value as a player experience value when the player wins a battle game. Furthermore, a player level increases every time the player experience value reaches a certain value. A stamina upper limit value is set for the player level, and the stamina upper limit value becomes higher as the player level increases. The stamina recovers by a prescribed value (e.g., one point) at regular intervals (e.g., five minutes) within a range up to the upper limit value. The stamina display bar 32 is displayed in such a manner that the current amount of remaining stamina with respect to the stamina upper limit value can be visually grasped.

Furthermore, a notification image 34 is displayed at the left end of the header display area 30. Although the details will be described later, the notification image 34 reports the reception of battle game invitation information or event guidance information to a player. In a state in which no invitation information or guidance information has been received, the notification image 34 is displayed in a non-reporting mode. Note that the notification image 34 in the non-reporting mode is displayed in a light color. Meanwhile, in a state in which at least one of the invitation information and the guidance information has been received, the notification image 34 is displayed in a reporting mode. The notification image 34 in the reporting mode is highlighted in a more conspicuous color than that in the non-reporting mode.

Furthermore, in the ordinary screens, a menu bar 36 is displayed at the lower part of the display 26. In the menu bar 36, a plurality of operation sections that can be operated (tapped) by a player are provided. Here, as examples of the operation sections, a home screen selection section 36a shown as "Home", a party organization screen selection section 36b shown as "Party", a quest screen selection section 36c shown as "Quest", and an information confirmation screen selection section 36d shown as "Info" are provided in the menu bar 36.

When the home screen selection section 36a is tapped, the home screen is displayed on the display 26. Furthermore, when the party organization screen selection section 36b is tapped, the party organization screen shown in FIG. 3A is displayed on the display 26. Similarly, when the information confirmation screen selection section 36d is tapped, the information confirmation screen shown in FIG. 3B is displayed on the display 26, and when the quest screen selection section 36c is tapped, the quest screen (battle game selection page) shown in FIG. 3C is displayed on the display 26.

As described above, the ordinary screens are roughly classified into four screens. In the menu bar 36, an operation section corresponding to each screen is highlighted so that a screen displayed on the display 26 can be identified. Note that, in the case where a page transitions in an ordinary screen or in the case where an ordinary screen transitions to a different ordinary screen, the stamina display bar 32, the notification image 34, and the menu bar 36 remain being displayed. That is, when a transition occurs in an ordinary screen, images other than the header display area 30 and the menu bar 36 are switched.

In the party organization screen shown in FIG. 3A, all ally characters owned by a player are displayed. The player can organize one party by selecting three ally characters from the displayed ally characters. Here, it is possible to organize and store six parties at most. An experience value and a level are stored in association with each ally character. The experience value increases in the case where the player wins a battle game, which will be described later, or in the case where a prescribed item is used. The level is set in accordance with the experience value, and the level increases every time the experience value reaches a prescribed value. Note that a level upper limit value is set for each ally character, and the level increases within a range up to the upper limit value.

Furthermore, a fighting power base value such as life points, an offensive power, and a defensive power is set for an ally character in accordance with the level thereof. The player can proceed with a battle game advantageously as the fighting power of the ally character becomes higher. Furthermore, each base value set for the ally character increases as the level becomes higher.

Furthermore, in the party organization screen, the player can make the ally characters incorporated into the party wear equipment such as weapons and protective gear (set equipment for the ally characters). A value to be added to the offensive power, the defensive power, etc. is set for each piece of equipment. When an ally character wears a piece of equipment, a value to be added for the piece of equipment is added to the base value described above, thereby making it possible to increase the fighting power of the ally character.

In the information confirmation screen shown in FIG. 3B, player information related to a player is displayed. As the player information, for example, a player name, a player experience value, a player level, a player rank, the number of owned characters (the number of ally characters that the player has), the number of followers, and the number of mutual followers are displayed. Note that, in this embodiment, the followers refer to other players set by the player as what are called favorites or comrades. Furthermore, in this embodiment, the mutual followers refer to players mutually set as followers.

The battle game selection page of the quest screen shown in FIG. 3C displays the kinds of battle games being provided, i.e., a plurality of selection tabs 38 on which battle game names are displayed. Here, ten kinds of battle games are provided, and ten selection tabs 38 are displayed. Note that an opening condition is set for each battle game. The opening condition includes, for example, a condition that the player experience value, the player level, and the player rank are greater than or equal to prescribed values, and a condition that other prescribed battle games have been cleared.

A player can play battle games that satisfy the opening condition. Thus, in the battle game selection page, as shown in the drawing, keys are displayed on the selection tabs 38 of battle games that do not satisfy the opening condition. Furthermore, only the selection tabs 38 of battle games that satisfy the opening condition accept a player operation (tap).

In the battle game selection page, when a selection tab 38 is tapped, a play content selection page shown in FIG. 3D is displayed. In this play content selection page, it is possible to select a party to be used in a battle game from among the parties organized in the party organization screen. Furthermore, this embodiment provides, as kinds of play, a single-play in which a player plays a battle game alone and a multi-play in which the player plays the battle game with other players by carrying out communication. In the play content selection page, a single-play tab 40a and a multi-play tab 40b are displayed.

Figure 4A:
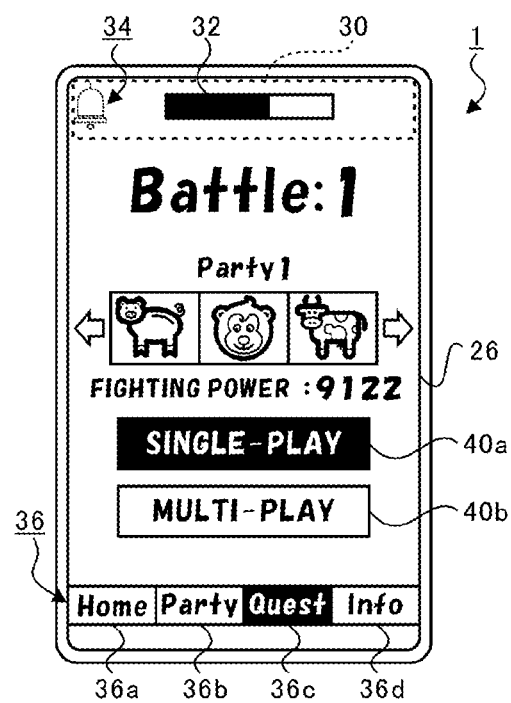
FIG. 4A is an illustration for explaining an example of the play content selection page when a single-play is selected.
Figure 4B:
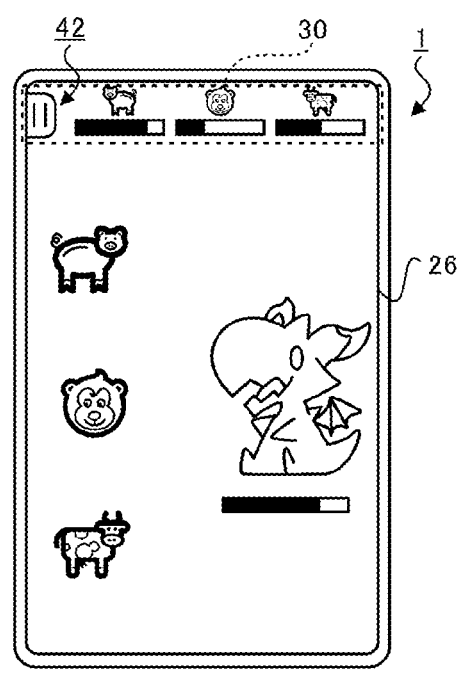
FIG. 4B is an illustration for explaining an example of a battle screen.
Figure 4C:
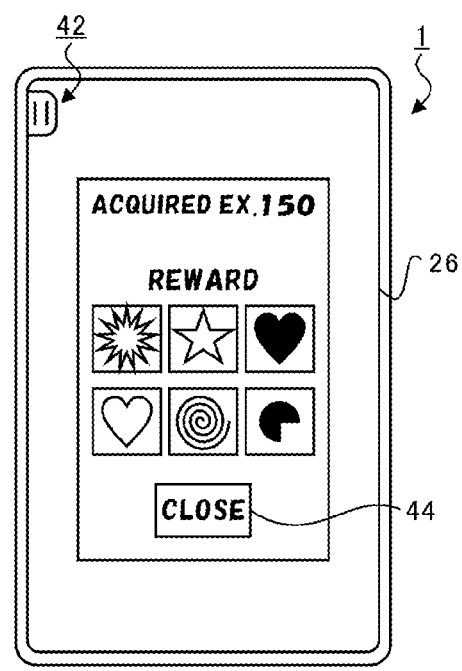
FIG. 4C is an illustration for explaining an example of a result screen.

FIG. 4A is an illustration for explaining an example of the play content selection page when a single-play is selected. FIG. 4B is an illustration for explaining an example of a battle screen. FIG. 4C is an illustration for explaining an example of a result screen. As shown in FIG. 4A, when the single-play tab 40a is operated in a state in which the kind of battle game and party to be used in the battle game are selected, a single-play is started. Note that ally characters included in a party to be used in a battle game, i.e., ally characters to be operated by a player in the battle game will be referred to as "player characters" below. In a battle game, a player operates the input unit 22 of the player terminal 1 to operate a player character.

During a battle game, the battle screen is displayed as shown in FIG. 4B. In the battle screen, player characters and an enemy character are displayed on the display 26. The player characters are operated in accordance with a player operation, inflict damage on the enemy character, or are damaged by the enemy character. Furthermore, the enemy character is operated by means of computer control, inflicts damage on the player characters, or is damaged by the player characters.

When damage points are given to the enemy character, the damage points are subtracted from the life points of the enemy character. Similarly, when damage points are given to a player character, the damage points are subtracted from the life points of the player character. When the life points of the enemy character becomes zero, the player wins the battle game, and when the life points of all of the player characters become zero, the player loses the battle game.

Here, in the battle screen, as shown in FIG. 4B, the menu bar 36, which is displayed in an ordinary screen, is hidden. Furthermore, in the header display area 30, the stamina display bar 32 is hidden, and the life points of each player character are displayed. Furthermore, in the battle screen, an operation tab 42 is displayed in the header display area 30. The display position of the operation tab 42 is the same as a position, in the header display area 30, at which at least part of the notification image 34 is displayed in an ordinary screen.

When the operation tab 42 is tapped during a battle game, the battle game is suspended. At this time, on the display 26, a suspension screen, which is not shown, is displayed in a superimposed fashion on the battle screen. A retire operation section and a resume operation section are provided in the suspension screen, and the player can select to retire from (terminate) or resume the battle game by tapping these operation sections.

When a battle game is normally terminated (normal termination), as shown in FIG. 4C, a result screen is displayed on the display 26. In this embodiment, the normal termination of a battle game includes three termination patterns, namely, an intermediate termination due to retirement, a winning termination in which winning is confirmed in the battle game, and a losing termination in which losing is confirmed in the battle game. Although FIG. 4C shows the result screen at the time of the winning termination as an example, the result screen is different for each termination pattern.

The result screen displays a termination operation section 44 shown as "Close", and when this termination operation section 44 is tapped, the display of the display 26 is switched from the battle screen to an ordinary screen. That is, the result screen is part of the battle screen. Note that an ordinary screen to which the result screen is switched may be a screen displayed immediately before switching to the battle screen, or may be a prescribed screen such as the home screen. In this way, when the display of the result screen is terminated, the battle game is terminated.

Figure 5A:
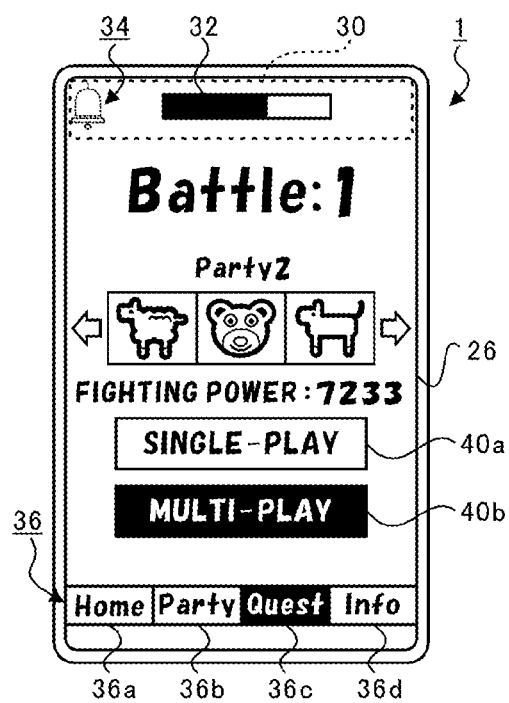
FIG. 5A is an illustration for explaining an example of the play content selection page when a multi-play is selected.
Figure 5B:
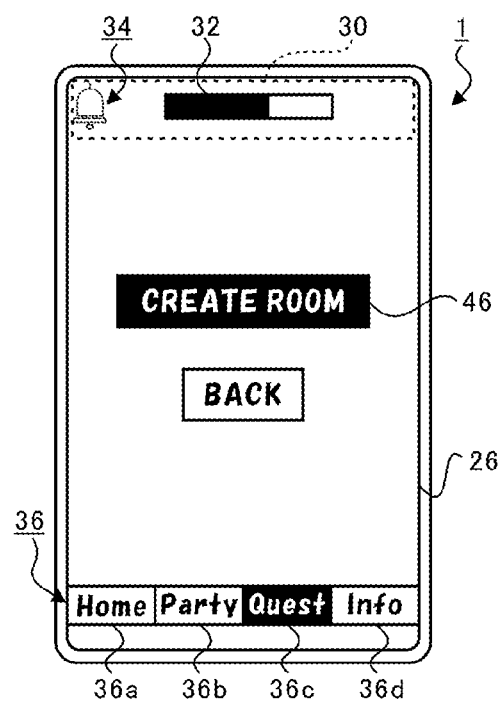
FIG. 5B is an illustration for explaining an example of a room selection page.
Figure 5C:
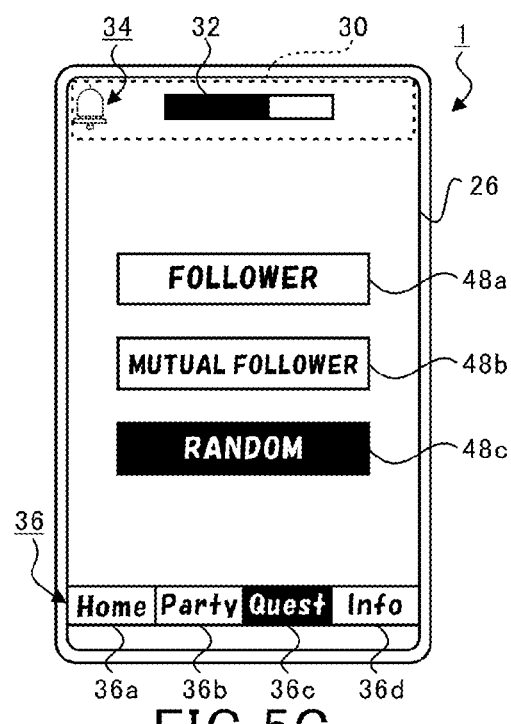
FIG. 5C is an illustration for explaining an example of a target person selection page.
Figure 5D:
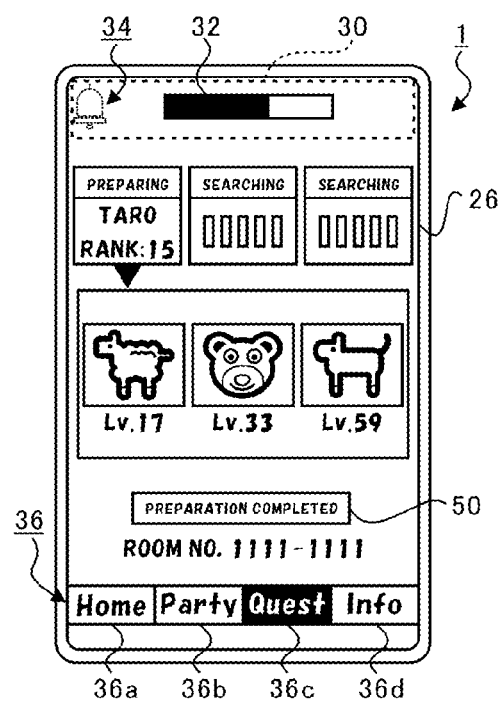
FIG. 5D is an illustration for explaining an example of a room detail page.

FIG. 5A is an illustration for explaining an example of the play content selection page when a multi-play is selected. FIG. 5B is an illustration for explaining an example of a room selection page. FIG. 5C is an illustration for explaining an example of a target person selection page. FIG. 5D is an illustration for explaining an example of a room detail page. As shown in FIG. 5A, it is assumed that the multi-play tab 40b is tapped in a state in which the kind of battle game and the party to be used in the battle game are selected.

In this case, as shown in FIG. 5B, the room selection page of the quest screen is displayed. In the room selection page, a room creation tab 46 shown as "Create room" is displayed. In this embodiment, the "room" refers to a place in which all players participating in a multi-play share information, or sometimes refers to an area secured at the server 100 for performing a multi-play.

A player can create a room by himself/herself by tapping the room creation tab 46 (inputting a request operation) when performing a multi-play. Note that a player who created a room in a multi-play will hereinafter be referred to as a host player. Furthermore, a player who entered the room created by another player will be referred to as a guest player.

When the room creation tab 46 is tapped, as shown in FIG. 5C, the target person selection page of the quest screen is displayed. In the target person selection page, a follower tab 48a shown as "Followers", a mutual follower tab 48b shown as "Mutual followers", and a random tab 48c shown as "Random" are displayed. In the target person selection page, a player who creates a room can select a target person (guest player) to be invited to the room created by himself/herself.

Specifically, when the follower tab 48a is operated, a player set by the player who created the room as a follower is set as a target person who can receive invitation information. Note that, in this embodiment, only a player set as a target person can receive the invitation information, and a player not set as a target person does not receive the invitation information. Furthermore, as will be described later in detail, a target person does not receive the invitation information unless a certain condition is satisfied. Thus, a target person is just a player who obtained the right to receive the invitation information.

When the mutual follower tab 48b is operated, a player set by the player who created the room as a mutual follower is set as a target person. Meanwhile, when the random tab 48c is operated, a target person is set from among all players registered in the server 100. The player terminal 1 of a player set as a target person receives invitation information when communication with the server 100 is carried out. The target person who received the invitation information can decide whether or not to enter the room, i.e., whether or not to participate in a multi-play. In this way, entering the room is limited to a player who received the invitation information.

For example, as shown in FIG. 5C, when the random tab 48c is tapped, as shown in FIG. 5D, the room detail page of the quest screen is displayed. In the room detail page, various kinds of information (room information) including party information indicating a party selected by a host player is displayed. Furthermore, in the room detail page of the host player, a start tab 50 shown as "Complete preparation" is displayed. When the host player taps the start tab 50, a multi-play is started.

Figure 6A:
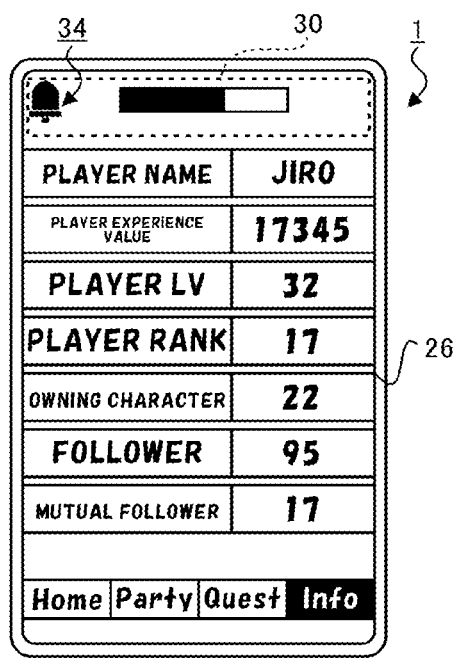
FIG. 6A is an illustration for explaining an example of reporting of the reception of invitation information in an ordinary screen.
Figure 6B:
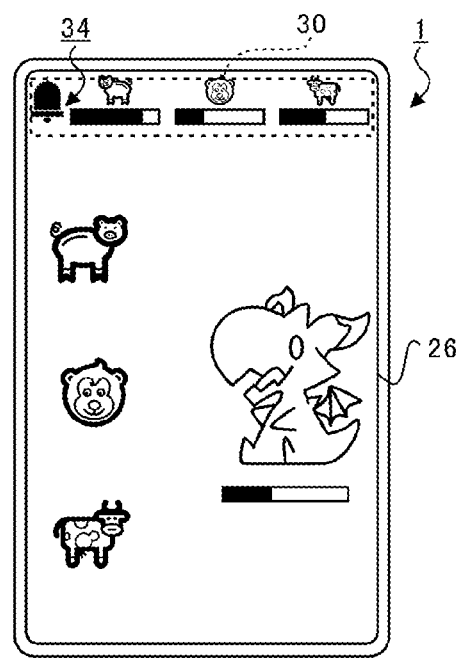
FIG. 6B is an illustration for explaining an example of reporting of the reception of invitation information in a battle screen.
Figure 6C:
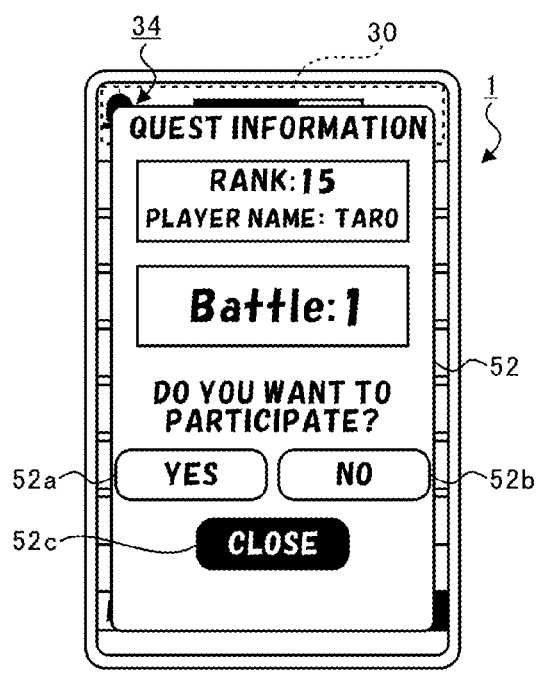
FIG. 6C is an illustration for explaining an example of an invitation information dialog.
Figure 6D:
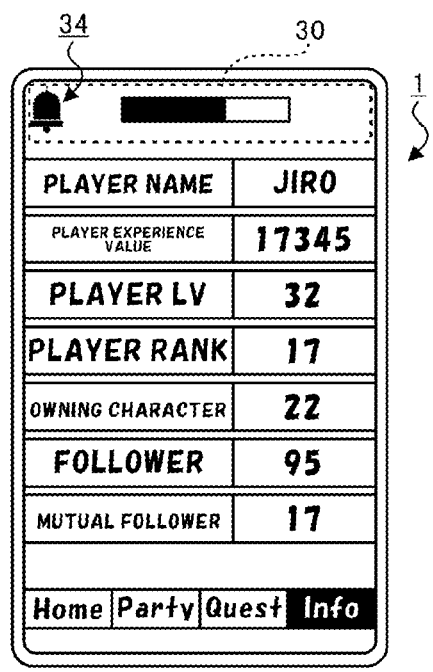
FIG. 6D is an illustration for explaining an example of a screen after a suspension operation.

FIG. 6A is an illustration for explaining an example of reporting of the reception of invitation information in an ordinary screen. FIG. 6B is an illustration for explaining an example of reporting of the reception of invitation information in the battle screen. FIG. 6C is an illustration for explaining an example of an invitation information dialog 52. FIG. 6D is an illustration for explaining an example of a screen after a suspension operation. For example, it is assumed that, as shown in FIG. 6A, the information confirmation screen is displayed on the display 26 at the player terminal 1 of a target person. In this state, when the player terminal 1 receives invitation information, as shown, in the header display area 30, the notification image 34 is switched from the non-reporting mode to the reporting mode.

Furthermore, it is assumed that, as shown in FIG. 6B, at the player terminal 1 of a target person, the battle screen is displayed on the display 26. As described above, in the battle screen, the operation tab 42 is normally displayed in the header display area 30 (see FIG. 4B), but when the player terminal 1 receives invitation information, as shown, the operation tab 42 is switched to the notification image 34 in the reporting mode.

When the notification image 34 displayed in the reporting mode is tapped, as shown in FIG. 6C, the invitation information dialog 52 is displayed (opened). The invitation information dialog 52 is displayed in a superimposed fashion on a screen displayed when the notification image 34 is tapped. Furthermore, in the case where the notification image 34 is tapped during a battle game, the battle game is suspended similarly to the case where the operation tab 42 is tapped, and the invitation information dialog 52 is displayed in a superimposed fashion on the battle screen displayed at the time of suspension.

In the invitation information dialog 52, for example, information such as the player rank or player name of a host player, or the kind of battle game to be played in a multi-play is displayed as quest information. Furthermore, in the invitation information dialog 52, a participation tab 52a shown as "Yes", a rejection tab 52b shown as "No", and a suspension tab 52c shown as "Close" are provided.

The participation tab 52a accepts a participation operation for applying for participation in a multi-play, i.e., for entering the room to which the target person has been invited. Furthermore, the rejection tab 52b accepts a rejection operation for rejecting participation in a multi-play. Furthermore, the suspension tab 52c accepts a suspension operation for suspending a decision on whether to participate in a multi-play.

For example, it is assumed that, after the invitation information dialog 52 is opened, the suspension tab 52c is tapped to input a suspension operation. When the suspension operation is input, as shown in FIG. 6D, the invitation information dialog 52 is closed (hidden). However, in the case where the suspension operation is input, the notification image 34 continues to be displayed in the reporting mode. Note that when the suspension operation is input during a battle game in a state in which the invitation information dialog 52 is displayed, the battle game is resumed at the same time as the invitation information dialog 52 is closed. Also in this case, the notification image 34 continues to be displayed in the reporting mode.

Figure 7A:
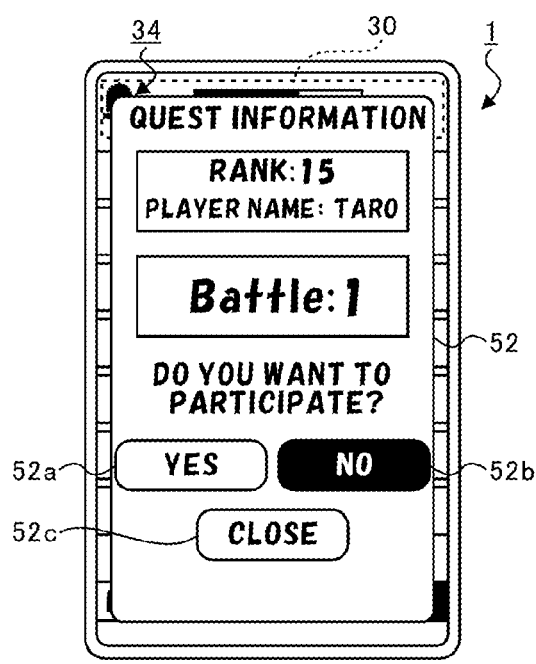
FIG. 7A is an illustration for explaining an example of a screen before a rejection operation.
Figure 7B:
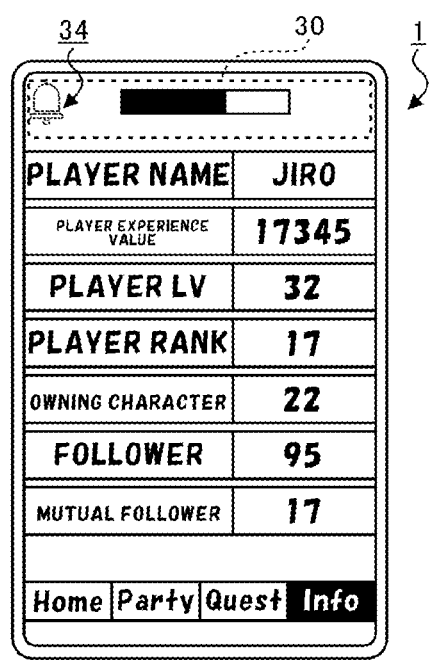
FIG. 7B is an illustration for explaining an example of a screen after the rejection operation.

FIG. 7A is an illustration for explaining an example of a screen before a rejection operation. FIG. 7B is an illustration for explaining an example of a screen after the rejection operation. As shown in FIG. 7A, it is assumed that, after the invitation information dialog 52 is opened, the rejection tab 52b is tapped to input a rejection operation. When the rejection operation is input, as shown in FIG. 7B, the notification image 34 is switched to the non-reporting mode at the same time as the invitation information dialog 52 is closed (hidden).

Note that in the case where a rejection operation is input during a battle game in a state in which the invitation information dialog 52 is displayed, the battle game is resumed at the same time as the invitation information dialog 52 is closed. In this case, in the header display area 30, the notification image 34 is hidden and the operation tab 42 is displayed.

Figure 7C:
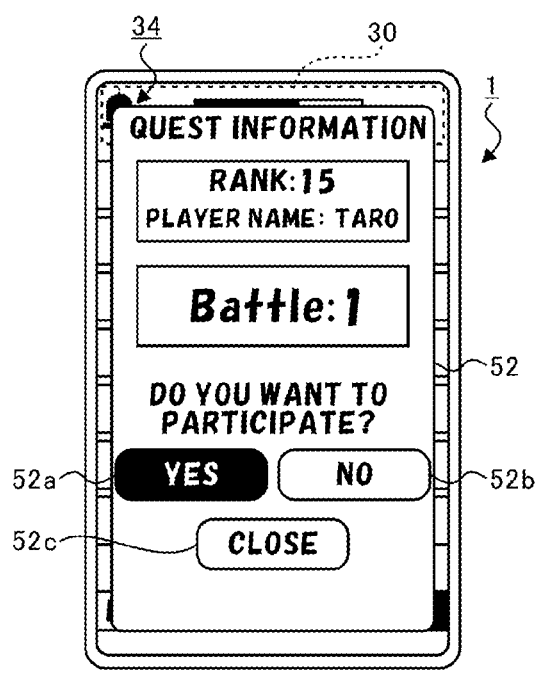
FIG. 7C is an illustration for explaining an example of a screen before a participation operation.
Figure 7D:
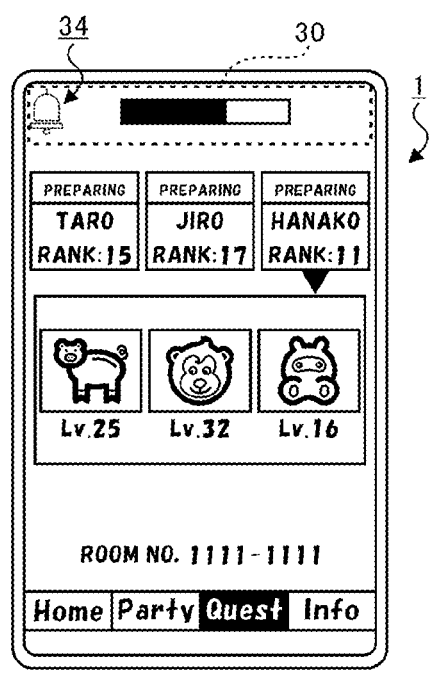
FIG. 7D is an illustration for explaining an example of a screen after the participation operation.

FIG. 7C is an illustration for explaining an example of a screen before a participation operation. FIG. 7D is an illustration for explaining an example of a screen after the participation operation. As shown in FIG. 7C, it is assumed that, after the invitation information dialog 52 is opened, the participation tab 52a is tapped to input a participation operation. When the participation operation is input, participation information is transmitted from the player terminal 1 of a target person to the server 100. When the participation information is input, the server 100 determines whether or not it is possible to enter a room to which the target person has been invited.

Specifically, with respect to the room to which the target person has been invited, in the case where a multi-play has already been started (play in progress), in the case where the number of guest players present in the room has reached an upper limit number (full), or in the case where the room no longer exists (deactivated), it is determined that entering the room is not possible. In this case, a dialog (room-entry-not-possible screen), which is not shown in the drawings, indicating that entering the room is not possible is displayed on the display 26 of the player terminal 1.

Meanwhile, it is assumed that the server 100 determines that entering the room is possible. In this case, the player information of the target person who transmitted the participation information is added to the room, and room information is updated. In this way, in the case where the target person has successfully entered the room by performing the participation operation, the target person is set as a guest player. Furthermore, when the room information is updated, a host player and all guest players receive the updated room information.

At this time, as shown in FIG. 7D, the room detail page is displayed on the player terminals 1 of the guest players (hereinafter referred to as "guest terminals"). According to the updated room information, the player information of the host player and the player information of all of the guest players are displayed in the room detail page. Note that, as described above, the start tab 50 is provided in the room detail page displayed on the player terminal 1 of the host player (hereinafter referred to as a "host terminal"). Meanwhile, as shown in FIG. 7D, the start tab 50 is not provided in the room detail page displayed on the guest terminals. Thus, it is only the host player who can start the multi-play.

Note that an operation section for accepting an operation for leaving the room is not provided in the room detail page displayed on the guest terminals. That is, the guest players cannot officially leave the room they entered. This suppresses a situation in which the guest players repeatedly enter and leave the room, and the early start of the multi-play is realized. However, an operation section for leaving the room may be provided in the room detail page of the guest terminals so that the guest players can leave the room. Furthermore, an operation section for intentionally deactivating the room may be provided in the room detail page displayed on the host terminal.

Note that, although not shown, when the notification image 34 displayed in the non-reporting mode is tapped, a dialog reporting that invitation information does not exist is displayed. As described above, the notification image 34 is switched to the non-reporting mode when a rejection operation is performed, and thus, even if the notification image 34 is operated immediately after the rejection operation is input, it is reported that invitation information does not exist. That is, once a target person rejects participation in a multi-play, the target person can no longer participate in the multi-play.

Meanwhile, in the case where the suspension operation described above is performed, the notification image 34 is displayed in the reporting mode even after the invitation information dialog 52 is closed. Thus, when the notification image 34 is tapped again after the suspension operation is performed, the invitation information dialog 52 is displayed again so that a target person can input a participation operation with respect to the multi-play to which the target person has been invited. However, as described above, in the case where the room to which the target person has been invited is in a state of "play in progress", "full", or "deactivated", it is determined that entering the room is not possible, and a dialog indicating that entering the room is not possible is displayed.

Figure 8A:
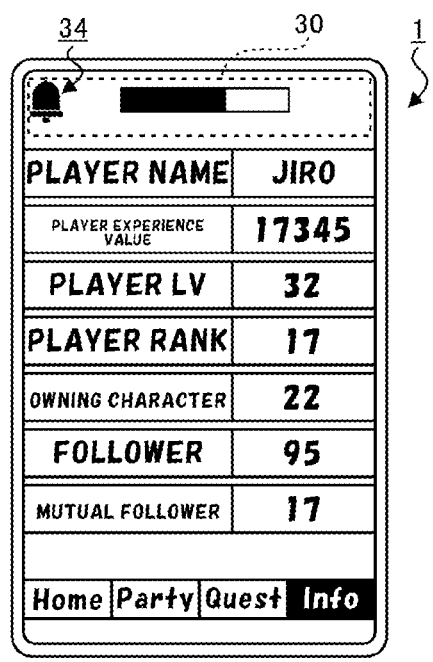
FIG. 8A is an illustration for explaining an example of a reporting mode for the reception of guidance information in an ordinary screen.
Figure 8B:
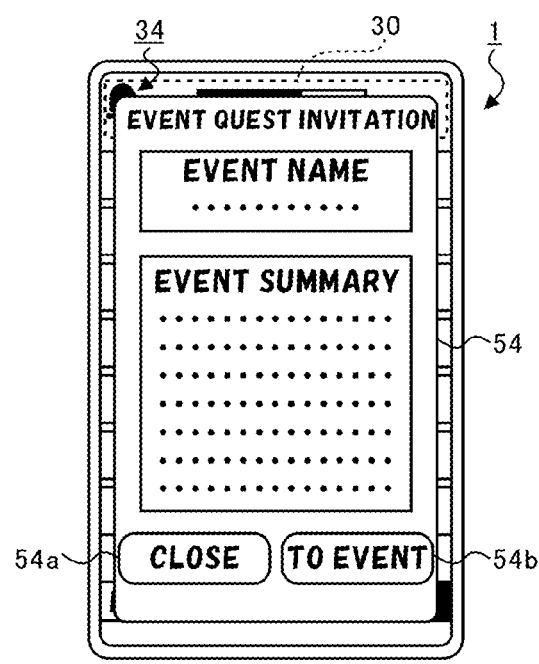
FIG. 8B is an illustration for explaining an example of a guidance information dialog.
Figure 8C:
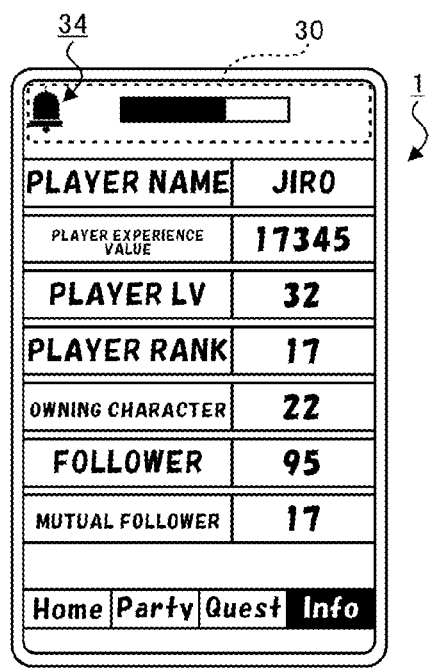
FIG. 8C is an illustration for explaining an example of a screen after a non-display operation.
Figure 8D:
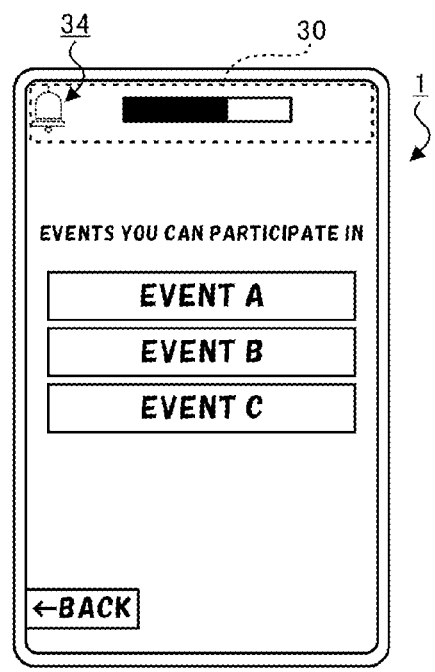
FIG. 8D is an illustration for explaining an example of a screen after a viewing operation.

FIG. 8A is an illustration for explaining an example of the reporting mode for the reception of guidance information in an ordinary screen. FIG. 8B is an illustration for explaining an example of a guidance information dialog 54. FIG. 8C is an illustration for explaining an example of a screen after a non-display operation. FIG. 8D is an illustration for explaining an example of a screen after a viewing operation. In this embodiment, the player terminal 1 receives guidance information of an event. The guidance information is set in the server 100 by an administrator, and the player terminal 1 receives the guidance information from the server 100 when communication with the server 100 is carried out.

Similarly to the reception of invitation information, the reception of guidance information is reported to a player by means of the notification image 34. For example, as shown in FIG. 8A, when guidance information is received in a state in which the information confirmation screen is displayed on the display 26, the notification image 34 is switched to the reporting mode. When the notification image 34 is tapped in this state, as shown in FIG. 8B, the guidance information dialog 54 is displayed (opened). The guidance information dialog 54 is displayed in a superimposed fashion on a screen being displayed when the notification image 34 has been tapped. Furthermore, in the case where the notification image 34 is tapped during a battle game, the battle game is suspended, and the guidance information dialog 54 is displayed in a superimposed fashion on a battle screen being displayed at the time of suspension.

In the guidance information dialog 54, for example, information related to a quest that is held regularly is displayed. Furthermore, in the guidance information dialog 54, a non-display tab 54a shown as "Close" and a viewing tab 54b shown as "To event" are provided. The non-display tab 54*a* accepts a non-display operation for terminating the display of the guidance information dialog 54. Furthermore, the viewing tab 54*b* accepts a viewing operation for viewing event information.

For example, it is assumed that, after the guidance information dialog 54 is opened, the non-display tab 54*a* is tapped to input a non-display operation. When the non-display operation is input, as shown in FIG. 8C, the guidance information dialog 54 is closed (hidden). However, in the case where the non-display operation is input, the notification image 34 continues to be displayed in the reporting mode. Note that when the non-display operation is input during a battle game in a state in which the guidance information dialog 54 is displayed, the battle game is resumed at the same time when the guidance information dialog 54 is closed. Also in this case, the notification image 34 continues to be displayed in the reporting mode. However, in the case where the non-display operation is input from the non-display tab 54*a*, the notification image 34 may be switched from the reporting mode to the non-reporting mode.

Meanwhile, it is assumed that, after the guidance information dialog 54 is opened, the viewing tab 54*b* is tapped to input a viewing operation. When the viewing operation is input, as shown in FIG. 8D, an event guidance screen showing information related to events in which the player can participate is displayed. Although the detailed description will be omitted, the player can input an operation in the event guidance screen, and the input operation makes it possible to participate in an event. Note that, when the event guidance screen is displayed, the notification image 34 is switched to the non-reporting mode.

As described above, the notification image 34 reports the reception of two kinds of information, namely, invitation information and guidance information. Here, regardless of the kind of received information, the notification image 34 is displayed in the common reporting mode. Note that it is assumed that the notification image 34 displayed in the reporting mode is tapped in the case where both the invitation information and the guidance information have been received. In this case, the invitation information dialog 52 is displayed on the display 26. That is, the invitation information (invitation information dialog 52) is displayed in preference to the guidance information (guidance information dialog 54).

However, the guidance information (guidance information dialog 54) may be displayed in preference to the invitation information (invitation information dialog 52) in the case where both of the invitation information and the guidance information have been received. Alternatively, the guidance information (guidance information dialog 54) and the invitation information (invitation information dialog 52) mat be displayed at the same time. Furthermore, the notification image 34 may report only the reception of the invitation information. Furthermore, the notification image 34 may report the reception of the invitation information and the reception of the guidance information in such a manner that they can be distinguished from each other. Note that, although it is assumed here that the player terminal 1 receives the guidance information, the guidance information is not necessary.

Here, in this embodiment, a multi-play can be performed by a plurality of players for the first time when a host player invites a target person and the target person enters a room as a guest player. Furthermore, authority to start the multi-play is given to the host player only. Thus, when the host player leaves the start tab 50 as is without operating it in a state in which the guest player has entered the room and the multi-play is ready to be started, the multi-play is not started forever and the guest player will get stressed. For this reason, in this embodiment, in order to reduce the case where the start tab 50 is left as is by the host player, target person extraction at the server 100 and the reception and reporting of invitation information at the player terminal 1 are performed, as will be described below. Hereinafter, first, a method of extracting a target person at the server 100 will be described, and then, a method of receiving and reporting invitation information at the player terminal 1 will be described.

(Target Person Extraction Method)

FIG. 9A is a diagram for explaining priority points. FIG. 9B is a diagram for explaining a priority points update condition. The server 100 stores player information for each player (player ID). The player information includes various kinds of information needed to play a game, such as a player experience value, a player level, a player rank, owned characters, followers, mutual followers, and party information.

Furthermore, priority information is included in the player information as information for extracting a target person who receives invitation information. The server 100 accumulates the player information including the priority information in the storage unit 118 for each player, and updates the priority information in accordance with an update condition set in advance.

In this embodiment, priority points are provided as the priority information. As shown in FIG. 9A, the maximum value and the minimum value of the priority points are set to 999 points and 0 points, respectively, and are updated within the range of 0 to 999. Furthermore, the priority points are set to 100 points as an initial value thereof, and the priority points are updated to the initial value when a prescribed update condition is satisfied.

In the case where the random tab 48*c* is tapped when a room is created, the server 100 randomly extracts a target person who can receive invitation information from among all players. At this time, the server 100 preferentially sets a player having higher priority points as a target person. Thus, it is easier for a player having higher priority points to receive invitation information.

Priority points update conditions are set as shown in FIG. 9B. Specifically, in the case where a player receives invitation information as a target person, "4" is subtracted from the priority points of the target person. Furthermore, in the case where a target person taps the notification image 34 to open the invitation information dialog 52 after receiving invitation information, "1" is added to the priority points of the target person.

Furthermore, in the case where a target person taps the participation tab 52*a* of the invitation information dialog 52 to perform a participation operation, but cannot participate in a multi-play, "4" is added to the priority points of the target person. Note that, as the cases where a target person cannot participate in a multi-play, there are cases where a target person cannot enter a room because a game is being played or the room is full, and where, after a target person enters a room, the room is deactivated before a multi-play is started. Although it is assumed here that the priority points of the target person are increased in the case where the target person cannot participate in the multi-play, instead of this, for example, the priority points of the target person may be increased in the case where the target person cannot enter the room.

Furthermore, it is assumed that a multi-play battle game is terminated normally (including intermediate termination due to retirement, winning termination, and losing termination). At this time, in the case where the priority points of a guest player at the time of battle game termination are greater than an initial value, the priority points of the guest player are reset to the initial value.

Furthermore, in the case where a player creates a room as a host player, "4" is subtracted from the priority points of the host player. Furthermore, at this time, in the case where the random tab 48c is tapped to randomly extract a target person who receives invitation information, "1" is added to the priority points of the host player. Furthermore, in the case where a multi-play is started, "1" is added to the priority points of the host player.

Furthermore, in the case where a multi-play battle game is terminated as winning termination or losing termination, "3" is added to the priority points of all players who inflicted damage on an enemy character (hereinafter referred to as "damage inflicted") that is greater than or equal to 20% of the entire damage.

According to the update condition described above, for example, in the case where a target person tries to participate in a multi-play but cannot participate in the multi-play, "Receive invitation information" (−4), "Open invitation information" (+1), and "Participation in multi-play is not possible" (+4) are applied, and the priority points of the target person are increased by "1" as compared to before the reception of invitation information. This makes it possible for a player who tries to participate in a multi-play but cannot participate in the multi-play to receive invitation information more easily. Furthermore, when a multi-play battle game is terminated normally in a state in which the priority points exceed an initial value, the priority points are reset to the initial value. This equally gives many players an opportunity to receive invitation information.

Furthermore, when the damage inflicted by a guest player who participated in a multi-play becomes greater than or equal to 20% of the entire damage, "Receive invitation information" (−4), "Open invitation information" (+1), and "Damage inflicted is greater than or equal to 20%" (+3) are applied, and the priority points of the guest player becomes plus/minus zero as compared to before the participation in the multi-play. Meanwhile, when the damage inflicted by a guest player is less than 20% of the entire damage, "Receive invitation information" (−4) and "Open invitation information" (+1) are applied, and "3" is subtracted from the priority points of the guest player as compared to before the participation in the multi-play. That is, the priority of a guest player who is not cooperative in a multi-play becomes low, and it becomes more difficult for the guest player to be set as a target person. In this way, by changing the priority points on the basis of the game result of a communication game, it becomes easier for a cooperative player to be set as a target person.

Furthermore, although "4" is subtracted from the priority points of a host player when a room is created, the priority points of the host player are not decreased if a multi-play is started and the damage inflicted by the host player becomes greater than or equal to 20% of the entire damage. Specifically, in the case where a target person is randomly extracted, "Create room" (−4), "Randomly extract target person" (+1), "Start multi-play" (+1), and "Damage inflicted is greater than or equal to 20%" (+3) are applied, and the priority points of the host player are increased by "1" as compared to before the room is created. Furthermore, in the case where a target person is set as a follower or a mutual follower, "Create room" (−4), "Start multi-play" (+1), "Damage inflicted is greater than or equal to 20%" (+3) are applied, and the priority points of the host player become plus/minus zero as compared to before the room is created. Thus, in the case where a player starts a multi-play appropriately and plays the game cooperatively as a host player, the player is considered as an excellent player, and an opportunity to participate in the multi-play as a guest player is also ensured for that player.

Meanwhile, in the case where a host player creates a room but does not start a multi-play, for example, "Create room" (−4) and "Randomly extract target person" (+1) are applied, and the priority points of the host player are decreased by "3" as compared to before the room is created. Furthermore, also in the case where the damage inflicted by the host player is less than 20% of the entire damage, for example, "Create room" (−4), "Randomly extract target person" (+1), and "Start multi-play" (+1) are applied, and the priority points of the host player are decreased by "2" as compared to before the room is created. Thus, it becomes more difficult for a player who leaves a room as is, a player who deactivates a room intentionally, or a player who is not cooperative to participate in a multi-play as a guest player.

According to this embodiment in which update conditions are set as described above, it becomes easier for a player who is considered to be cooperative or excellent to receive invitation information, and it is possible to realize appropriate matching. Hereinafter, processing executed by the server 100 when a target person is set from among all players will be described.

(List Update Processing at the Server 100)

FIG. 10 is a first diagram for explaining list update processing. The storage unit 118 of the server 100 is provided with a player information storage unit 160 (see FIG. 27) that stores player information for each player. The server 100 executes player information update processing for updating player information in the player information storage unit 160 every time communication with the player terminal 1 is carried out. Furthermore, an extraction list is provided in the storage unit 118. The server 100 always executes list update processing for updating the extraction list on the basis of the player information in the player information storage unit 160.

For example, in the extraction list provided in the storage unit 118, as shown in FIG. 10, a player (player ID), invitation information (room number), a status flag, and a wait time are set in each of many storage areas to which addresses have been assigned. Note that the extraction list and the information to be set in the extraction list as shown in FIG. 10 are merely examples. For example, priority points and a player rank are not necessary as the information to be set in the extraction list, and it is possible to design the information to be set in the extraction list, as appropriate. Furthermore, in FIG. 10, numbers listed as addresses correspond to priority orders and a storage area having a smaller number has a higher priority order.

Furthermore, an extraction list is provided for each player rank. For example, a plurality of extraction lists are provided, such as an extraction list in which the players of player ranks 1-10 are listed and an extraction list in which the players of player ranks 11-20 are listed. Here, descriptions will be made by using an extraction list in which the players of player ranks 11-20 are listed.

In an extraction list, a player having higher priority points is listed in a storage area to which an address having a higher priority order has been assigned. For example, it is assumed that the highest priority points among the players of player ranks 11-20 are "165". Furthermore, it is assumed that there are five players who have the highest priority points. In this case, the player information of the players having the "165" priority points are set in the storage areas of addresses 1 to 5. Note that addresses (priority orders) are determined in accordance with a prescribed condition in the case where there are a plurality of players having the same priority points. As described above, in the list update processing, processing for listing players in an extraction list in descending order of priority points on the basis of the player information in the player information storage unit 160 is executed.

FIG. 11 is a second diagram for explaining the list update processing. For example, it is assumed that one of the player terminals 1 transmits request information for requesting the creation of a room and the transmission of invitation information. Note that the request information is provided for each of the follower tab 48a, the mutual follower tab 48b, and the random tab 48c in an identifiable manner. Upon receiving the request information, the server 100 executes room setting processing for creating and setting a room. At this time, in the case where the received request information is request information for the random tab 48c, a target person is set as follows in the list update processing.

That is, as shown in FIG. 11, invitation information is set sequentially in a prescribed number (100 in this case) of storage areas to which addresses having higher priority orders have been assigned. However, storage areas to which the invitation information is set are determined on the basis of status flags.

Specifically, the status flags are used to identify the reception status of invitation information, and here, the reception status is identified as one of four reception statuses, namely, "setting possible", "reception possible", "reception not possible", and "received". The reception status "setting possible" indicates that it is possible to set the invitation information. In the case where a storage area in which a status flag is to be stored is blank (in the case where the status flag is off), the reception status of the storage area is set as "setting possible". Furthermore, the reception status "reception possible" indicates that the reception of set invitation information is permitted in the case where reception confirmation is performed by the player terminal 1 set as a target person (hereinafter referred to as a "target person terminal"). Furthermore, the reception status "reception not possible" indicates that the reception of set invitation information is limited in the case where reception confirmation is performed by the target person terminal. Furthermore, the reception status "received" indicates that the target person terminal has received invitation information.

The server 100 sequentially searches storage areas to which addresses having higher priority orders have been assigned for storage areas the reception statuses of which are "setting possible", i.e., the status flags of which are blank, and sets invitation information therein. For example, in the state shown in FIG. 10, the status flags of all storage areas having addresses 1-100 are blank. In this state, when request information for the random tab 48c is received from the player terminals 1 of players having player ranks 11-20, as shown in FIG. 11, invitation information is set in the storage areas having addresses 1-100.

Furthermore, status flags are set in storage areas in which invitation information has been set. At this time, the status flag indicating "reception possible" is set in storage areas having the highest priority point among the storage areas in which invitation information has been set. Furthermore, the status flag indicating "reception not possible" is set in the other storage areas in which invitation information has been set. Furthermore, wait times are set in individual storage areas to which the status flag "reception not possible" has been set.

The wait time is a time until the reception status is switched from "reception not possible" to "reception possible". That is, in the case where the status flag "reception not possible" is set, the status flag is switched to "reception possible" when the wait time elapses. Individual storage areas are grouped by priority points, and the same wait time is set in storage areas classified into the same group. Furthermore, a shorter wait time is set in a group having higher priority points as compared to a group having lower priority points.

In the example shown in FIG. 11, the wait time is set to five seconds for a group having "164" priority points, and the wait time is set to 10 seconds for a group having "163" priority points. In this way, the wait time becomes shorter as the priority points increase, and becomes longer as the priority points decrease.

FIG. 12 is a third diagram for explaining the list update processing. It is assumed that, for example, five seconds elapse after invitation information, status flags, and wait times have been set as shown in FIG. 11. As described above, the wait times are set to five seconds for the storage areas having addresses 6-99. When the wait time of five seconds elapses, as shown in FIG. 12, the status flags of the storage areas having addresses 6-99 are switched to "reception possible". Note that, for the storage area having address 100 to which the wait time of 10 seconds was originally set, the reception status thereof remains as "reception not possible", and the wait time is updated to five seconds.

As described above, in the case where the reception status is "reception not possible", invitation information has been set, but the player terminal 1 cannot receive the invitation information. That is, even if the player terminal 1 performs reception confirmation in the state in which the invitation information has been set, the player terminal 1 does not receive the invitation information. In this way, when setting a target person by setting invitation information, the server 100 allows a player having higher priority points to receive the invitation information earlier. This makes it easier for a player having a higher priority order to participate in a multi-play.

Furthermore, it is assumed that another player terminal 1 newly transmits request information for the random tab 48c in the state described above. In this case, as shown in FIG. 12, invitation information is set in the storage areas having addresses 101-200. Note that all of the storage areas having addresses 101-200 have 163 priority points. Thus, here, the status flag "reception possible" is set in all of the storage areas having addresses 101-200.

FIG. 13 is a fourth diagram for explaining the list update processing. For example, it is assumed that target person terminals set as the target persons of the storage areas having address 1 and address 3 perform the reception confirmation of invitation information in the state shown in FIG. 12. In this case, the target person terminals of both players receive the invitation information set in the storage areas. When the invitation information is received, the server 100 switches the status flags from "reception possible" to "received", as shown in the upper figure of FIG. 13.

Furthermore, as described above, when a target person receives invitation information, "4" is subtracted from the priority points of the target person. The server 100 updates the priority points of the storage areas having address 1 and address 3 to "161". Then, the server 100 executes sort processing on the basis of the priority points. As a result of this sort processing, the information stored in the storage areas having address 1 and address 3 is moved to addresses (storage areas) having lower priority orders, as shown in the lower figure of FIG. 13.

Note that, as will be described later in detail, in the case where request information for the follower tab 48a is transmitted, invitation information is set in the storage area of a player set as a follower. Furthermore, in the case where request information for the mutual follower tab 48b is transmitted, invitation information is set in the storage area of a player set as a mutual follower.

With the list update processing described above, it becomes easier for a player having higher motivation to participate in a multi-play to receive invitation information. By a player having higher motivation receiving invitation information, the time until the multi-play is started becomes shorter.

Furthermore, in this embodiment, invitation information is received in accordance with a game play situation at the player terminal 1. Specifically, the reception of invitation information is reported in the case where a player is playing a battle game (single-play) or under a situation in which it is considered that the player is gazing at a screen to play a game. That is, the reception of invitation information is reported to the player terminal 1 under a situation in which it is considered that the player has high motivation to participate in a multi-play and that the player is highly responsive to the invitation. This shortens the time until players participating in a multi-play have gathered, thereby making it possible to shorten the time until the multi-play is started.

(Play State of Player Terminal 1)

FIG. 14A is a diagram for explaining the play states of the player terminal 1. FIG. 14B is a diagram for explaining the timings of the reception confirmation of invitation information. The player terminal 1 updates a play state on the basis of a game play situation and the reception status of invitation information. As shown in FIG. 14A, five play states, namely, a reception-possible state, an unopened state, an opened state, a participating state, and a reception-not-possible state, are managed by the player terminal 1. That is, at the player terminal 1, the play state is set to one of the five play states described above. The player terminal 1 executes processing related to the reception of invitation information on the basis of the set play state.

The receivability of invitation information is associated with each play state. The player terminal 1 can receive invitation information from the server 100 in the case where the play state is set to the reception-possible state or the unopened state. That is, it is considered that the reception-possible state and the unopened state among the play states are permitted states in which the reception of invitation information has been permitted. Meanwhile, the player terminal 1 does not receive invitation information from the server 100 in the case where the play state is set to the opened state, the participating state, or the reception-not-possible state. That is, it is considered that the opened state, the participating state, and the reception-not-possible state among the play states are not-possible states in which the reception of invitation information is not possible.

For example, it is assumed that a player is set as a target person at the server 100, and invitation information for the player is set in the server 100. At this time, the player terminal 1 receives the invitation information from the server 100 if the play state has been set to the reception-possible state or the unopened state at the player terminal 1.

Meanwhile, even if invitation information has been set in the server 100, the player terminal 1 does not receive the invitation information from the server 100 if the play state has been set to the opened state, the participating state, or the reception-not-possible state. In other words, the player terminal 1 does not perform the reception confirmation of invitation information in the case where the play state has been set to the opened state, the participating state, or the reception-not-possible state.

Note that, although a detailed description will be omitted, even if the play state is a permitted state, depending on set invitation information, there are cases where the player terminal 1 does not receive the invitation information. For example, in the case where a player participates in a multi-play battle game as a guest player, the player does not receive invitation information for a battle game of the same kind as the battle game above for 60 minutes after the multi-play in which the player has participated is terminated. In this way, although it is basically possible to receive invitation information in the case where the play state is a permitted state, the reception of some kinds of invitation information may be limited depending on the content of the invitation information.

As shown in FIG. 14A, a setting condition is provided for each play state described above. The player terminal 1 determines whether or not the setting condition is satisfied and sets the play state on the basis of the result of the determination. As setting conditions for the reception-possible state, a condition that invitation information has not been received, a condition that the player has not entered a multi-play room, and a condition that the setting condition for the reception-not-possible state, which will be described later, is not satisfied are provided. As setting conditions for the unopened state, a condition that invitation information has been received and a condition that the invitation information dialog 52 is unopened are provided.

As setting conditions for the opened state, a condition that the invitation information dialog 52 is displayed and a condition that a suspension operation has been input (the suspension tab 52c of the invitation information dialog 52 has been tapped) are provided. As a setting condition for the participating state, a condition that the player is currently in the multi-play room is provided. As setting conditions for the reception-not-possible state, a condition that five minutes have not elapsed after the normal termination of a multi-play and a condition that a prescribed time has not elapsed after a rejection operation are provided. Note that in the case where a rejection operation is input twice within 30 minutes, the reception-not-possible state is maintained for 60 minutes after the second rejection operation, and in other cases, the reception-not-possible state is maintained for five minutes after the rejection operation.

In the case where the play state is set to a permitted state, the player terminal 1 performs the reception confirmation of invitation information with respect to the server 100. At this time, if invitation information for the player terminal 1 has been set, the player terminal 1 receives the set invitation information. That is, the reception of the invitation information is triggered when the reception confirmation of the invitation information is performed. Thus, strictly speaking, it is considered that whether or not the reception confirmation of the invitation information can be performed is set in advance for each play state.

As described above, at the server 100, a player having high motivation to participate in a multi-play is set as a target person. However, there are cases where even such a player having high motivation cannot immediately participate in a multi-play depending on a game play situation at the player terminal 1. For example, motivation to participate in a multi-play becomes lower while moving in a short time, immediately after a multi-play is terminated, etc. If the player participates in a multi-play in a state in which motivation to participate in the multi-play is low, it is likely that the player does not play the game cooperatively.

In this embodiment, invitation information is received in accordance with a game play situation at the player terminal 1. That is, even if invitation information has been set in the server 100, the invitation information is not received depending on a game play situation at the player terminal 1. That is, in the case where there is a high possibility that the player does not participate in a multi-play, the player terminal 1 does not even receive the invitation information. This reduces the possibility that a player whose motivation to participate in a multi-play is low participates in the multi-play. Furthermore, it becomes possible not to make the player feel annoyed because the player does not receive invitation information many times in a state in which the player cannot participate in a multi-play.

Here, the reception confirmation of invitation information at the player terminal 1 is performed as shown in FIG. 14B. That is, in the case where the battle screen is displayed on the display 26 of the player terminal 1, the reception confirmation of invitation information is performed every 15 seconds. However, in the case where an ordinary screen (screen other than the battle screen) transitions to the battle screen in the display 26, a first timing at which the reception confirmation of invitation information is performed after the screen transition is randomly determined as 1-15 seconds by a draw.

Furthermore, in the case where an ordinary screen (screen other than the battle screen) is displayed on the display 26 of the player terminal 1, the reception confirmation of invitation information is performed every 10 seconds. However, in the display 26, in the case where the battle screen transitions to an ordinary screen, in the case where an ordinary screen transitions to another ordinary screen, or in the case where pages transition in an ordinary screen, a first timing at which the reception confirmation of invitation information is performed after the screen transition is randomly determined as 1-10 seconds by a draw.

As described above, by randomly determining a first timing at which the reception confirmation of invitation information is performed after the screen transition, it is possible to prevent a player from performing an operation for transitioning a screen to merely receive the invitation information. This suppresses communication with the server 100 from being unnecessarily carried out, thereby reducing the load on the server 100.

Furthermore, the intervals of the reception confirmation of invitation information while the battle screen is displayed are set longer than those while an ordinary screen is displayed. This suppresses a battle game from being unnecessarily executed in order to receive invitation information, thereby making it possible to suppress an increase in the load on the server 100.

Next, the communication processing of the player terminal 1 and the server 100 for executing the multi-play described above will be described. Note that what will be described here are basic communication processing for the progress of a game and an example of main communication processing related to a multi-play, and descriptions about other kinds of processing will be omitted.

(Communication Processing of the Player Terminal 1 and the Server 100)

Figure 15:
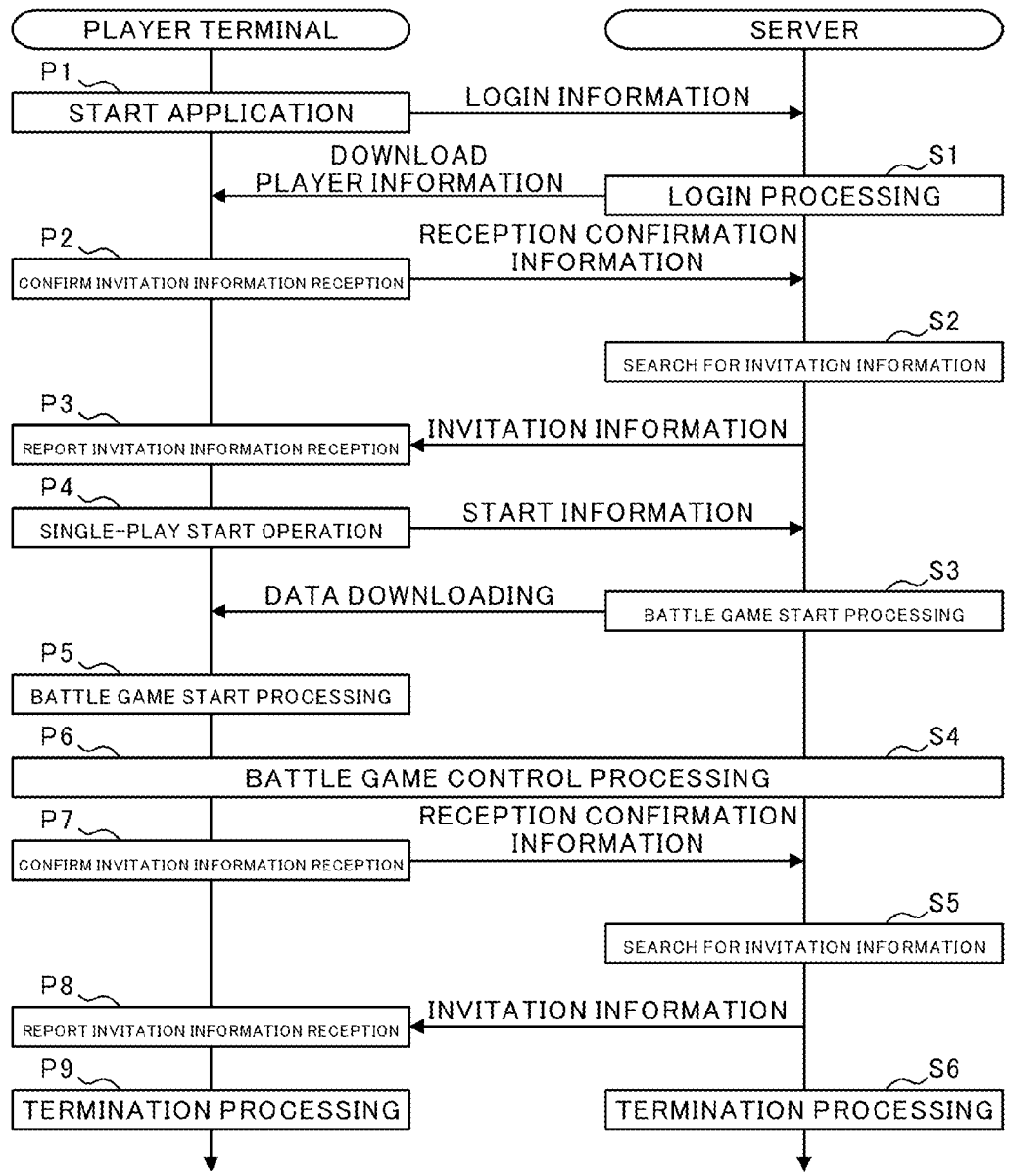
FIG. 15 is a sequence diagram for explaining the basic processing of the player terminal and the server.

FIG. 15 is a sequence diagram for explaining the basic processing of the player terminal 1 and the server 100. Note that in the following descriptions, processing at the player terminal 1 is indicated as Pn (n is an arbitrary integer) in the case where no distinction is made among a host terminal, a guest terminal, and a target person terminal. Furthermore, processing at the server 100 is indicated as Sn (n is an arbitrary integer). When a player starts a game application at the player terminal 1 (P1), login information is transmitted from the player terminal 1 to the server 100. Upon receiving the login information, the server 100 identifies the player terminal 1 and executes login processing (S1). Here, the server 100 allows the identified player terminal 1 to download player information corresponding to that player terminal 1 from the storage unit 118.

Furthermore, in the case where the play state is a permitted state, the player terminal 1 performs the reception confirmation of invitation information at prescribed time intervals (P2). Here, the player terminal 1 transmits reception confirmation information to the server 100. Upon receiving the reception confirmation information, the server 100 searches an extraction list for invitation information for the player terminal 1 (S2). At this time, if the invitation information has been set and the reception status has been set to "reception possible", the player terminal 1 receives the invitation information. Upon receiving the invitation information, the player terminal 1 displays the notification image 34 in the reporting mode and reports that the invitation information has been received (P3).

Furthermore, it is assumed that, at the player terminal 1, the single-play tab 40*a* is tapped in the play content selection page (see FIG. 4A) and an operation for starting a single-play is performed (P4). In this case, start information is transmitted from the player terminal 1 to the server 100. Note that this start information includes information related to a party selected by the player, battle game kind information, etc. When the start information is input, the server 100 executes battle game start processing needed for starting a battle game (S3). Here, for example, the server 100 secures an area in the memory 112 for the progress of the battle game, stores information input from the player terminal 1, and reads a prescribed program from the storage unit 118 into the memory 112. Furthermore, the server 100 performs setting so that the player terminal 1 can receive data needed for the execution of the battle game.

Furthermore, the player terminal 1 also executes battle game start processing needed for starting a battle game (P5). Here, for example, the player terminal 1 secures an area in the memory 12 for the progress of the battle game, stores game play information, and stores, in the memory 12, a program and image data downloaded from the server 100. Note that the program, etc. needed for the battle game may be read from the storage unit 18 into the memory 12.

When the preparation for the battle game is completed as described above, both the player terminal 1 and the server 100 execute battle game control processing for controlling the single-play battle game at the same time in parallel (P6, S4). In this battle game control processing, update processing for updating various kinds of information is executed repeatedly on a frame basis. Note that the number of frames is not particularly limited, and the number of frames in one second is, for example, 30-60. Thus, in a battle game, the player terminal 1 and the server 100 update information at intervals of about 16 ms (milliseconds) to 33 ms.

Furthermore, in the update processing, the transmission and reception of update information are performed between the player terminal 1 and the server 100. Here, although the update processing and the transmission and reception of the update information are performed on a frame basis, the update processing and the transmission and reception of the update information may be performed in a period shorter or longer than that on a frame basis. Furthermore, also while a single-play battle game is executed, the reception confirmation of invitation information at the player terminal 1 (P7), the search for invitation information at the server 100 (S5), and reporting of the reception of invitation information at the player terminal 1 (P8) may be regularly executed. Then, when a battle game termination condition is satisfied, each of the player terminal 1 and the server 100 executes termination processing for terminating the battle game (P9, S6). In the termination processing of the player terminal 1 (P9), for example, the result screen is displayed on the display 26. Furthermore, in the termination processing of the server 100 (S6), for example, various kinds of player information, such as an item acquired in the battle game, a player experience value, and a character experience value, are updated.

Figure 16:
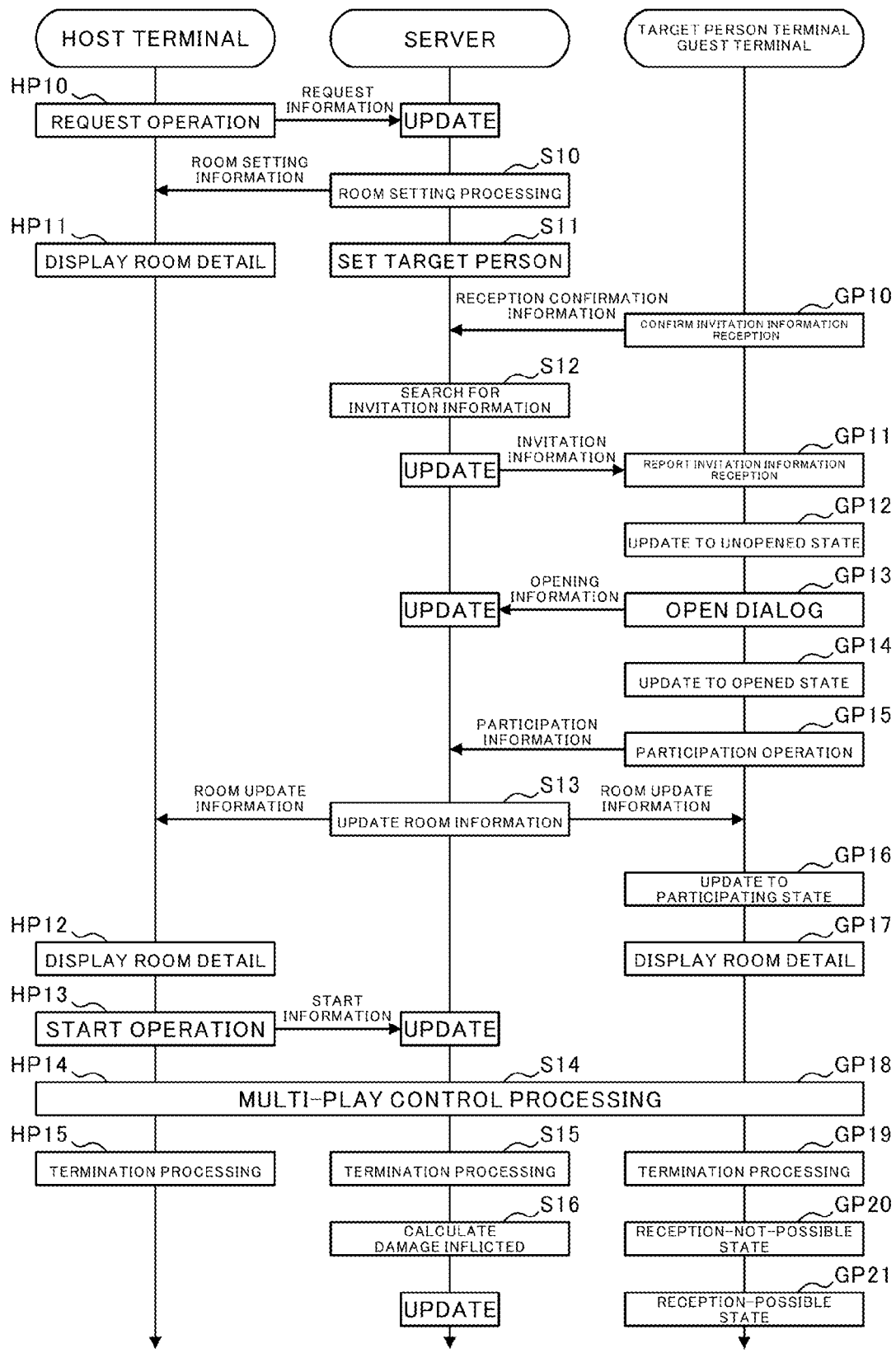
FIG. 16 is a sequence diagram for explaining the processing of the player terminal and the server in the case where a multi-play is executed.

FIG. 16 is a sequence diagram for explaining the processing of the player terminal 1 and the server 100 in the case where a multi-play is executed. Note that in the following descriptions, processing at a host terminal is indicated as HPn (n is an arbitrary integer), and processing at the target person terminal and the guest terminal is indicated as GPn (n is an arbitrary integer).

It is assumed that, at the player terminal 1 (host terminal), the room creation tab 46 is tapped and a request operation is input (HP10). When the request operation is input, the player terminal 1 (host terminal) transmits, to the server 100, request information for requesting the creation of a room and the transmission of invitation information. Note that the request information includes information related to a party selected by a player, information indicating the kind of battle game, information indicating a tapped operation section, etc.

Upon receiving the request information, the server 100 executes points update processing (shown as UPDATE in the figure) for updating the priority points in the player information storage unit 160. Here, "4" is subtracted from the priority points of the host player who transmitted the request information. Furthermore, as will be described later in detail, when the points update processing is executed in the player information storage unit 160, priority points in an extraction list are also updated similarly to the player information storage unit 160. Furthermore, in the extraction list, sort processing is executed on the basis of the updated priority points.

Furthermore, upon receiving the request information, the server 100 executes room setting processing for creating and setting a room (S10). Here, a processing area for executing a multi-play is secured, i.e., a room is secured, and various kinds of information included in the request information are stored in this room. Furthermore, the room number of a created room is set. The host terminal receives room setting information set in the room setting processing and displays a room detail page on the display 26 (HP11).

Furthermore, the server 100 sets a target person (S11). Here, invitation information, a status flag, and the counter value of a wait counter are set in the extraction list to set the target person. Then, when the target person terminal performs the reception confirmation of invitation information (GP10), reception confirmation information is transmitted to the server 100. Upon receiving the reception confirmation information, the server 100 searches for whether the invitation information has been set for the target person (S12). Here, since the invitation information has been set, the server 100 updates the reception status (status flag) of the target person to "received". Furthermore, the server 100 executes points update processing and subtracts "4" from the priority points of the target person who has received the invitation information.

Upon receiving the invitation information, the target person terminal displays the notification image 34 in the reporting mode and reports that the target person terminal has received the invitation information (GP11). Furthermore, the target person terminal updates the play state from the reception-possible state to the unopened state (GP12). Then, when the target person taps the notification image 34 and the invitation information dialog 52 is opened (GP13), opening information is transmitted to the server 100. When the server 100 receives the opening information, the server 100 executes points update processing. Here, "1" is added to the priority points of the target person. Furthermore, at the target person terminal, the play state is updated to the opened state (GP14).

Then, when the participation tab 52a of the invitation information dialog 52 is tapped at the target person terminal, participation information is transmitted from the target person terminal to the server 100 (GP15). Note that the participation information includes information related to a party set by the target person, etc. Upon receiving the participation information, the server 100 determines if it is possible to enter the room and updates room information if it is possible to enter the room (S13). Here, at the server 100, the updated room information (room update information) is set so as to be received by the host terminal and the target person terminal.

Note that although a single target person terminal (guest terminal) is indicated in FIG. 16, the same processing with respect to a single room is executed at a plurality of target person terminals (guest terminals). Thus, in the case where one of the target person terminals enters the room, the player terminals 1 of all players in the room receive the room update information.

Upon receiving the room update information from the server 100, the host terminal updates and displays the room detail page (HP12). Furthermore, the target person terminal also receives the room update information. Note that, here, the player terminal 1 (target person terminal) after receiving the room update information is referred to as a guest terminal. Upon receiving the room update information, the guest terminal updates the play state to the participating state (GP16) and displays the room detail page on the display 26 (GP17).

Then, when the start tab 50 of the room detail page is tapped to input an operation for starting a multi-play at the host terminal (HP13), start information is transmitted to the server 100. The server 100 executes points update processing when the start information is input. Here, "1" is added to the priority points of the host player.

Furthermore, each of the host terminal, the server 100, and the guest terminal executes the battle game start processing (not shown) described above, and then executes multi-play control processing for controlling the multi-play at the same time in parallel (HP14, S14, GP18). In this multi-play control processing, update processing for updating various kinds of information is executed repeatedly on a frame basis. In this update processing, the transmission and reception of update information are performed among the host terminal, the guest terminal, and the server 100. Then, when a battle game termination condition is satisfied, each of the host terminal, the guest terminal, and the server 100 executes termination processing for terminating the battle game (HP15, S15, GP19).

When the multi-play is terminated, the server 100 calculates damage inflicted with respect to the entire damage for each player who participated in the multi-play (S16). Then, the server 100 executes points update processing on the basis of the calculated damage inflicted. Here, "3" is added to the priority points of a player who inflicted damage greater than or equal to 20% of the entire damage. Meanwhile, at the guest terminal, the play state is updated to the reception-not-possible state when the multi-play is terminated (GP20). Then, at the guest terminal, the play state is updated to the reception-possible state when a prescribed time elapses (GP21).

Figure 17:
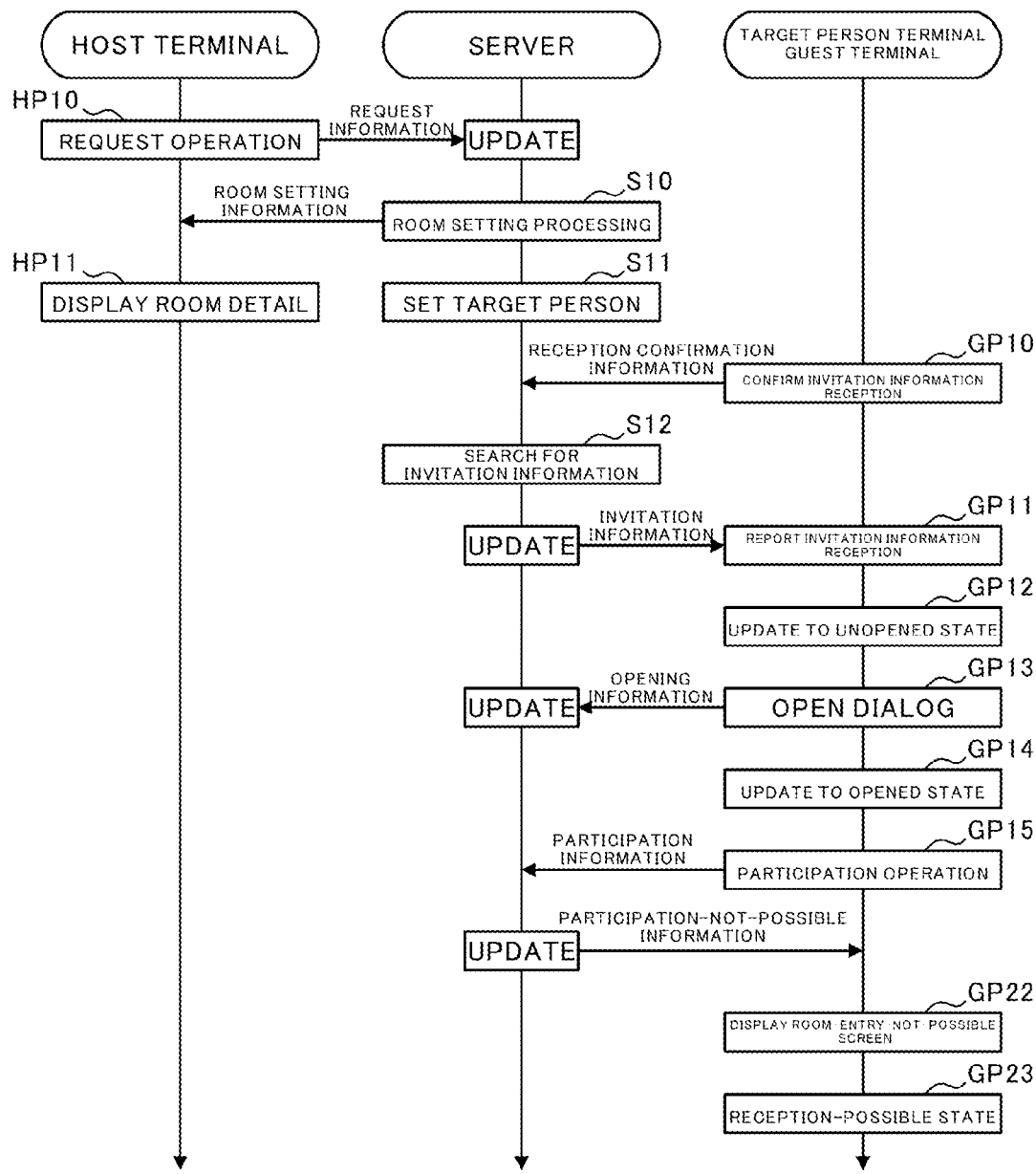
FIG. 17 is a sequence diagram for explaining the processing of the player terminal and the server in the case where it is not possible to participate in a multi-play.

FIG. 17 is a sequence diagram for explaining the processing of the player terminal 1 and the server 100 in the case where it is not possible to participate in a multi-play. Note that, in FIG. 17, the descriptions about processing until participation information is input from a target person terminal will be omitted because the processing is the same as that in FIG. 16. As described above, upon receiving the participation information, the server 100 determines if it is possible to enter a room. At this time, if it is not possible to enter the room, the server 100 sets participation-not-possible information indicating that it is not possible to enter the room. Furthermore, at this time, the server 100 executes points update processing and adds "4" to the priority points of the target person.

Upon receiving the participation-not-possible information, the target person terminal displays a prescribed room-entry-not-possible screen on the display 26 (GP22). Furthermore, the player terminal 1 of the target person updates the play state to the reception-possible state (GP23).

Figure 18:
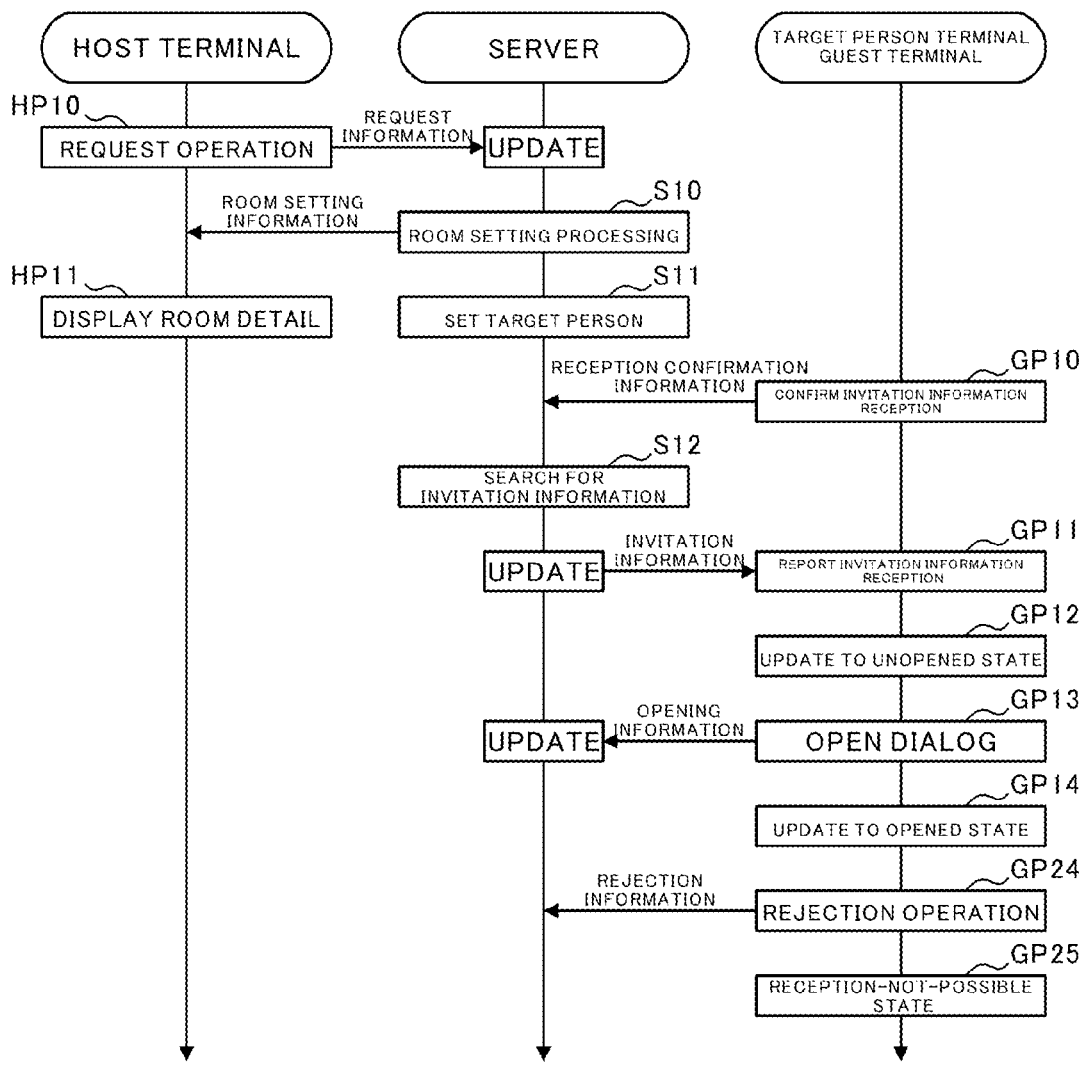
FIG. 18 is a sequence diagram for explaining the processing of the player terminal and the server in the case where participation in a multi-play is rejected.

FIG. 18 is a sequence diagram for explaining the processing of the player terminal 1 and the server 100 in the case where participation in a multi-play is rejected. Note that, in FIG. 18, the descriptions about processing until rejection information is input from a target person terminal will be omitted because the processing is the same as that in FIG. 16. When the rejection tab 52*b* of the invitation information dialog 52 is tapped at the target person terminal, rejection information is transmitted from the target person terminal to the server 100 (GP24). Furthermore, at the target person terminal, the play state is updated to the reception-not-possible state (GP25).

Note that, in this embodiment, it is assumed that the server 100 does not execute any particular processing upon receiving the rejection information. However, in the case where the rejection information is received, the server 100 may subtract points from the priority points of the target person or update the reception status (status flags) etc., in the extraction list.

Next, the functional configuration of the player terminal 1 and specific processing at the player terminal 1 will be described. Note that, hereinafter, the configuration and processing related to invitation information will be described, and configurations and processing not related to invitation information will not be described.

(Functional Configuration of the Player Terminal 1)

Figure 19:
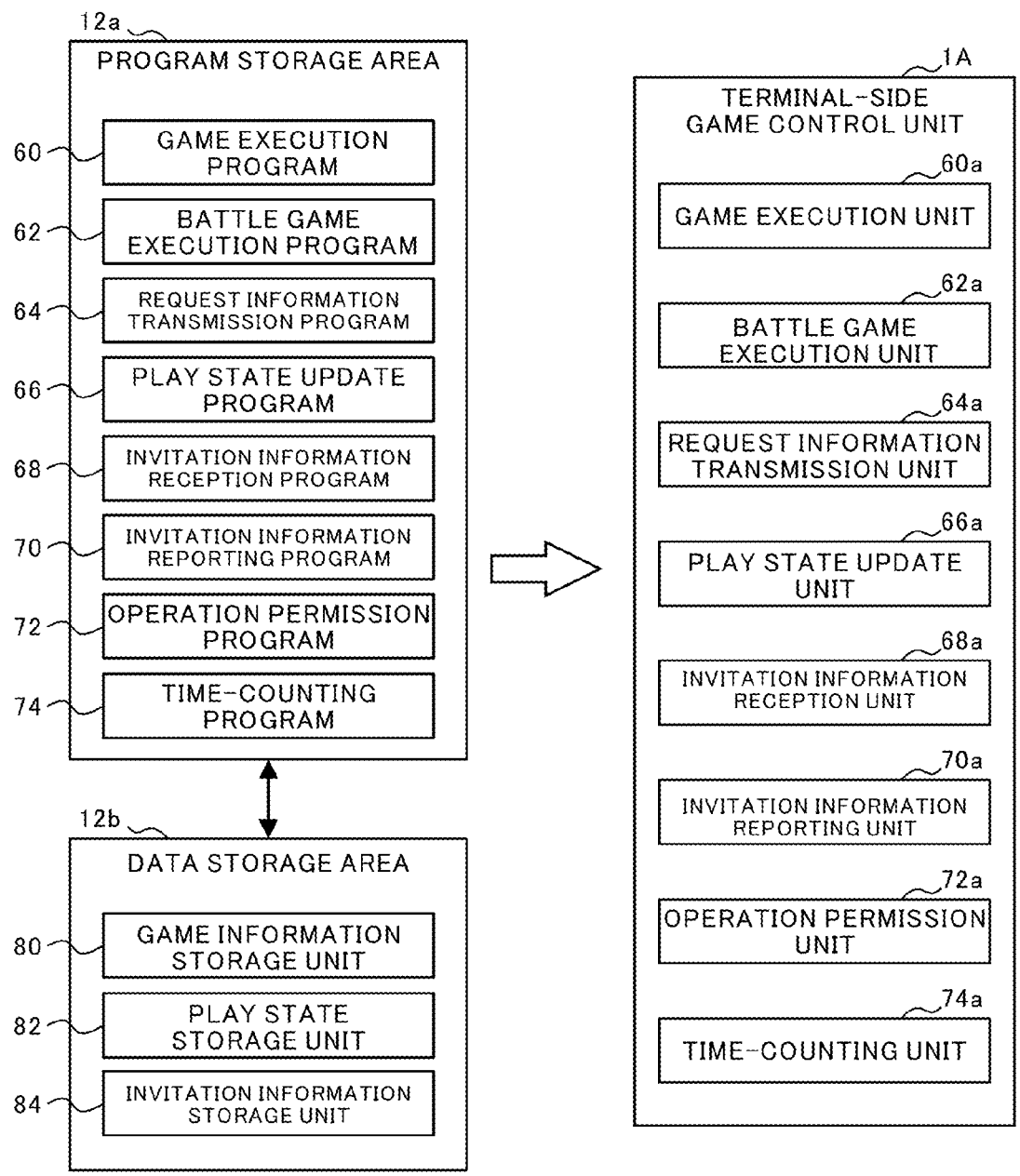
FIG. 19 is a diagram for explaining the configuration of the memory of the player terminal and the functions of the player terminal in the form of a computer.

FIG. 19 is a diagram for explaining the configuration of the memory 12 of the player terminal 1 and the functions of the player terminal 1 in the form of a computer. The memory 12 is provided with a program storage area 12*a* and a data storage area 12*b*. When starting a multi-play or before starting a multi-play, the CPU 10 stores terminal-side game control programs (modules) in the program storage area 12*a* in advance.

The terminal-side game control programs include a game execution program 60, a battle game execution program 62, a request information transmission program 64, a play state update program 66, an invitation information reception program 68, an invitation information reporting program 70, an operation permission program 72, and a time-counting program 74. Note that programs listed in FIG. 19 are just examples, and many other programs are provided as the terminal-side game control programs.

As storage units that store data, the data storage area 12*b* is provided with a game information storage unit 80, a play state storage unit 82, an invitation information storage unit 84. Note that storage units described above are just examples, and the data storage area 12*b* is provided with many other storage units.

The CPU 10 runs each program stored in the program storage area 12*a*, and updates data in each storage unit in the data storage area 12*b*. Furthermore, the CPU 10 causes the player terminal 1 (computer) to function as a terminal-side game control unit 1A by running each program stored in the program storage area 12*a*. The terminal-side game control unit 1A includes a game execution unit 60*a*, a battle game execution unit 62*a*, a request information transmission unit 64*a*, a play state update unit 66*a*, an invitation information reception unit 68*a*, an invitation information reporting unit 70*a*, an operation permission unit 72*a*, and a time-counting unit 74*a*.

Specifically, the CPU 10 runs the game execution program 60 to cause the computer to function as the game execution unit 60*a*. Similarly, the CPU 10 runs the battle game execution program 62, the request information transmission program 64, the play state update program 66, the invitation information reception program 68, the invitation information reporting program 70, and the operation permission program 72 to cause the computer to function as the battle game execution unit 62*a*, the request information transmission unit 64*a*, the play state update unit 66*a*, the invitation information reception unit 68*a*, the invitation information reporting unit 70*a*, the operation permission unit 72*a*, and the time-counting unit 74*a*, respectively.

The game execution unit 60*a* controls, on the basis of a player operation, the progress of a game other than a battle game by performing, for example, the organization of a party, the enhancement of an ally character, etc. Every time an operation is input to the player terminal 1, the game execution unit 60*a* transmits information corresponding to the operation to the server 100. Furthermore, the game execution unit 60*a* updates information in the game information storage unit 80 in the case where game-related information (game information) is updated.

The battle game execution unit 62*a* is in charge of wholly controlling the execution of a battle game. For example, the battle game execution unit 62*a* transmits information to the server 100 on the basis of an operation input to the player terminal 1, and receives various kinds of information from the server 100. Furthermore, the battle game execution unit 62*a* updates a battle screen on the basis of the operation input to the player terminal 1 and the information received from the server 100. That is, the battle game execution unit 62*a* executes a single-play or a multi-play with other player terminals 1 when a prescribed start condition is satisfied. Furthermore, the battle game execution unit 62*a* updates information in the game information storage unit 80 in the case where a battle game is normally terminated.

When one of the operation sections, namely, the follower tab 48*a*, the mutual follower tab 48*b*, and the random tab 48*c*, is tapped, the request information transmission unit 64*a* transmits a request signal corresponding to the operation section to the server 100.

The play state update unit 66a updates the play state in the play state storage unit 82 on the basis of an invitation information reception status and a game play situation.

In the case where the play state is a permitted state, the invitation information reception unit 68a performs the reception confirmation of invitation information at a timing set for each screen displayed on the display 26. Specifically, the invitation information reception unit 68a transmits reception confirmation information to the server 100, receives invitation information set in the server 100, and stores the invitation information in the invitation information storage unit 84.

The invitation information reporting unit 70a switches the notification image 34 to the reporting mode or the non-reporting mode on the basis of whether or not invitation information is stored in the invitation information storage unit 84, i.e., whether or not invitation information has been received.

The operation permission unit 72a displays the invitation information dialog 52 in the case where the notification image 34 is tapped, thereby making it possible for a player to input a participation operation, a rejection operation, or a suspension operation. Specifically, in the case where the notification image 34 displayed in the reporting mode is tapped, the operation permission unit 72a confirms with the server 100 whether a room corresponding to the received invitation information exists. In the case where the room exists, the operation permission unit 72a displays the invitation information dialog 52 (FIG. 6C, FIG. 7A, FIG. 7C) on the display 26. That is, by displaying the participation tab 52a, the rejection tab 52b, and the suspension tab 52c in such a manner that they can be tapped, it becomes possible to input a participation operation for applying for participation in a multi-play, a rejection operation for rejecting participation in a multi-play, or a suspension operation for suspending participation in a multi-play.

The time-counting unit 74a counts each of a prohibition time, a reception waiting time, and a rejection time, which will be described later.

(Specific Processing of the Player Terminal 1)

Figure 20:
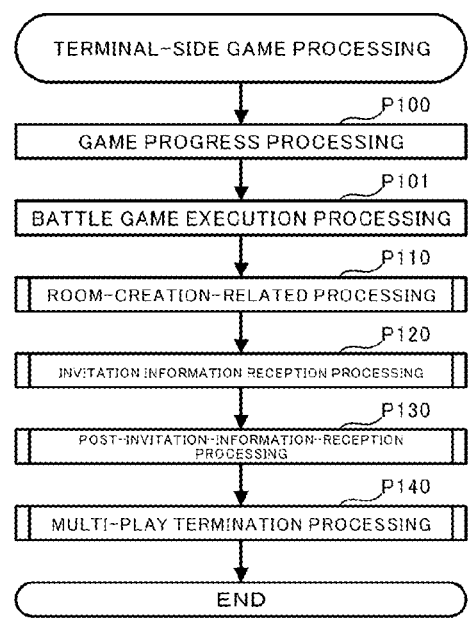
FIG. 20 is a flowchart for explaining an example of terminal-side game processing at the player terminal.

FIG. 20 is a flowchart for explaining an example of terminal-side game processing at the player terminal 1. In the terminal-side game processing, the game execution unit 60a executes game progress processing and controls the progress of a game other than a battle game (P100). Furthermore, the battle game execution unit 62a executes control for executing a single-play or multi-play battle game (P101). Furthermore, in the terminal-side game processing, the terminal-side game control unit 1A executes room-creation-related processing (P110), invitation information reception processing (P120), post-invitation-information-reception processing (P130), and multi-play termination processing (P140).

Figure 21:
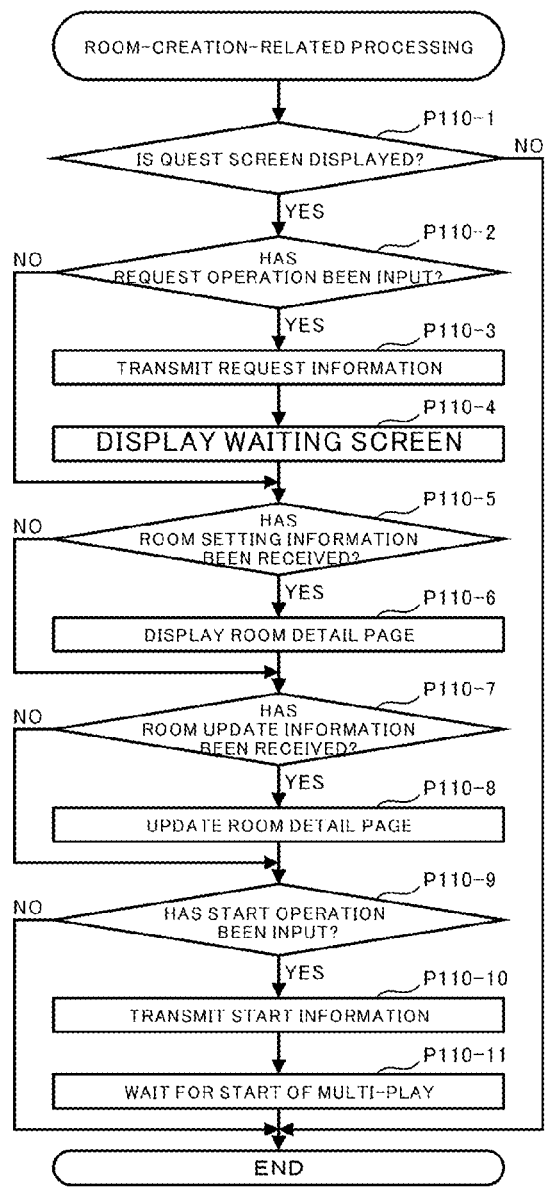
FIG. 21 is a flowchart for explaining an example of room-creation-related processing at the player terminal.

FIG. 21 is a flowchart for explaining an example of the room-creation-related processing at the player terminal 1. In the case where the quest screen is displayed on the display 26 (YES in P110-1), when the room creation tab 46 is tapped to input a request operation (YES in P110-2), the request information transmission unit 64a transmits request information to the server 100 (P110-3). At this time, the terminal-side game control unit 1A displays a prescribed waiting screen on the display 26 (P110-4).

Furthermore, upon receiving room setting information (YES in P110-5), the terminal-side game control unit 1A displays the room detail page on the display 26 (P110-6). Furthermore, upon receiving the room update information (YES in P110-7), the terminal-side game control unit 1A updates the display of the room detail page on the basis of the received room update information (P110-8).

Furthermore, when the start tab 50 is tapped to input a start operation (YES in P110-9), the terminal-side game control unit 1A transmits start information to the server 100 (P110-10) and waits until a multi-play is started (P110-11). Note that, when it becomes possible to start a multi-play, in the battle game execution processing (P101) described above, the control of a multi-play battle game is executed.

Figure 22:
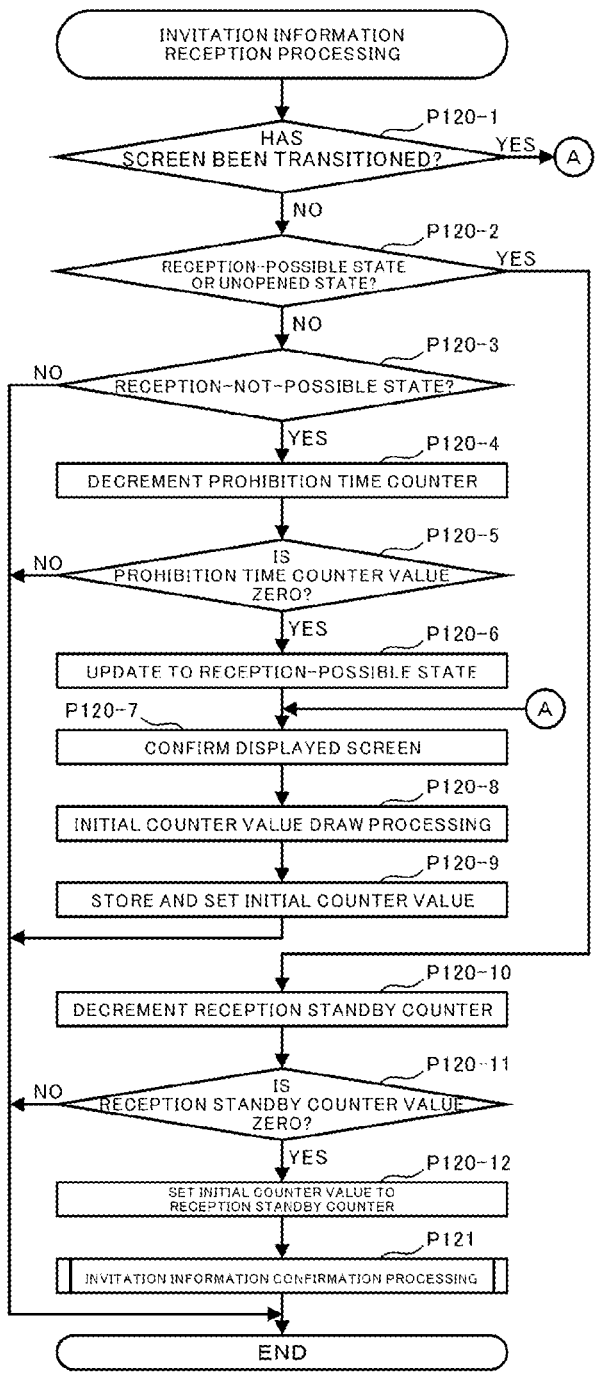
FIG. 22 is a flowchart for explaining an example of invitation information reception processing at the player terminal.

FIG. 22 is a flowchart for explaining an example of the invitation information reception processing at the player terminal 1. When a screen on the display 26 has been transitioned (YES in P120-1), the time-counting unit 74a confirms the screen displayed on the display 26 (P120-7) and determines an initial counter value by a draw (P120-8). Note that the initial counter value indicates intervals for the reception confirmation of invitation information. Here, a value corresponding to 1-10 seconds is determined as the initial counter value if an ordinary screen is displayed, and a value corresponding to 1-15 seconds is determined as the initial counter value if the battle screen is displayed. The time-counting unit 74a stores the determined initial counter value in a prescribed storage unit (initial value storage unit) in the data storage area 12b, and sets the determined initial counter value to a reception standby counter (P120-9).

Furthermore, in the case where the screen display 26 has not been transitioned (NO in P120-1) and the play state stored in the invitation information storage unit 84 is the reception-not-possible state (NO in P120-2, YES in P120-3), the time-counting unit 74a decrements the counter value of a prohibition time counter (P120-4). As will be described later in detail, note that when a rejection operation is performed, a prescribed counter value is set in the prohibition time counter. That is, the prohibition time counter counts a time elapsed after the rejection operation is input. In the case where the counter value of the prohibition time counter is updated to zero (YES in P120-5), the play state update unit 66a updates the play state in the play state storage unit 82 to the reception-possible state (P120-6).

By doing so, the play state is maintained as the reception-not-possible state until a prescribed time elapses after the rejection operation is performed. Then, when a prescribed time elapses after the rejection operation is performed, the play state is switched to the reception-possible state. Note that in the case where the play state is switched to the reception-possible state, similarly to what has been described above, the initial counter value is determined on the basis of the screen displayed on the display 26, and the determined initial counter value is set in the reception standby counter (P120-7 to P120-9).

Furthermore, in the case where the screen on the display 26 has not been transitioned (NO in P120-1) and the play state stored in the invitation information storage unit 84 is the reception-possible state or the unopened state (YES in P120-2), the time-counting unit 74a decrements the counter value of the reception standby counter (P120-10). Then, when the counter value of the reception standby counter becomes zero (YES in P120-11), the time-counting unit 74a sets the initial counter value stored in the initial value storage unit in the reception standby counter again. Furthermore, the invitation information reception unit 68a executes invitation information confirmation processing (P121).

Figure 23:
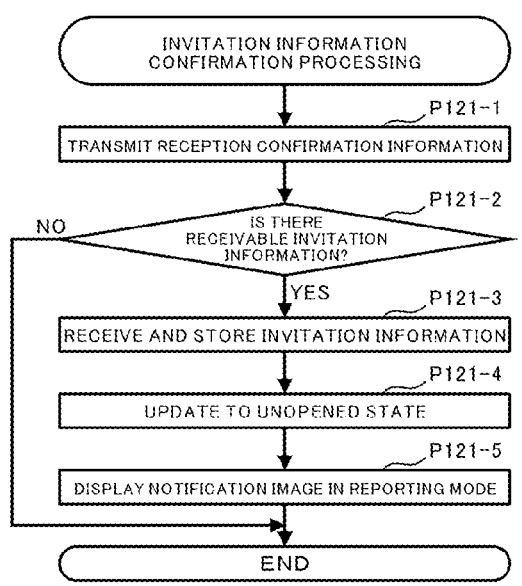
FIG. 23 is a flowchart for explaining an example of invitation information confirmation processing at the player terminal.

FIG. 23 is a flowchart for explaining an example of the invitation information confirmation processing at the player terminal 1. The invitation information reception unit 68a transmits reception confirmation information to the server 100 (P121-1). In the case where invitation information that can be received (that has not been received) has been set in the server 100 (YES in P121-2), the invitation information reception unit 68a receives the invitation information set in the server 100 and stores the invitation information in the invitation information storage unit 84 (P121-3). Furthermore, the invitation information reception unit 68a updates the play state in the play state storage unit 82 to the unopened state (P121-4). Furthermore, the invitation information reporting unit 70a displays the notification image 34 in the header display area 30 in the reporting mode (P121-5).

Figure 24:
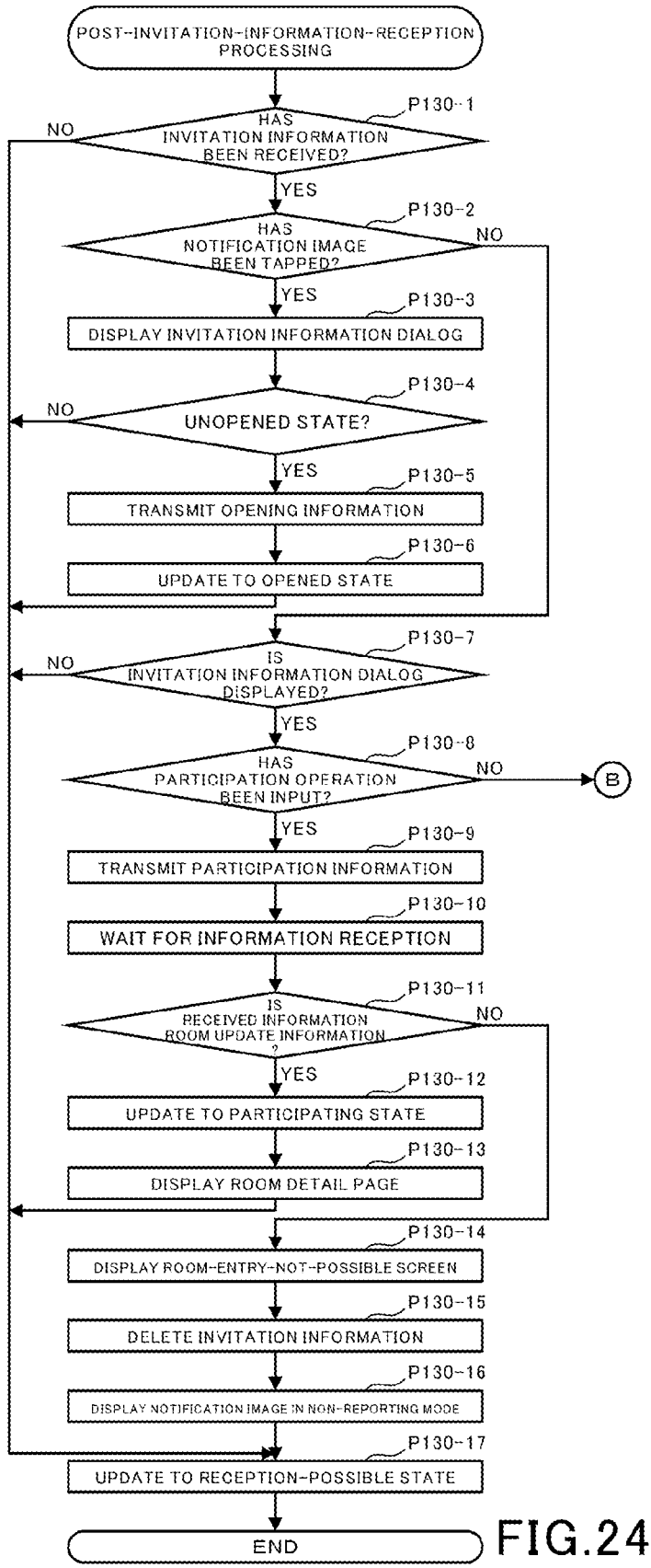
FIG. 24 is a first flowchart for explaining an example of post-invitation-information-reception processing at the player terminal.
Figure 25:
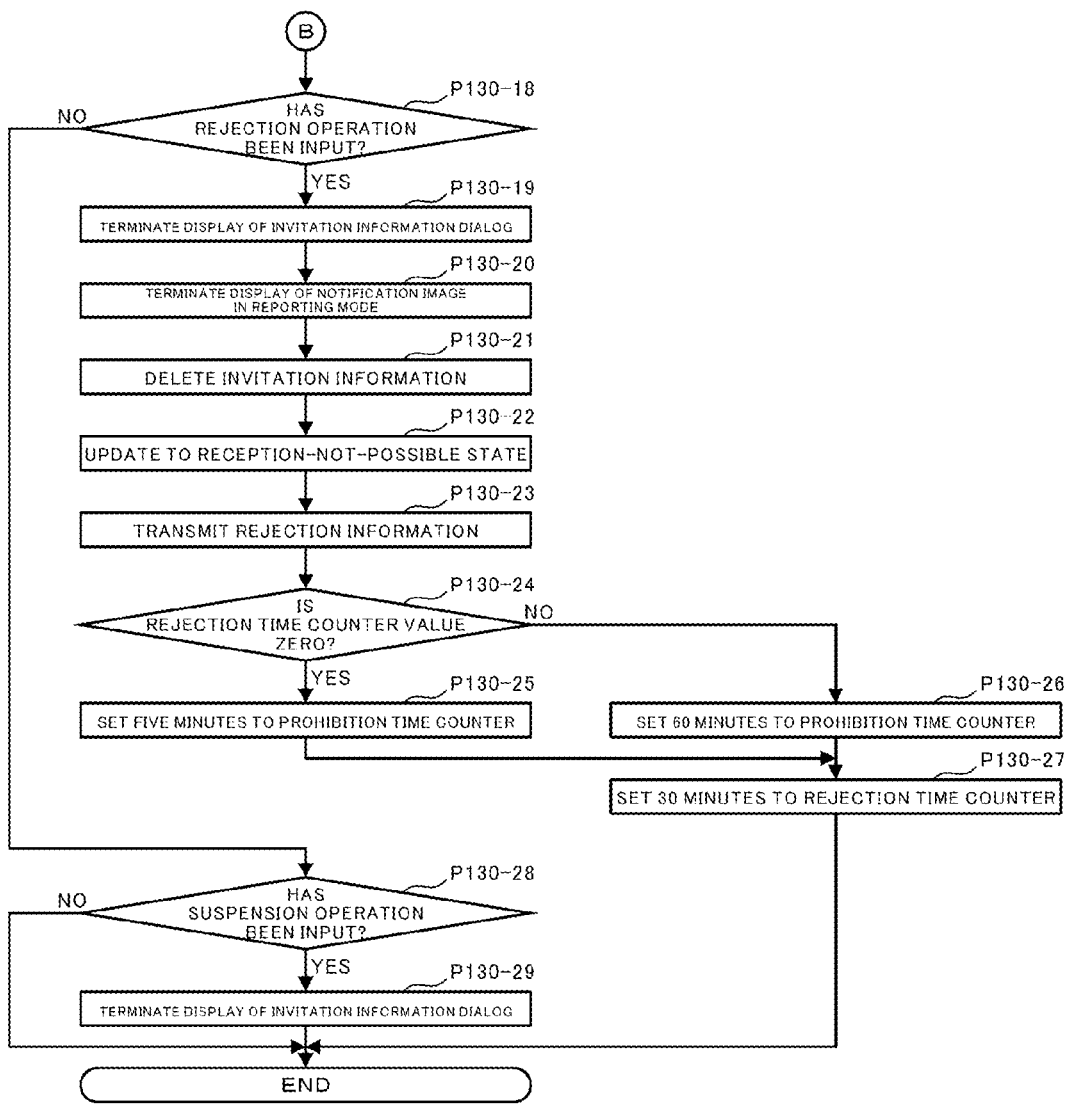
FIG. 25 is a second flowchart for explaining an example of the post-invitation-information-reception processing at the player terminal.

FIG. 24 is a first flowchart for explaining an example of the post-invitation-information-reception processing at the player terminal 1. FIG. 25 is a second flowchart for explaining an example of the post-invitation-information-reception processing at the player terminal 1. In a state in which invitation information has been stored in the invitation information storage unit 84 (YES in P130-1), when the notification image 34 is tapped (YES in P130-2), the invitation information reception unit 68a displays the invitation information dialog 52 on the display 26 (P130-3). At this time, if the play state is the unopened state (YES in P130-4), the invitation information reception unit 68a transmits opening information to the server 100 (P130-5). Furthermore, the play state update unit 66a updates the play state to the opened state (P130-6).

Furthermore, in a state in which invitation information has been stored in the invitation information storage unit 84 and the invitation information dialog 52 is displayed, when the participation tab 52a is tapped to input a participation operation (YES in P130-1, NO in P130-2, YES in P130-7, and YES in P130-8), the invitation information reception unit 68a transmits participation information to the server 100 (P130-9). Then, the invitation information reception unit 68a waits until room update information or participation-not-possible information is received (P130-10). Furthermore, in the case where room update information is received from the server 100 (YES in P130-11), the play state update unit 66a updates the play state to the participating state (P130-12), and the invitation information reception unit 68a displays the room detail page on the display 26 (P130-13). Furthermore, here, the invitation information reception unit 68a switches the notification image 34 to the non-reporting mode.

Meanwhile, in the case where the participation-not-possible information is received from the server 100 (NO in P130-11), the invitation information reception unit 68a displays a room-entry-not-possible screen on the display 26 (P130-14), and deletes the invitation information from the invitation information storage unit 84 (P130-15). Furthermore, the invitation information reporting unit 70a switches the notification image 34 from the reporting mode to the non-reporting mode (P130-16). Furthermore, the play state update unit 66a updates the play state in the play state storage unit 82 to the reception-possible state (P130-17).

Furthermore, in a state in which invitation information has been stored in the invitation information storage unit 84 and the invitation information dialog 52 is displayed, when the rejection tab 52b is tapped to input a rejection operation (YES in P130-1, NO in P130-2, YES in P130-7, NO in P130-8, and YES in P130-18 in FIG. 25), the invitation information reception unit 68a terminates the display of the invitation information dialog 52 (P130-19). Furthermore, the invitation information reporting unit 70a terminates the display of the notification image 34 in the reporting mode, and displays the notification image 34 in the non-reporting mode or the operation tab 42 (P130-20).

Furthermore, the invitation information reception unit 68a deletes the invitation information from the invitation information storage unit 84 (P130-21), and the play state update unit 66a updates the play state to the reception-not-possible state (P130-22). Furthermore, the invitation information reception unit 68a transmits rejection information to the server 100 (P130-23). Furthermore, the time-counting unit 74a determines whether the counter value of a rejection time counter is zero (P130-24). Note that the rejection time counter counts a time elapsed after the rejection operation is input. Although detailed description will be omitted, the counter value set in the rejection time counter is decremented every time the terminal-side game processing is executed. Here, when 30 minutes elapse after the rejection operation is input, the counter value of the rejection time counter becomes zero.

In the case where the counter value of the rejection time counter is zero (YES in P130-24), i.e., in the case where 30 minutes have elapsed after a rejection operation was input, the time-counting unit 74a sets a counter value corresponding to five minutes in the prohibition time counter (P130-25). Furthermore, in the case where the counter value of the rejection time counter is not zero (NO in P130-24), i.e., in the case where 30 minutes have not elapsed after a rejection operation was input, the time-counting unit 74a sets a counter value corresponding to 60 minutes in the prohibition time counter (P130-26). Furthermore, after setting a counter value of five minutes or 60 minutes in the prohibition time counter, the time-counting unit 74a sets a counter value corresponding to 30 minutes in the rejection time counter (P130-27).

With the processing described above, by the operation permission unit 72a displaying the invitation information dialog 52 when reporting or after reporting the reception of invitation information (P130-3), it becomes possible to input a rejection operation for rejecting participation in a multi-play. Furthermore, after inputting the rejection operation, the play state is maintained as the reception-not-possible state for five minutes (first time) or 60 minutes (second time) and the play state is updated to the reception-possible state after five minutes or 60 minutes elapse (P120-6). Furthermore, in the case where a rejection operation is performed twice within 30 minutes, invitation information is not received for 60 minutes after the second rejection operation.

Furthermore, in a state in which invitation information has been stored in the invitation information storage unit 84 and the invitation information dialog 52 is displayed, when the suspension tab 52c is tapped to input a suspension operation (YES in P130-1, NO in P130-2, YES in P130-7, NO in P130-8, NO in P130-18, and YES in P130-28), the invitation information reception unit 68a terminates the display of the invitation information dialog 52 (P130-29).

Figure 26:
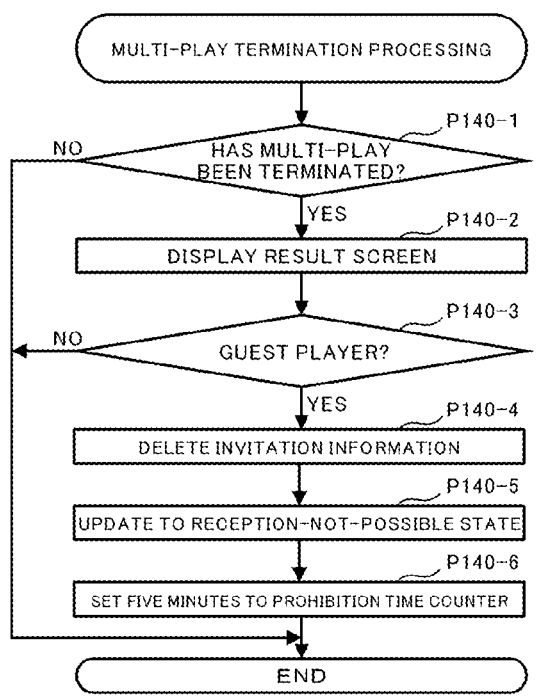
FIG. 26 is a flowchart for explaining an example of multi-play termination processing at the player terminal.

FIG. 26 is a flowchart for explaining an example of the multi-play termination processing at the player terminal 1. When a multi-play is terminated (YES in P140-1), the invitation information reception unit 68a displays the result screen on the display 26 (P140-2). At this time, in the case where a player participates in the multi-play as a guest player (YES in P140-3), the invitation information reception unit 68a deletes invitation information from the invitation information storage unit 84 (P140-4). Furthermore, the play state update unit 66a updates the play state to the reception-not-possible state (P140-5) and the invitation information reception unit 68a sets a counter value corresponding to five minutes in the prohibition time counter (P140-6). With this multi-play termination processing, after the termination of the multi-play in which the player participated as a guest player, the play state is maintained as the reception-not-possible state for five minutes (first time).

Next, the functional configuration of the server 100 and specific processing at the server 100 will be described. Note that, hereinafter, the configuration and processing related to setting of a target person who can receive invitation information will be described, and other configurations and processing will not be described.

(Functional Configuration of the Server 100)

Figure 27:
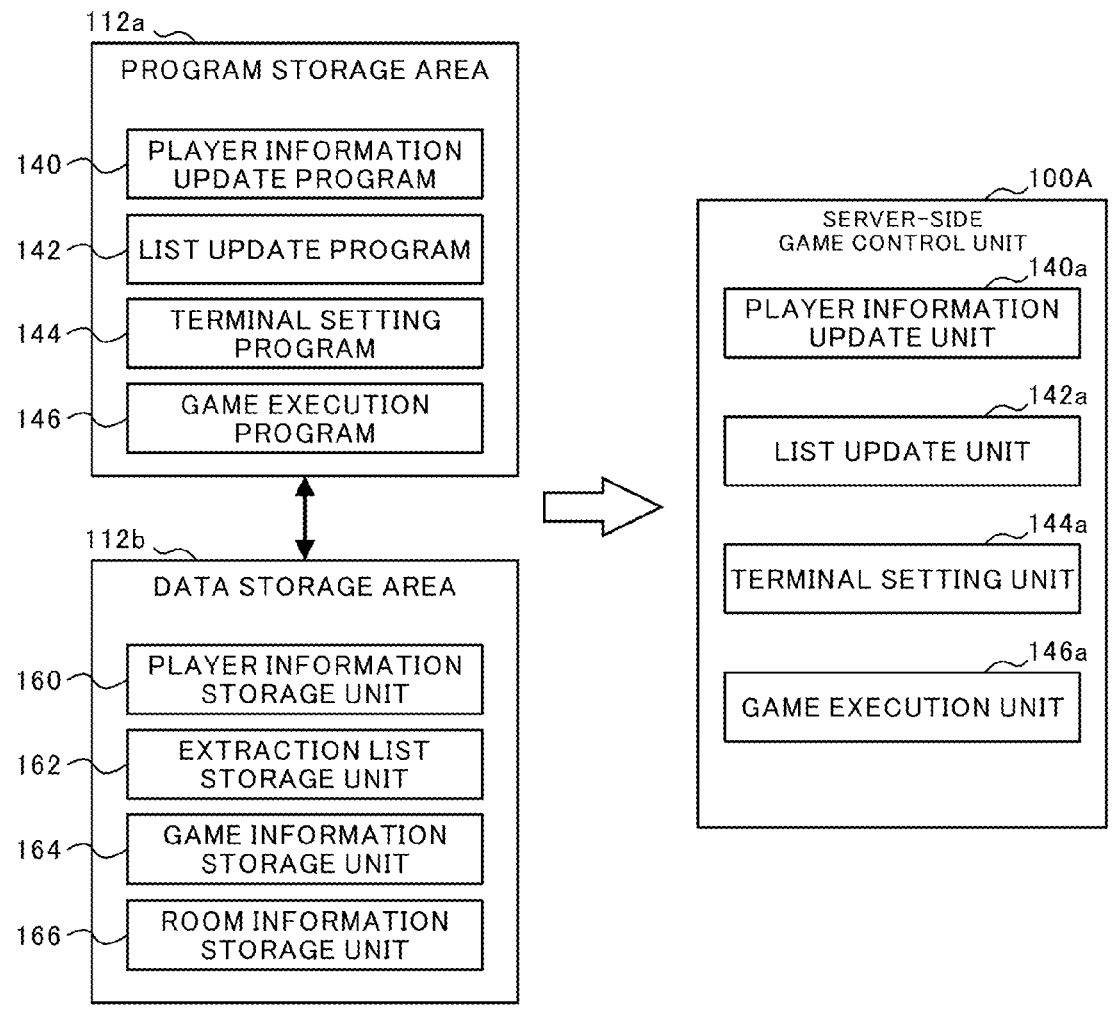
FIG. 27 is an illustration for explaining the configuration of the memory of the server and the functions of the server as a computer.

FIG. 27 is an illustration for explaining the configuration of the memory 112 of the server 100 and the functions of the server 100 in the form of a computer. The memory 112 is provided with a program storage area 112a and a data storage area 112b. When starting a multi-play or before starting a multi-play, the CPU 110 stores server-side game control programs (modules) in the program storage area 112a in advance.

The server-side game control programs include a player information update program 140, a list update program 142, a terminal setting program 144, and a game execution program 146. Note that programs listed in FIG. 27 are just examples, and many other programs are provided as the server-side game control programs.

As storage units that store data, the data storage area 112b is provided with the player information storage unit 160, an extraction list storage unit 162, a game information storage unit 164, and a room information storage unit 166. Note that storage units described above are just examples, and the data storage area 112b is provided with many other storage units.

The CPU 110 runs each program stored in the program storage area 112a and updates the data of each storage unit in the data storage area 112b. Furthermore, the CPU 110 causes the server 100 (computer) to function as a server-side game control unit 100A by running each program stored in the program storage area 112a. The server-side game control unit 100A includes a player information update unit 140a, a list update unit 142a, a terminal setting unit 144a, and a game execution unit 146a.

Specifically, the CPU 110 runs the player information update program 140 to cause the computer to function as the player information update unit 140a. Similarly, the CPU 110 runs the list update program 142, the terminal setting program 144, and the game execution program 146 to cause the computer to function as the list update unit 142a, the terminal setting unit 144a, and the game execution unit 146a, respectively.

Every time communication with the player terminal 1 is carried out, the player information update unit 140a updates player information for each player accumulated in the player information storage unit 160. Furthermore, the player information update unit 140a executes points update processing for updating the priority points in the player information storage unit 160.

The list update unit 142a updates an extraction list stored in the extraction list storage unit 162 on the basis of player information (priority points) stored in the player information storage unit 160. For example, the list update unit 142a executes sort processing for exchanging storage areas in which player information is to be stored. Furthermore, the list update unit 142a updates invitation information, a status flag, and a wait counter in the extraction list.

The terminal setting unit 144a sets the invitation information, the status flag, and the counter value of the wait counter in the extraction list on the basis of input request information. That is, the terminal setting unit 144a sets a target person in the extraction list.

The game execution unit 146a controls the progress of all games including a battle game on the basis of information input from the player terminal 1. Furthermore, the game execution unit 146a stores various kinds of information updated during a game in the game information storage unit 164. Here, the game execution unit 146a stores, for each player, damage inflicted on an enemy character in a multi-play in the game information storage unit 164. However, information stored in the game information storage unit 164 is not limited to the above information and can be set, as appropriate, on the basis of game content.

(Specific Processing of the Server 100)

Figure 28:
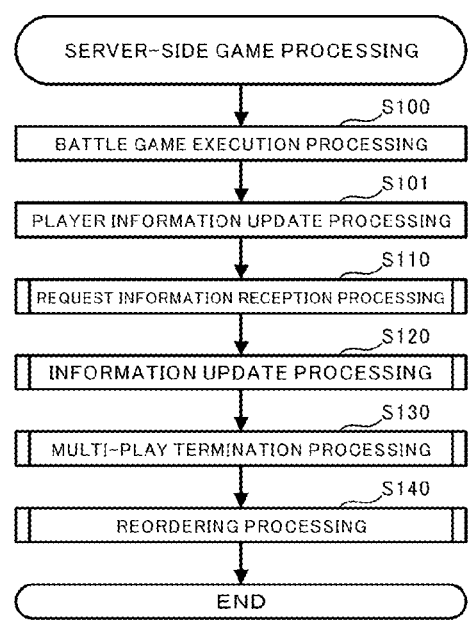
FIG. 28 is a flowchart for explaining an example of server-side game processing at the server.

FIG. 28 is a flowchart for explaining an example of server-side game processing at the server 100. In the server-side game processing, the game execution unit 146a executes the battle game execution processing for executing a battle game (S100). Furthermore, the player information update unit 140a updates player information in the player information storage unit 160 on the basis of information input from the player terminal 1. Furthermore, in the server-side game processing, the server-side game control unit 100A executes request information reception processing (S110), information update processing (S120), multi-play termination processing (S130), and reordering processing (S140).

Figure 29:
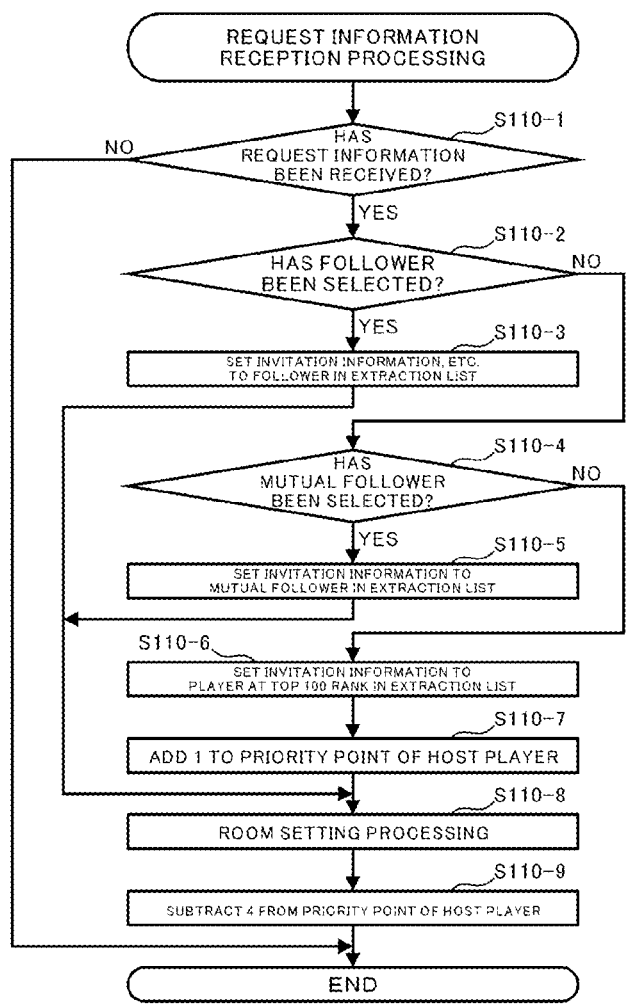
FIG. 29 is a flowchart for explaining an example of request information reception processing at the server.

FIG. 29 is a flowchart for explaining an example of request information reception processing at the server 100. In the case where followers are selected as target persons to be invited to a room, i.e., in the case where request information for the follower tab 48a is received (YES in S110-1 and YES in S110-2), the terminal setting unit 144a sets invitation information, status flags, and the counter values of the wait counters (hereinafter referred to as "invitation information, etc.") in the storage areas of the followers in an extraction list (S110-3).

In the case where mutual followers are selected as target persons to be invited to a room, i.e., in the case where request information for the mutual follower tab 48b is received (YES in S110-1, NO in S110-2, and YES in S110-4), the terminal setting unit 144a sets invitation information, etc. in the storage areas of the mutual followers in the extraction list (S110-5).

Note that, in the case where invitation information is set for followers or mutual followers, the counter values of the wait counters do not necessarily need to be set. That is, in the case where followers or mutual followers are set as target persons, a state in which all target persons can receive invitation information at the same time may be realized. Furthermore, similarly to the case where target persons are set randomly, the counter values of the wait counters may be set on the basis of priority points.

In the case where it is selected that target persons to be invited to a room are randomly extracted, i.e., in the case where request information for the random tab 48c is received (YES in S110-1, NO in S110-2, and NO in S110-4), the terminal setting unit 144a sets invitation information, etc. in the storage areas of players at top 100 ranks whose reception statuses are "setting possible", i.e., whose status flags are blank in the extraction list (S110-6).

Furthermore, in the case where target persons are randomly set, the player information update unit 140a adds "1" to the priority points of a host player in the player information storage unit 160 (S110-8). Furthermore, in the case where request information is received (YES in S110-1), the server-side game control unit 100A executes the room setting processing for setting a room (S110-8). Here, a room (prescribed storage area) is set in the room information storage unit 166 and information related to the host player is stored in the room on the basis of the request information. Furthermore, here, the server-side game control unit 100A sets room information in such a manner that the host terminal can receive the room information. Furthermore, the player information update unit 140a subtracts "4" from the priority points of the host player in the player information storage unit 160 regardless of the kind of the request information (S110-9).

Figure 30:
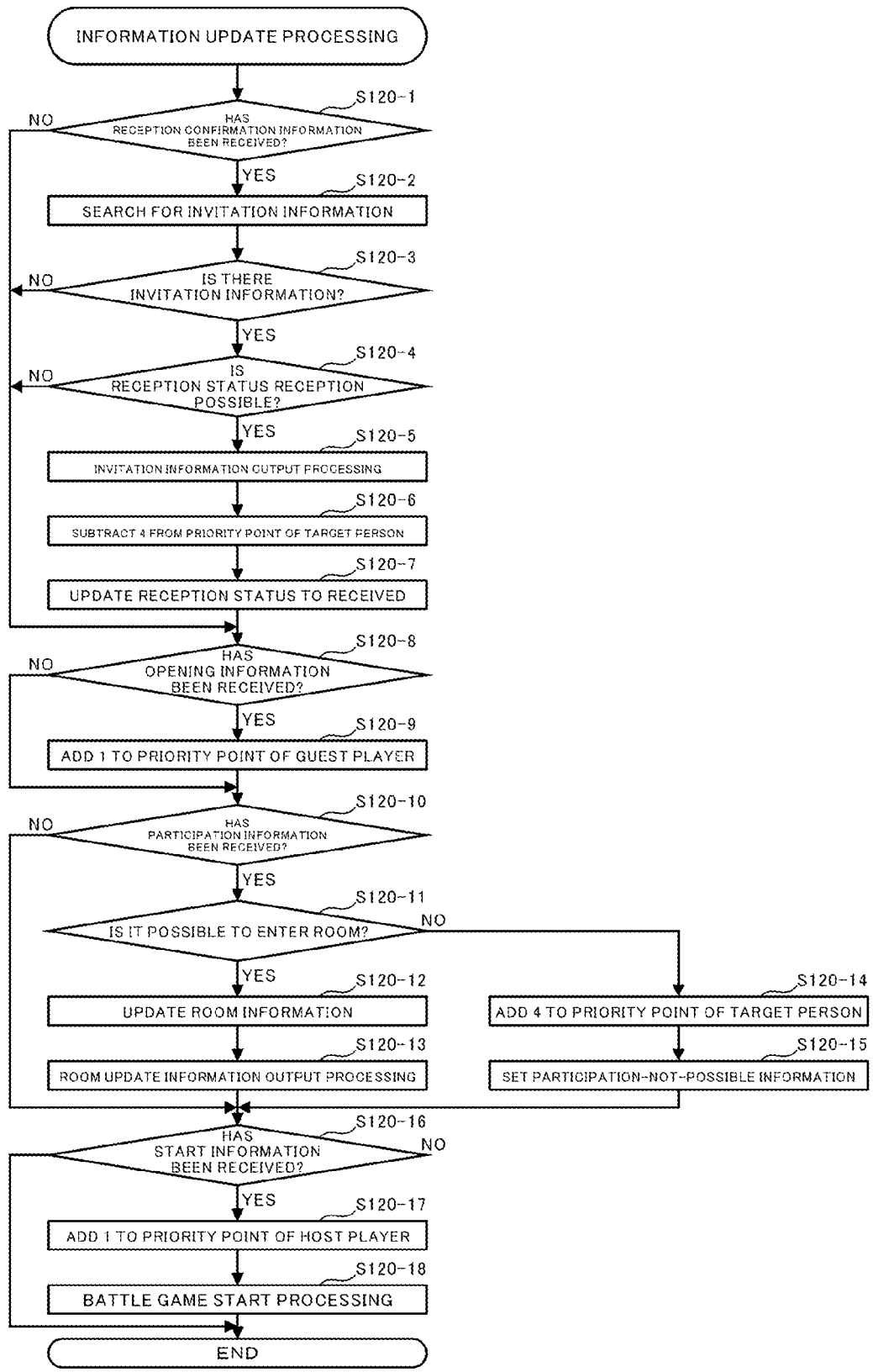
FIG. 30 is a flowchart for explaining an example of information update processing at the server.

FIG. 30 is a flowchart for explaining an example of the information update processing at the server 100. Upon receiving reception confirmation information from the player terminal 1 (YES in S120-1), the server-side game control unit 100A searches an extraction list to search for whether invitation information for this player terminal 1 has been set (S120-2). At this time, if invitation information has been set (YES in S120-3) and the reception status (status flag) has been set to "reception possible" (YES in S120-4), the server-side game control unit 100A executes invitation information output processing (S120-5). Here, the invitation information is set in such a manner that the player terminal 1 that has transmitted the reception confirmation information can receive the invitation information.

Furthermore, the player information update unit 140a subtracts "4" from the priority points of the target person stored in the player information storage unit 160 (S120-6). Furthermore, the list update unit 142a updates the reception status (status flag) of the target person terminal to "received" in the extraction list.

Furthermore, upon receiving opening information from the player terminal 1 (target person terminal) (YES in S120-8), the player information update unit 140a adds "1" to the priority points of the target person stored in the player information storage unit 160 (S120-9).

Furthermore, in the case where participation information is received from the player terminal 1 (target person terminal) (YES in S120-10), if it is possible to enter a room (YES in S120-11), the server-side game control unit 100A updates the room information in the room information storage unit 166 (S120-12). Furthermore, the server-side game control unit 100A executes room update information output processing. Here, the server-side game control unit 100A sets room update information in such a manner that a host terminal and all guest terminals (including the target person terminal that has transmitted participation information) can receive the room update information (S120-13).

Meanwhile, if it is not possible enter the room (NO in S120-11), the player information update unit 140a adds "4" to the priority points of the target person who has transmitted the participation information in the player information storage unit 160 (S120-14). Furthermore, the server-side game control unit 100A sets this target person as capable of receiving participation-not-possible information (S120-15).

Furthermore, upon receiving start information from the host terminal (YES in S120-16), the player information update unit 140a adds "1" to the priority points of the host player in the player information storage unit 160 (S120-17). Then, the server-side game control unit 100A executes the battle game start processing for starting a multi-play battle game (S120-18).

Figure 31:
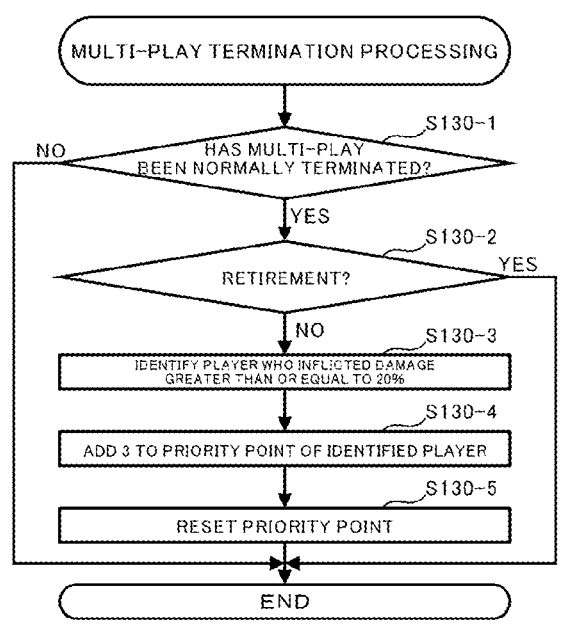
FIG. 31 is a flowchart for explaining an example of the multi-play termination processing at the server.

FIG. 31 is a flowchart for explaining an example of the multi-play termination processing at the server 100. In the battle game execution processing (S100), in the case where a multi-play results in a normal termination and does not result in an intermediate termination (retirement) (YES in S130-1 and NO in S130-2), the server-side game control unit 100A identifies a player who inflicted damage greater than or equal to 20% of the entire damage (S130-3). Note that, in the battle game execution processing (S100), when a multi-play is executed, the damage inflicted by individual players is stored in the game information storage unit 164.

The player information update unit 140a adds "3" to the priority points of the identified player in the player information storage unit 160 (S130-4). Furthermore, the priority points of all players whose priority points are greater than an initial value are reset to the initial value (set to 100) by the player information update unit 140a when a multi-play is terminated (S130-5).

Figure 32:
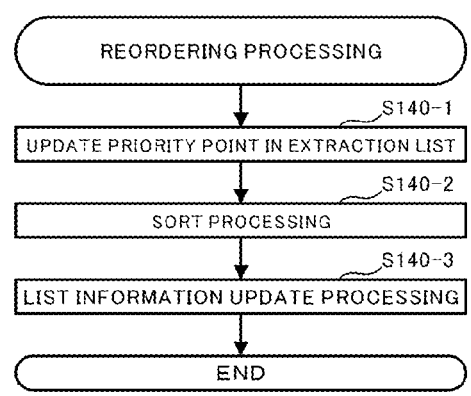
FIG. 32 is a flowchart for explaining an example of reordering processing at the server.

FIG. 32 is a flowchart for explaining an example of the reordering processing at the server 100. The list update unit 142a updates priority points in an extraction list stored in the extraction list storage unit 162 to priority points stored in the player information storage unit 160 (S140-1). Furthermore, the list update unit 142a executes sort processing for exchanging priority orders on the basis of the priority points in the extraction list (S140-2). This updates the priority orders of players on the basis of the priority points.

Then, the list update unit 142a executes list information update processing for updating the information in the extraction list (S140-3). For example, the list update unit 142a updates the counter values of the wait counter, and updates the status flags of storage areas the counter values of which have been updated to zero from "reception not possible" to "reception possible". Furthermore, the list update unit 142a updates the status flags of target persons who have received invitation information from "reception possible" to "received". Furthermore, in the case where a multi-play is terminated, in the case where a room is deactivated, or in the case where a prescribed time elapses after invitation information is set, the list update unit 142a updates invitation information, status flags, and wait counters in the extraction list.

As described above, a program for executing a multi-play as a host terminal and a program for executing a multi-play as a guest terminal are provided in the player terminal 1. Furthermore, the player terminal 1 functions as the request information transmission unit 64a that transmits request information to the server 100 in response to an input of a request operation from the room creation tab 46 (operation section). Note that, in this embodiment, the server 100 is provided as an external device, and a plurality of player terminals 1 can execute a multi-play via the server 100 that is the external device. However, the external device is not limited to the server 100. For example, the player terminal 1 may be provided with the functions of the server 100 described above, or one of the player terminals 1 may function as the external device.

Furthermore, the player terminal 1 functions as the play state update unit 66a (state update unit) that updates a play state on the basis of a game play situation. Note that, although five play states are provided in this embodiment, the number of play states and play state setting conditions are merely examples and can be designed, as appropriate. For example, a login state may be included as a play situation (play state), and a play state may be varied depending on whether the player terminal 1 is logged in. In any case, a permitted state in which invitation information can be received and a non-permitted state in which invitation information is not received may be provided as play states.

Furthermore, in this embodiment, a play state is set and updated on the basis of a game play situation and whether or not invitation information has been received. However, the play state update unit 66a may update the play state on the basis of at least the game play situation.

Furthermore, in the case where the play state of the player terminal 1 is a permitted state, the player terminal 1 functions as the invitation information reception unit 68a (reception unit) capable of receiving invitation information from the server 100 (external device). Note that, in this embodiment, invitation information is set at the server 100, and the player terminal 1 receives the invitation information when reception confirmation is performed by the player terminal 1. However, processing executed by the invitation information reception unit 68a to receive invitation information is not limited to this processing.

For example, in the case where a target person is set at the server 100, the server 100 transmits invitation information to a target person terminal. At this time, the invitation information may be received if the play state of the target person terminal is a permitted state, and the reception of the invitation information may be rejected if the play state is a not-possible state. In any case, the invitation information reception unit 68a may receive the invitation information from the server 100 (external device) in the case where the play state is a permitted state, and the processing or method therefor is not limited.

Furthermore, the player terminal 1 functions as the invitation information reporting unit 70a (reporting unit) that reports the reception of invitation information. In this embodiment, the invitation information reporting unit 70a reports the reception of invitation information by switching the display mode of the notification image 34. However, the method for reporting the reception of invitation information is not limited to this method. For example, the reception of invitation information may be reported by forcibly displaying the invitation information dialog 52 when receiving or after receiving the invitation information. In any case, the invitation information reporting unit 70a may report the reception of invitation information when receiving or after receiving the invitation information, and the reporting mode can be designed, as appropriate.

Furthermore, the player terminal 1 functions as the operation permission unit 72a that makes it possible to input a participation operation. In this embodiment, the operation permission unit 72a makes it possible to input a participation operation, a rejection operation, and a suspension operation by providing the invitation information dialog 52 with the participation tab 52a, the rejection tab 52b, and the suspension tab 52c. However, it suffices for the operation permission unit 72a to make it possible to input a participation operation, a rejection operation, and a suspension operation, and the method or processing therefor can be designed, as appropriate. Furthermore, it suffices for the operation permission unit 72a to make it possible to input at least a participation operation, and accepting a rejection operation and a suspension operation is not necessary. In any case, it suffices for the operation permission unit 72a to make it possible to input a prescribed participation operation when reporting or after reporting the reception of invitation information.

Furthermore, the player terminal 1 functions as the game execution unit 60a that executes a multi-play (communication game) with other player terminals 1. Note that the content of a game in this embodiment is merely an example, and the content of the game is not particularly limited. The content of the game may be, for example, an action game, a role playing game, a racing game, etc. In any case, it suffices for a communication game to be executable at a plurality of player terminals 1, and the content of the communication game is not particularly limited. Thus, the content of the communication game may be such that a plurality of players cooperate with each other or a plurality of players battle against each other. In any case, the game execution unit 60a widely includes game execution units that execute a communication game with other player terminals 1 when a participation operation is input and a prescribed start condition is satisfied.

Furthermore, in this embodiment, a state in which invitation information can be received coincides with a state in which the reception of invitation information can be reported. Thus, in the case where invitation information is received, the player terminal 1 immediately reports that the invitation information has been received. However, the state in which invitation information can be received may be different from the state in which the reception of invitation information can be reported. For example, it is assumed that the reception confirmation of invitation information is performed on the basis of the five play states described above. Furthermore, the player terminal 1 functions as a reportability state setting unit that sets a reportability state separately from a play state. As the reportability state, for example, a reporting-possible state and a reporting-not-possible state are provided.

For example, the reportability state setting unit switches a reportability state on the basis of the transition of a screen displayed on the display 26. Specifically, the reportability state setting unit sets the reportability state to the reporting-possible state when a screen is transitioned to a screen in which the notification image 34 in the reporting mode or the invitation information dialog 52 may be displayed. Meanwhile, the reportability state setting unit sets the reportability state to the reporting-not-possible state when a screen is transitioned to a screen in which the notification image 34 in the reporting mode or the invitation information dialog 52 cannot be displayed.

Furthermore, upon receiving invitation information, the invitation information reporting unit 70a confirms the reportability state, and if the reportability state is the reporting-possible state, displays the notification image 34 in the reporting mode or the invitation information dialog 52 on the display 26. Meanwhile, if the reportability state is the reporting-not-possible state when the invitation information is received, the invitation information reporting unit 70a continues to display the notification image 34 in the non-reporting mode. In this case, even if the invitation information is received, a player is not notified of the existence of the invitation information. Furthermore, the invitation information reporting unit 70a confirms the reportability state at a prescribed timing, such as in the case where a screen is transitioned, and if the reportability state is the reporting-possible state, displays the notification image 34 in the reporting mode or the invitation information dialog 52 at that timing.

As described above, the play state defining the receivability of invitation information, and the reportability state defining the reportability of the reception of invitation information may be provided. Furthermore, the state in which invitation information can be received may be different from the state in which the reception of invitation information can be reported.

Furthermore, the play state may define reporting of the reception of invitation information. That is, the invitation information reporting unit 70a may report the reception of invitation information when receiving or after receiving the invitation information in the case where the play state is a permitted state. This modification will be described with reference to the drawings.

(Modification)

Figure 33:
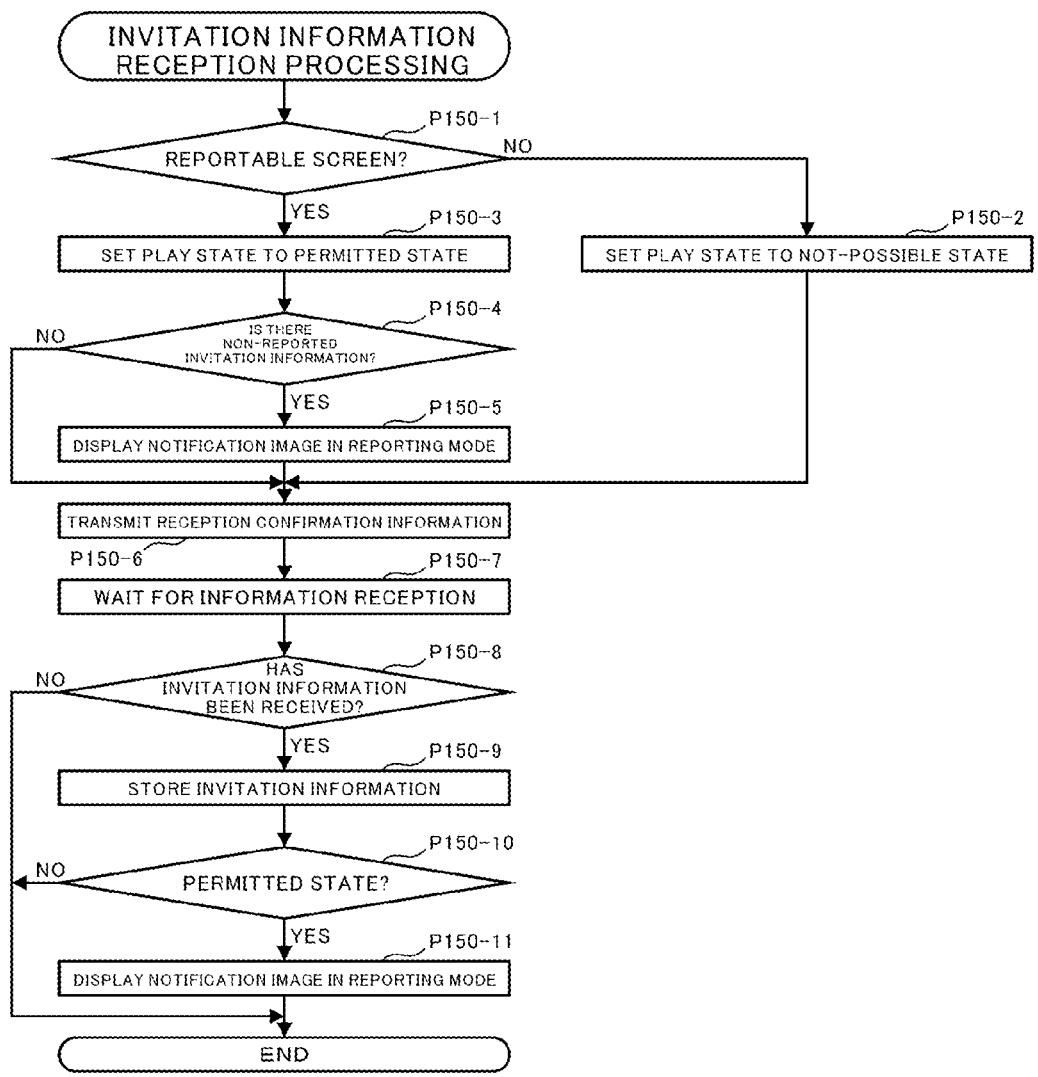
FIG. 33 is a flowchart for explaining an example of the invitation information reception processing at the player terminal in a modification.

FIG. 33 is a flowchart for explaining an example of the invitation information reception processing at the player terminal 1 in the modification. The invitation information reception processing in this modification is executed instead of the invitation information reception processing in the embodiment described above. Note that, although a detailed description will be omitted, in the case where the invitation information reception processing in this modification is executed, the processing in the post-invitation-information-reception processing and the multi-play termination processing is partly added or changed in the embodiment described above.

The invitation information reporting unit 70a determines whether a screen displayed on the display 26 is a screen in which the reception of invitation information can be reported (P150-1). Note that whether the reception of invitation information can be reported is set in advance for each screen. In the case where a screen is transitioned to a screen in which the reception of invitation information cannot be reported (NO in P150-1), the play state update unit 66a sets the play state in the play state storage unit 82 to a not-possible state (P150-2).

Meanwhile, in the case where a screen displayed on the display 26 is a screen in which the reception of invitation information can be reported (YES in P150-1), the play state update unit 66a sets the play state to a permitted state (P150-3). At this time, if non-reported invitation information (the reception of which has not been reported) is stored in the invitation information storage unit 84 (YES in P150-4), the invitation information reporting unit 70a displays the notification image 34 in the reporting mode (P150-5).

Furthermore, the invitation information reception unit 68a transmits reception confirmation information to the server 100 (P150-6), and waits until information is received from the server 100 (P150-7). Upon receiving invitation information (YES in P150-8), the received invitation information is stored in the invitation information storage unit 84 (P150-9). At this time, if the play state is a permitted state (YES in P150-10), the invitation information reporting unit 70a displays the notification image 34 in the reporting mode (P150-11).

According to the modification described above, the player terminal 1 receives the invitation information regardless of a game play situation (play state). Furthermore, the invitation information reporting unit 70a reports the reception of invitation information when receiving or after receiving invitation information in the case where the play state is a permitted state. Also with this modification, operations and advantages similar to those in the embodiment described above are realized.

Note that, in the embodiment described above, the play state update unit 66a sets, for five minutes (first time) after a multi-play (communication game) is terminated, the play state to a not-possible state in which the reception of invitation information is not possible. Also in the modification, the play state update unit 66a may set, for a prescribed time (first time) after the multi-play (communication game) is terminated, the play state to a not-possible state in which reporting of the reception of invitation information is not possible.

Furthermore, in the embodiment described above, the play state update unit 66a sets, for five minutes (first time) or 60 minutes (second time) after a rejection operation is input, the play state to a not-possible state in which the reception of invitation information is not possible. Also in the modification, the play state update unit 66a may set, for a prescribed time (second time) after the rejection operation is input, the play state to a not-possible state in which reporting of the reception of invitation information is not possible.

Furthermore, the server 100 accumulates prescribed player information in the player information storage unit 160 (storage unit) for each player, and functions as the player information update unit 140a (accumulation unit, update unit) that updates the priority points (priority information) of each player in accordance with an update condition set in advance. Note that the priority points update condition can be designed, as appropriate. Furthermore, the priority points are merely an example of the priority information. For example, a game play time, a player level, a player rank, a billing amount, or a combination of these items may be set as the priority information.

Note that, in the embodiment described above, the player information update unit 140a updates the priority points on the basis of the percentage of damage inflicted in the multi-play. That is, the player information update unit 140a updates the priority points (priority information) on the basis of a prescribed result in the multi-play (communication game). In this case, for example, the priority points may be updated on the basis of whether or not a player character is alive when the multi-play is terminated, instead of the percentage of damage inflicted. Furthermore, for example, points obtained by multiplying damage inflicted by a prescribed coefficient may be added to or subtracted from the priority points. In any case, in the case where the priority information is updated on the basis of a prescribed result during the multi-play (communication game), the prescribed result can be designed, as appropriate. However, the result during the multi-play is not necessary as the priority points update condition.

Furthermore, in the embodiment described above, the player information update unit 140a updates the priority points (priority information) on the basis of information received from a target person terminal (extracted terminal) after invitation information is received. Specifically, the priority points are updated in the case where participation information is input (but it is not possible to enter a room) and in the case where opening information is input. However, the player information update unit 140a need not update the priority points, for example, after the invitation information is received.

Furthermore, upon receiving request information from the player terminal 1, the server 100 functions as the terminal setting unit 144a (setting unit) capable of setting, on the basis of at least priority points (priority information), a plurality of player terminals 1 capable of receiving invitation information as target person terminals (extracted terminals). Note that, in the embodiment described above, there is the case in which the terminal setting unit 144a sets followers or mutual followers as target persons. That is, there are cases where the terminal setting unit 144a sets target persons on the basis of the priority points and where the terminal setting unit 144a sets target persons regardless of the priority points. The terminal setting unit 144a may set target person terminals on the basis of at least priority information in the case where priority information is set for each player.

Furthermore, the server 100 functions as the game execution unit 146a that executes a multi-play (communication game) between one or more target person terminals (extracted terminals) that have received invitation information and transmitted prescribed participation information and the player terminal 1 (host terminal) that has transmitted request information. Note that the content of a game provided by the game execution unit 146*a* is not particularly limited.

Furthermore, the role sharing between the player terminal 1 and the server 100 described above is merely an example. In the embodiment and modification described above, the player terminal 1 stores and updates the play state. That is, in the embodiment and modification described above, the player terminal 1 functions as the play state update unit 66*a* (state update unit). However, the server 100 may store and update the play state.

The following describes a second embodiment in which the server 100 functions as a state update unit (server-side state update unit). Note that, in the following descriptions, configurations that are the same as those in the embodiment described above will be given the same reference signs and descriptions thereof will be omitted.

Second Embodiment

Figure 34:
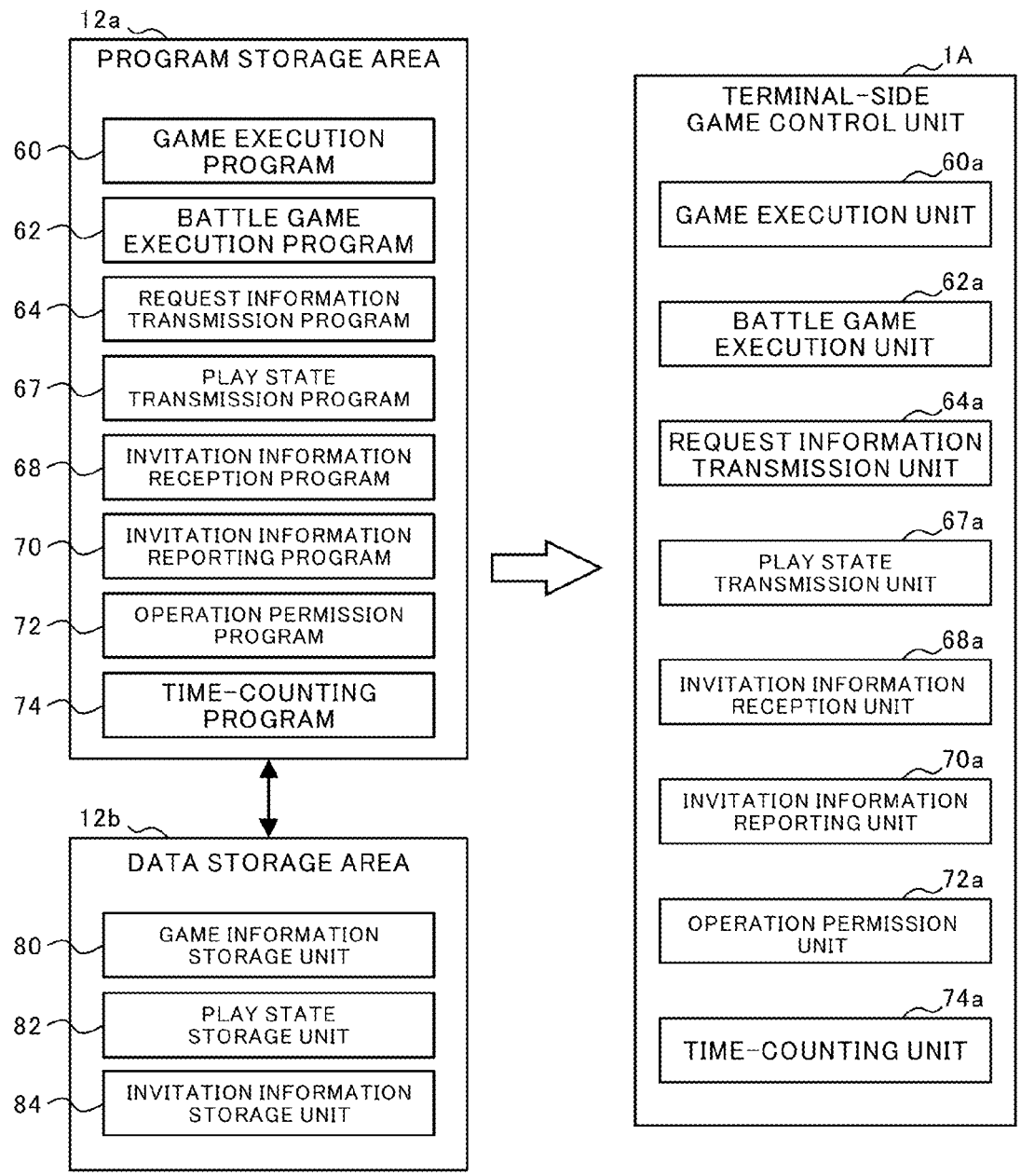
FIG. 34 is a diagram for explaining the configuration of the memory of the player terminal and the functions of the player terminal as a computer in a second embodiment.

FIG. 34 is a diagram for explaining the configuration of the memory 12 of the player terminal 1 and functions of the player terminal 1 in the form of a computer in the second embodiment. In the second embodiment, in addition to the programs described above, the terminal-side game control programs further includes a play state transmission program 67. Furthermore, the CPU 10 runs the play state transmission program 67 to cause the player terminal 1 to function as a play state transmission unit 67*a*.

The play state transmission unit 67*a* transmits a play state (play state information) at the player terminal 1 to the server 100. Note that, in the second embodiment, the player terminal 1 sets and updates the play state similarly to the embodiment described above. At this time, a setting condition for setting the play state may be the same as or different from that in the embodiment described above. Furthermore, although the play state storage unit 82 stores the play state here, the player terminal 1 need not store or update the play state. In any case, it suffices that the play state transmission unit 67*a* transmits the play state at the player terminal 1 to the server 100.

Furthermore, a condition for the play state transmission unit 67*a* to transmit play state information can be designed, as appropriate. For example, in the case where the play state changes, the play state transmission unit 67*a* transmits play state information corresponding to the changed play state to the server 100. However, the play state transmission unit 67*a* may transmit, to the server 100 at regular intervals, play state information corresponding to the play state currently set. Alternatively, the play state transmission unit 67*a* may transmit the play state information every time communication with the server 100 is carried out.

Furthermore, in the second embodiment, similarly to the embodiment described above, five states, namely, "reception-possible state", "unopened state", "opened state", "participating state", and "reception-not-possible state" are provided as play states (see FIG. 14A). Thus, the play state transmission unit 67*a* transmits, to the server 100, five kinds of play state information that can be distinguished from each other. However, in the second embodiment, play states may be different from those in the embodiment described above. For example, two kinds of states, namely, "permitted state" and "not-possible state" shown in FIG. 14A, may be set as play states.

Figure 35:
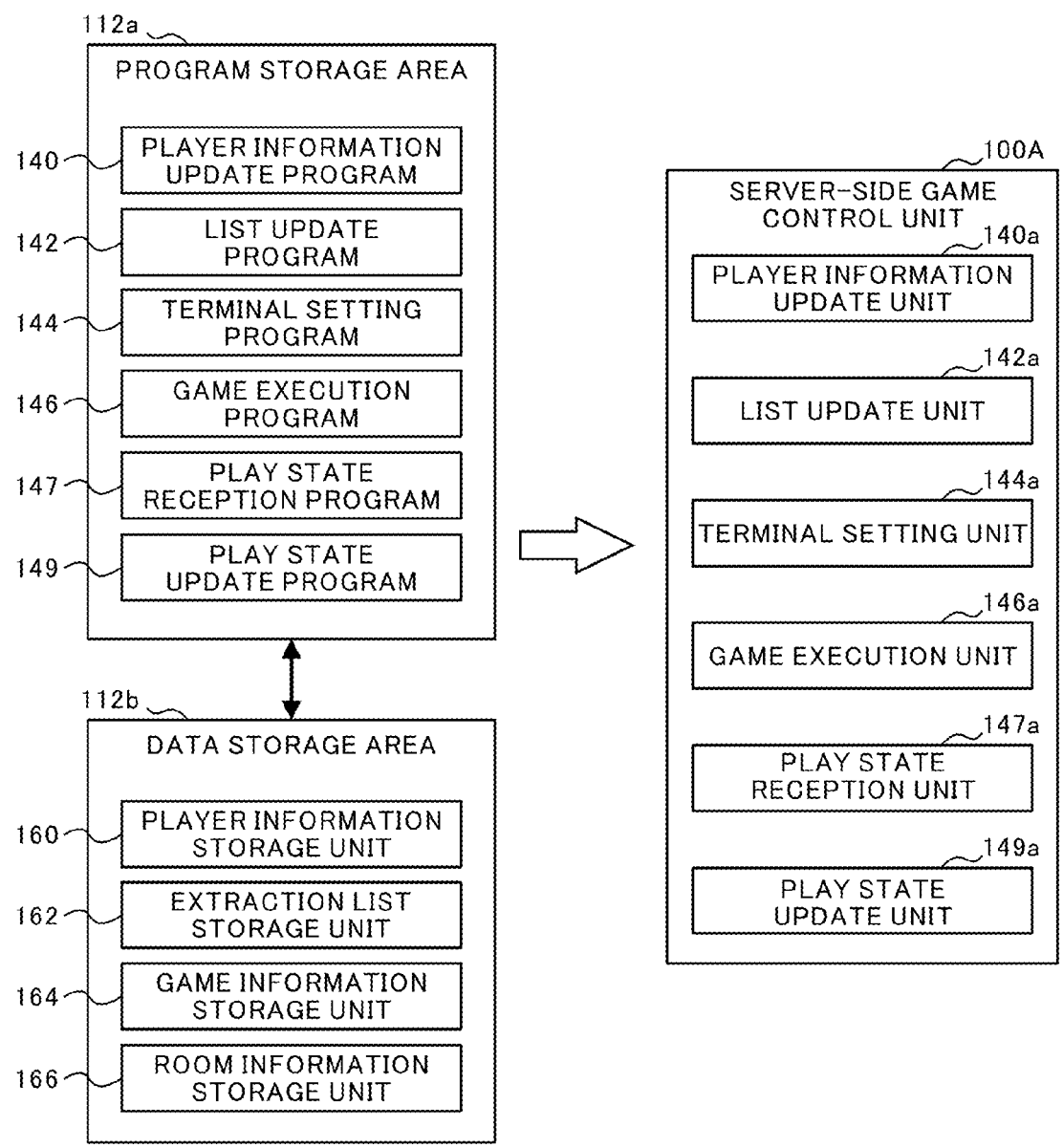
FIG. 35 is a diagram for explaining the configuration of the memory of the server and the functions of the server as a computer in the second embodiment.

FIG. 35 is a diagram for explaining the configuration of the memory 112 of the server 100 and the functions of the server 100 in the form of a computer in the second embodiment. In the second embodiment, in addition to the programs described above, the server-side game control programs further include a play state reception program 147 and a play state update program 149. Furthermore, the CPU 110 runs the play state reception program 147 to cause the server 100 to function as a play state reception unit 147*a*. Furthermore, the CPU 110 runs the play state update program 149 to cause the server 100 to function as a play state update unit 149*a*.

The play state reception unit 147*a* receives a play state (play state information) transmitted from the player terminal 1.

The play state update unit 149*a* updates the play state of the player terminal 1 on the basis of the play state information received by the play state reception unit 147*a*. Note that the play state may be stored in the player information storage unit 160 or may be stored in the extraction list storage unit 162. Furthermore, separately from the player information storage unit 160 and the extraction list storage unit 162, a dedicated storage unit that stores the play state of each player terminal 1 may be provided in the data storage area 112*b*. In the second embodiment, as an example, the case where the play state update unit 149*a* stores the play state of each player terminal 1 in the player information storage unit 160.

Furthermore, also in the second embodiment, the list update unit 142*a* sets a status flag in an extraction list. However, in the second embodiment, five status flags, namely, "permitted state", "not-possible state", "reception possible", "reception not possible", and "received" are provided. Among these status flags, "permitted state" and "not-possible state" are provided instead of "setting possible (blank)" in the embodiment described above, and "reception possible", "reception not possible", and "received" are the same as those in the embodiment described above. The list update unit 142*a* updates the status flag on the basis of a play state stored in the player information storage unit 160, operation information input from the player terminal 1, as well as game execution and management statuses at the server 100.

The list update unit 142*a* sets the status flag in the extraction list to "permitted state" for the player terminal 1 for which the play state stored in the player information storage unit 160 is "reception-possible state" or "unopened state". Furthermore, the list update unit 142*a* sets the status flag in the extraction list to "not-possible state" for the player terminal 1 for which the play state stored in the player information storage unit 160 is "opened state", "participating state", or "reception-not-possible state".

In the case where request information for the random tab 48*c* has been received, the terminal setting unit 144*a* sets invitation information, etc. in the storage areas of players at top 100 ranks among players whose status flags are "permitted state" in the extraction list.

An example of the processing of the player terminal 1 and the server 100 in the second embodiment will be described below.

Figure 36A:
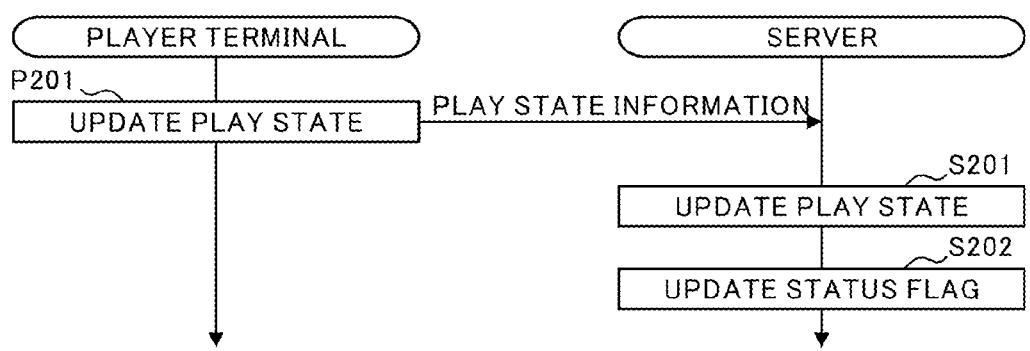
FIG. 36A is a first sequence diagram for explaining the processing of the player terminal and the server in the second embodiment.

FIG. 36A is a first sequence diagram for explaining the processing of the player terminal 1 and the server 100 in the second embodiment. When a play state is updated at the player terminal 1 (P201), play state information is transmitted to the server 100. When the play state reception unit 147*a* receives the play state information, the play state update unit 149*a* updates the play state in the player information storage unit 160 (S201). Furthermore, the list update unit 142*a* updates a status flag in an extraction list on the basis of the play state stored in the player information storage unit 160.

Figure 36B:
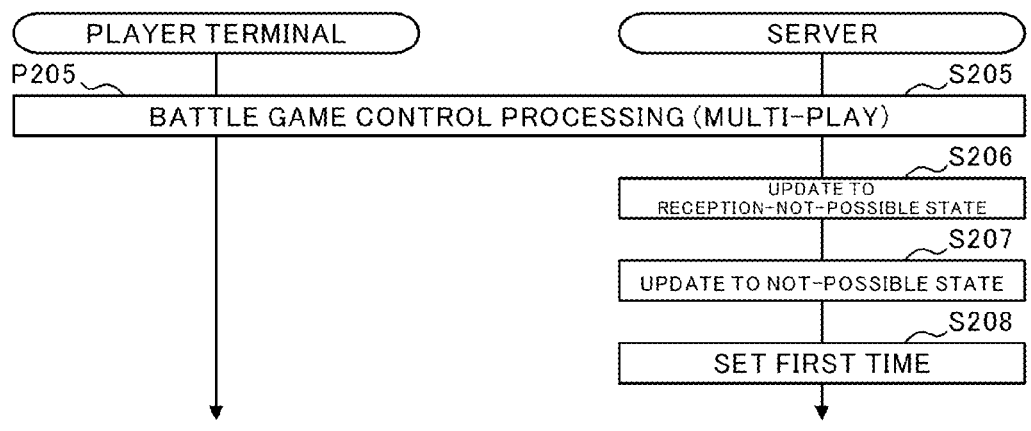
FIG. 36B is a second sequence diagram for explaining the processing of the player terminal and the server in the second embodiment.

FIG. 36B is a second sequence diagram for explaining the processing of the player terminal 1 and the server 100 in the second embodiment. When the multi-play battle game control processing is terminated at the player terminal 1 and the server 100 (P205, S205), the play state update unit 149*a* updates a play state in the player information storage unit 160 to "reception-not-possible state" (S206). Furthermore, the list update unit 142*a* updates a status flag in an extraction list to "not-possible state" for a player who participated in a multi-play (at least one of a host player and a guest player) (S207). At this time, the list update unit 142*a* sets a first time in a wait counter as a wait time (S208).

Figure 36C:
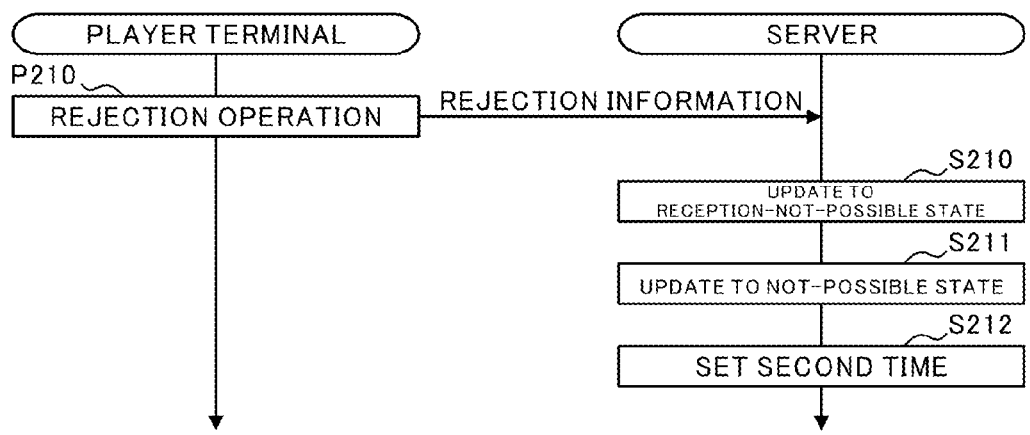
FIG. 36C is a third sequence diagram for explaining the processing of the player terminal and the server in the second embodiment.

FIG. 36C is a third sequence diagram for explaining the processing of the player terminal 1 and the server 100 in the second embodiment. When a rejection operation is input at the player terminal 1 (P210), rejection information is transmitted to the server 100. Upon receiving the rejection information, the play state update unit 149*a* updates a play state in the player information storage unit 160 to "reception-not-possible state" (S210). Furthermore, the list update unit 142*a* updates a status flag in an extraction list to "not-possible state" (S211). At this time, the list update unit 142*a* sets a second time in a wait counter as a wait time (S212).

Note that, although a detailed description will be omitted, when the first time or the second time described above elapses, in the list information update processing (see FIG. 32), the list update unit 142*a* confirms the play state in the player information storage unit 160. At this time, if the play state is "reception-possible state" or "unopened state", the list update unit 142*a* updates the status flag to "permitted state". Meanwhile, if the play state is not "reception-possible state" or "unopened state", the status flag is maintained as "not-possible state".

As described above, according to the second embodiment, the server 100 functions as the play state update unit 149*a* (state update unit). The play state update unit 149*a* updates the play state of the player terminal 1 on the basis of information received from the player terminal 1. Furthermore, the terminal setting unit 144*a* (setting unit) sets a target person terminal (extracted terminal) on the basis of at least the priority points (priority information) and a game play situation at the player terminal 1.

Furthermore, in the second embodiment, the terminal setting unit 144*a* (setting unit) does not set, as a target person terminal (extracted terminal), the player terminal 1 that has executed a multi-play (communication game), at least until the first time elapses after terminating the communication game. Furthermore, the terminal setting unit 144*a* (setting unit) does not set, as a target person terminal (extracted terminal), the player terminal 1 that has transmitted rejection information indicating the rejection of participation in a multi-play (communication game), at least until the second time elapses after receiving invitation information.

Note that, in the second embodiment, the player terminal 1 transmits play state information. However, the player terminal 1 need not manage the play state and only the server 100 may update the play state of the player terminal 1 on the basis of information received from the player terminal 1. Furthermore, it is also possible to apply the modification described above to the second embodiment.

Furthermore, for example, the play state update unit 149*a* may update the login state of the player terminal 1 as the play situation, i.e., the play state. Furthermore, the terminal setting unit 144*a* can set the player terminal 1 that is in a login state as a target person terminal, and does not set the player terminal 1 that is not in the login state as a target person terminal.

Note that, in the embodiment described above, in addition to the play state being updated at the player terminal 1, the login state may be updated as the play state at the server 100. In this case, a target person is set on the basis of play states managed at the player terminal 1 and the server 100, and priority information managed at the server 100.

As described above, a game play situation, i.e., a play state, may be managed at the player terminal 1, may be managed at the server 100, or may be managed at both the player terminal 1 and the server 100. However, the processing load on the server 100 is reduced by managing the play state at the player terminal 1. Meanwhile, in the case where the play state is managed at the server 100, the server 100 can recognize the player terminal 1 that can immediately receive invitation information or report the reception of the invitation information. Thus, it is possible to set only the player terminal 1 that can immediately receive invitation information or report the reception of the invitation information as a target person terminal. This makes it possible to start a multi-play earlier.

Note that an information processing program may cause a computer to function as: the player information update unit 140*a* (update unit) that updates priority information for each player in accordance with an update condition set in advance; the terminal setting unit 144*a* (setting unit) capable of setting, on the basis of at least the priority information upon receiving request information from the player terminal 1, a plurality of player terminals 1 as extracted terminals capable of receiving invitation information; and the game execution unit 60*a* that executes a communication game between one or more of the extracted terminals that have received the invitation information and that have transmitted prescribed participation information, and the player terminal 1 that has transmitted the request information.

Furthermore, the information processing system S may include: the player information update unit 140*a* (update unit) that updates priority information for each player in accordance with an update condition set in advance; the request information transmission unit 64*a* that transmits request information in response to an input of a request operation on an operation section of the player terminal 1; the terminal setting unit 144*a* (setting unit) capable of setting, on the basis of at least the priority information upon receiving the request information from the player terminal 1, a plurality of player terminals 1 as extracted terminals capable of receiving invitation information; the invitation information reception unit 68*a* (reception unit) capable of receiving the invitation information at each extracted terminal; and the game execution unit 146*a* that executes a communication game between, among the extracted terminals that have received the invitation information, one or more extracted terminals that have transmitted participation information on the basis of an input of a prescribed participation operation, and the player terminal 1 that has transmitted the request information.

Note that the player information update unit 140*a* (updating unit) may update the priority information on the basis of a prescribed result in the communication game.

Furthermore, the player information update unit 140*a* (updating unit) may update the priority information on the basis of information received from the extracted terminals after receiving the invitation information.

Furthermore, the terminal setting unit 144*a* (setting unit) may set extracted terminals on the basis of at least the priority information and a game play situation at the player terminal 1.

Furthermore, the terminal setting unit 144*a* (setting unit) need not set the player terminal 1 that has executed the communication game as an extracted terminal at least until a first time elapses after terminating the communication game.

Furthermore, the terminal setting unit 144*a* (setting unit) need not set, as an extracted terminal, the player terminal 1 that has transmitted rejection information indicating the rejection of participation in the communication game, at least until a second time elapses after receiving the invitation information.

Note that, in the embodiments and modification described above, the information processing system S, which is a client-server system, executes each information processing step described above. However, only the player terminal 1 in the embodiments and modification described above may be provided as a game terminal device. The game terminal device is not limited to a smartphone and may be a dedicated game device including a communication function. Furthermore, only the server 100 in the embodiments and modification described above may be provided as a server device.

Furthermore, the programs in the embodiments and the modification described above may be stored in a computer-readable storage medium and provided as a storage medium. Furthermore, the programs may be provided as a game terminal device or a server device including this storage medium. Furthermore, the embodiments and modification described above may be an information processing method that realizes each function and steps indicated in a flowchart.

Although embodiments have been described above with reference to the drawings, it goes without saying that the present invention is not limited to the embodiments and modification described above. It is obvious that a person skilled in the art could conceive of various kinds of modifications or corrections within the range recited in the claims, and it is understood that these modifications or corrections naturally belong to the technical scope of the present invention.

What is claimed is:

1. A non-transitory computer readable medium storing a program causing a first player terminal to execute a method comprising:

transmitting request information to a server in response to an input of a request operation from an operation section, the request information requesting the server to store invitation information in association with a plurality of other player terminals, the invitation information inviting a player to a communication game that can be simultaneously played by a plurality of players, each player terminal associated with the invitation information being set as a receiving terminal that can review the invitation information from the server;

storing a play state based on at least a game play situation, the play state comprising a permitted state that allows reception of the invitation information from the server and a not-possible state that does not allow reception of the invitation information from the server;

determining, based on communication with the server, whether the first player terminal corresponds to one of the receiving terminals stored in response to the request information from another second player terminal;

receiving the invitation information from the server, when the permitted state is stored as the play state and the first player terminal corresponds to one of the receiving terminals stored in response to the request information from the second player terminal;

storing the received invitation information in a memory of the first player terminal;

reporting reception of the invitation information when receiving or after receiving the invitation information;

receiving an input of a prescribed participation operation when reporting or after reporting the reception of the invitation information; and executing the communication game at least with the second player terminal when the prescribed participation operation is input and a prescribed start condition is satisfied.

2. The non-transitory computer readable medium according to claim 1, the program further causing the first player terminal to execute the method further comprising:

setting the play state to the not-possible state for a predetermined first time period, after the communication game is terminated.

3. The non-transitory computer readable medium according to claim 1, the program further causing the first player terminal to execute the method further comprising:

receiving an input of a rejection operation for rejecting participation in the communication game when reporting or after reporting the reception of the invitation information; and setting the play state to the not-possible state for a predetermined second time period, after receiving the input of the rejection operation.

4. The non-transitory computer readable medium according to claim 1, the program further causing the first player terminal to execute the method further comprising:

receiving an input of a prescribed suspension operation when reporting or after reporting the reception of the invitation information;

continuing the reporting in the case where the prescribed suspension operation is input; and terminating the reporting upon receiving participation-not-possible information that can be received when the participation in the communication game becomes not possible.

5. A game terminal device comprising at least one computer configured to execute a method comprising:

transmitting request information to a server in response to an input of a request operation from an operation section, the request information requesting the server to store invitation information in association with a plurality of other game terminal devices, the invitation information inviting a player to a communication game that can be simultaneously played by a plurality of players, each game terminal device associated with the invitation information being set as a receiving terminal that can receive the invitation information from the server;

storing a play state based on at least a game play situation, the play state comprising a permitted state that allows reception of the invitation information from the server and a not-possible state that does not allow reception of the invitation information from the server;

determining, based on communication with the server, whether the game terminal device corresponds to one of the receiving terminals stored in response to the request information from another second game terminal device;

receiving the invitation information from the server, when the permitted state is stored as the play state and the game terminal device corresponds to one of the receiving terminals stored in response to the request information from the second game terminal device;

storing the received invitation information in a memory of the game terminal device;

reporting reception of the invitation information when receiving or after receiving the invitation information;

receiving an input of a prescribed participation operation when reporting or after reporting the reception of the invitation information; and executing the communication game at least with the second game terminal device when the prescribed participation operation is input and a prescribed start condition is satisfied.

6. A non-transitory computer readable medium storing a program causing a first player terminal to execute a method comprising:

transmitting request information to a server in response to an input of a request operation from an operation section, the request information requesting the server to store invitation information in association with a plurality of other player terminals, the invitation information inviting a player to a communication game that can be simultaneously played by a plurality of players, each player terminal associated with the invitation information being set as a receiving terminal that can receive the invitation information from the server;

determining, based on communication with the server, whether the first player terminal corresponds to one of the receiving terminals stored in response to the request information from another second player terminal;

receiving the invitation information from the server, when the first player terminal corresponds to one of the receiving terminals stored in response to the request information from the second player terminal;

storing the received invitation information in a memory of the first player terminal;

storing a play state based on at least a game play situation, the play state comprising a permitted state that allows reporting of reception of the invitation information from the server and a not-possible state that does not allow reporting of reception of the invitation information from the server;

reporting reception of the invitation information when receiving or after receiving the invitation information the permitted state is stored as the play state;

receiving an input of a prescribed participation operation when reporting or after reporting the reception of the invitation information; and executing the communication game at least with the second player terminal when the prescribed participation operation is input and a prescribed start condition is satisfied.

7. The non-transitory computer readable medium according to claim 6, the program further causing the first player terminal to execute the method further comprising:

setting the play state to the not-possible state for a predetermined first time period, after the communication game is terminated.

8. The non-transitory computer readable medium according to claim 6, the program further causing the first player terminal to execute the method further comprising:

receiving an input of a rejection operation for rejecting participation in the communication game when reporting or after reporting the reception of the invitation information; and setting the play state to the not-possible state for a predetermined second time period, after receiving the input of the rejection operation.

9. The non-transitory computer readable medium according to claim 6, the program further causing the first player terminal to execute the method further comprising:

receiving an input of a prescribed suspension operation when reporting or after reporting the reception of the invitation information;

continuing the reporting in the case where the prescribed suspension operation is input; and terminating the reporting upon receiving participation-not-possible information that can be received when the participation in the communication game becomes not possible.

10. A game terminal device comprising at least one computer configured to execute a method comprising:

transmitting request information to a server in response to an input of a request operation from an operation section, the request information requesting the server to store invitation information in association with a plurality of other game terminal devices, the invitation information inviting a player to a communication game that can be simultaneously played by a plurality of players, each game terminal device associated with the invitation information being set as a receiving terminal that can receive the invitation information from the server;

determining, based on communication with the server, whether the game terminal device corresponds to one of the receiving terminals stored in response to the request information from another second game terminal device;

receiving the invitation information from the server, when the game terminal device corresponds to one of the receiving terminals stored in response to the request information from the second game terminal device;

storing the received invitation information in a memory of the game terminal device;

storing a play state based on at least a game play situation, the play state comprising a permitted state that allows reporting of reception of the invitation information from the server and a not-possible state that does not allow reporting of reception of the invitation information from the server;

reporting reception of the invitation information when receiving or after receiving the invitation information and the permitted state is stored as the play state;

receiving an input of a prescribed participation operation when reporting or after reporting the reception of the invitation information; and executing the communication game at least with the second game terminal device when the prescribed participation operation is input and a prescribed start condition is satisfied.

11. An information processing system comprising a server and a plurality of player terminals comprising a first player terminal, the server being configured to execute:
accumulating prescribed player information for each player in a storage unit;

the first player terminal being configured to execute:
transmitting request information to the server in response to an input of a request operation on an operation section from the first player terminal, the request information requesting the server to store invitation information in association with a plurality of other player terminals among the plurality of player terminals, the invitation information inviting a player to a communication game that can be simultaneously played by a plurality of players; and storing a play state based on at least a game play situation, the play state comprising a permitted state that allows reception of the invitation information from the server and a not-possible state that does not allow reception of the invitation information from the server;

the server being configured to execute:

storing, upon receiving the request information from one of the plurality of player terminals the plurality of player terminals in association with the request information based on at least the prescribed player information accumulated in the storage unit, each player terminal associated with the invitation information being set as a receiving terminal that can receive the invitation information from the server;

the first player terminal being configured to execute:

determining, based on communication with the server, whether the first player terminal corresponds to one of the receiving terminals stored in response to the request information from another player terminal among the plurality of player terminals;

receiving the invitation information from the server, when the permitted state is stored as the play state and the first player terminal corresponds to one of the receiving terminals stored in response to the request information from another player terminal among the plurality of player terminals;

storing the received invitation information in a memory of the first player terminal;

reporting reception of the invitation information when receiving or after receiving the invitation information; and receiving an input of a prescribed participation operation when reporting or after reporting the reception of the invitation information; and the server being configured to execute:

executing the communication game between at least one player terminal among the plurality of player terminals that has transmitted participation information to the server based on the input of the prescribed participation operation, and the player terminal that has transmitted the request information to the server.

12. An information processing system comprising a server and a plurality of player terminals comprising a first player terminal, the server being configured to execute:

accumulating prescribed player information for each player in a storage unit;

the first player terminal being configured to execute:

transmitting request information to the server in response to an input of a request operation from an operation section of the first player terminal, the request information requesting the server to store invitation information in association with a plurality of other player terminals among the plurality of player terminals, the invitation information inviting a player to a communication game that can be simultaneously played by a plurality of players; and storing a play state based on at least a game play situation, the play state comprising a permitted state that allows reporting of reception of the invitation information from the server and a not-possible state that does not allow reporting of reception of the invitation information from the server;

the server being configured to execute:

storing, upon receiving the request information from one of the plurality of player terminals, the plurality of player terminals in association with the request information based on at least the prescribed player information accumulated in the storage unit, each player terminal associated with the invitation information being set as a receiving terminal that can receive the invitation information from the server;

the first player terminal being configured to execute:

determining, based on communication with the server, whether the first player terminal corresponds to one of the receiving terminals stored in response to the request information from another player terminal among the plurality of player terminals;

receiving the invitation information from the server, when the first player terminal corresponds to one of the receiving terminals stored in response to the request information from another player terminal among the plurality of player terminals;

storing the received invitation information in a memory of the first player terminal;

reporting reception of the invitation information when the permitted state is stored at the play state when receiving or after receiving the invitation information; and receiving an input of a prescribed participation operation when reporting or after reporting the reception of the invitation information; and the server being configured to execute:

executing the communication game between at least one player terminal that has transmitted participation information to the server based on the input of the prescribed participation operation, and the player terminal that has transmitted the request information to the server.

* * * * *